(12) United States Patent
DeLorean

(10) Patent No.: US 11,912,404 B2
(45) Date of Patent: Feb. 27, 2024

(54) VERTICAL TAKEOFF AND LANDING AIRCRAFT

(71) Applicant: DeLorean Aerospace, LLC, Bloomfield Hills, MI (US)

(72) Inventor: Paul J. DeLorean, Bloomfield Hills, MI (US)

(73) Assignee: DELOREAN AEROSPACE, LLC, Bloomfield Hills, MI (US)

( * ) Notice: Subject to any disclaimer, the term of this patent is extended or adjusted under 35 U.S.C. 154(b) by 1298 days.

(21) Appl. No.: 16/280,021

(22) Filed: Feb. 19, 2019

(65) Prior Publication Data
US 2019/0185155 A1 Jun. 20, 2019

Related U.S. Application Data

(63) Continuation of application No. 15/456,173, filed on Mar. 10, 2017, now Pat. No. 10,994,838, which is a
(Continued)

(51) Int. Cl.
*B64C 29/00* (2006.01)
*B64D 27/24* (2006.01)
(Continued)

(52) U.S. Cl.
CPC .......... *B64C 29/0033* (2013.01); *B64C 27/32* (2013.01); *B64C 39/04* (2013.01);
(Continued)

(58) Field of Classification Search
CPC ................................................ B64C 29/0033
See application file for complete search history.

(56) References Cited

U.S. PATENT DOCUMENTS

| 3,955,780 A | 5/1976 | Postelson |
| 4,537,372 A * | 8/1985 | Forizs ................. B64C 29/0033 |
| | | 244/66 |

(Continued)

FOREIGN PATENT DOCUMENTS

| CN | 102616096 A | 8/2012 |
| DE | 3917499 A1 | 12/1990 |

(Continued)

OTHER PUBLICATIONS

Brazilian Office Action dated Mar. 17, 2020 for Brazilian Patent Application No. BR112015013134-4, a counterpart of U.S. Pat. No. 9,085,355, 7 pages.
(Continued)

*Primary Examiner* — Nicholas McFall
(74) *Attorney, Agent, or Firm* — Lee & Hayes P.C.

(57) ABSTRACT

The disclosure generally pertains to a vertical take-off and landing (VTOL) aircraft comprising a fuselage and at least one fixed wing. The aircraft may include at least two powered rotors located generally along a longitudinal axis of the fuselage. The rotor units may be coupled to the fuselage via a rotating chassis, which allows the rotors to provide directed thrust by movement of the rotor units about at least one axis. The VTOL aircraft may include instructions to perform a degraded rotor landing protocol. The degraded rotor landing protocol may include adjusting a power to an operable rotor unit to control a rate of descent and/or slow a rate of acceleration toward a landing surface. The VTOL aircraft may be configured to impact the landing surface from a substantially vertical configuration, and adjust a thrust vector to cause the aircraft to come to rest in a generally upright configuration.

2 Claims, 36 Drawing Sheets

Related U.S. Application Data continuation-in-part of application No. 14/738,675, filed on Jun. 12, 2015, now Pat. No. 9,862,486, which is a continuation of application No. 13/708,612, filed on Dec. 7, 2012, now Pat. No. 9,085,355.

(51) Int. Cl.

| | |
|---|---|
| *B64C 39/12* | (2006.01) |
| *B64C 39/10* | (2006.01) |
| *B64C 39/04* | (2006.01) |
| *B64C 27/32* | (2006.01) |
| *B64U 10/25* | (2023.01) |

(52) U.S. Cl.
CPC .............. *B64C 39/10* (2013.01); *B64C 39/12* (2013.01); *B64D 27/24* (2013.01); *B64U 10/25* (2023.01); *Y02T 50/10* (2013.01); *Y02T 50/60* (2013.01)

(56) References Cited

U.S. PATENT DOCUMENTS

| | | | |
|---|---|---|---|
| 5,383,627 A | 1/1995 | Bundo | |
| 5,454,531 A | 10/1995 | Melkuti | |
| 5,823,468 A | 10/1998 | Bothe | |
| 5,890,441 A | 4/1999 | Swinson et al. | |
| 6,568,630 B2 | 5/2003 | Yoeli | |
| 6,708,920 B2 | 3/2004 | Fukuyama | |
| 6,742,741 B1 | 6/2004 | Rivoli | |
| 6,886,776 B2 | 5/2005 | Wagner et al. | |
| 6,966,174 B2 | 11/2005 | Paul | |
| 7,188,803 B2 | 3/2007 | Ishiba | |
| 7,249,732 B2 | 7/2007 | Sanders, Jr. et al. | |
| 7,874,513 B1 | 1/2011 | Smith | |
| 2005/0151003 A1 | 7/2005 | Churchman | |
| 2006/0226281 A1 | 10/2006 | Walton | |
| 2007/0262195 A1 | 11/2007 | Bulaga et al. | |
| 2009/0140095 A1* | 6/2009 | Sirohi | B64C 29/00 244/17.11 |
| 2009/0261209 A1 | 10/2009 | Mioduchevski | |
| 2010/0012790 A1 | 1/2010 | Bostan | |
| 2010/0051740 A1* | 3/2010 | Yoeli | B64C 29/0033 244/17.23 |
| 2010/0270419 A1 | 10/2010 | Yoeli | |
| 2010/0301168 A1 | 12/2010 | Raposo | |
| 2011/0190965 A1 | 8/2011 | Hirvonen et al. | |
| 2011/0226892 A1 | 9/2011 | Crowther et al. | |
| 2012/0012692 A1 | 1/2012 | Kroo | |
| 2012/0043413 A1 | 2/2012 | Smith | |
| 2012/0091257 A1 | 4/2012 | Wolff et al. | |
| 2012/0298793 A1 | 11/2012 | Weddendorf et al. | |
| 2014/0158816 A1 | 6/2014 | DeLorean | |
| 2014/0339354 A1 | 11/2014 | Gaillimore et al. | |
| 2014/0339372 A1 | 11/2014 | Dekel et al. | |
| 2015/0274292 A1 | 10/2015 | DeLorean | |
| 2016/0052626 A1 | 2/2016 | Vander Mey | |
| 2016/0144957 A1 | 5/2016 | Claridge et al. | |
| 2016/0244156 A1 | 8/2016 | Leng | |
| 2018/0222580 A1 | 8/2018 | DeLorean | |

FOREIGN PATENT DOCUMENTS

| | | |
|---|---|---|
| GB | 2486448 A | 6/2012 |
| JP | H08043104 A | 2/1996 |
| JP | 2003137192 A | 5/2003 |
| JP | 2005125976 A | 5/2005 |
| JP | 2006123880 A | 5/2006 |
| JP | 2008206670 A | 9/2008 |
| JP | 2010137844 A | 6/2010 |
| JP | 2012051545 A | 3/2012 |
| WO | WO0005131 A1 | 2/2000 |
| WO | WO2012080737 A2 | 6/2012 |

OTHER PUBLICATIONS

Indian Office Action dated Oct. 11, 2019 for Indian Patent Application No. 5599/DELNP/2015, a counterpart foreign application of U.S. Pat. No. 9,085,355, 8 pages.

Brazilian Office Action dated Sep. 21, 2021 for Brazilian Patent Application No. BR1120150131344, a foreign counterpart to U.S. Pat. No. 10,994,838, 8 pages.

European Office Action dated Oct. 19, 2021 for European Patent Application No. 13873435.5, a foreign counterpart to U.S. Pat. No. 9,085,355, 3 pages.

Canadian Office Action dated Jan. 20, 2022 for Canadian Patent Application No. 2,893,294, a foreign counterpart to U.S. Pat. No. 9,085,355, 4 pages.

Australian Office Action dated Oct. 17, 2016 for Australian patent application No. 2013376864, a counterpart foreign application of U.S. Pat. No. 9,085,355, 4 pages.

Australian Office Action dated Sep. 11, 2017 for Australian Patent Application No. 2013376864, a counterpart foreign application of U.S. Pat. No. 9,085,355, 2 pages.

Supplementary European Search Report dated Dec. 13, 2016 for European patent application No. 13873435.5, 9 pages.

Translated Japanese Office Action dated Sep. 19, 2017 for Japanese Patent Application No. 2015-546507, a counterpart foreign application of U.S. Pat. No. 9,085,355, 7 pages.

Office action for U.S. Appl. No. 13/708,612, dated Oct. 6, 2014, DeLorean, "Vertical Takeoff and Landing Aircraft," 22 pages.

PCT Search Report and Written Opinion dated Aug. 22, 2014 for PCT application No. PCT/US13/71531, 13 pages.

European Office Action dated Jan. 13, 2020 for European Patent Application No. 13873435.5, a counterpart of U.S. Pat. No. 9,085,355, 4 pages.

Canadian Office Action dated Jun. 16, 2020 for Canadian Patent Application No. 2,893,294, a counterpart foreign application of the U.S. Pat. No. 9,085,355, 5 pages.

Non Final Office Action dated Jun. 2, 2020 for U.S. Appl. 15/456,173, "Vertical Takeoff and Landing Aircraft," DeLorean, 8 pages.

European Office Action dated Nov. 24, 2020 for European Patent Application No. 13873435.5, a counterpart of U.S. Pat. No. 9,085,355, 10 pages.

Canadian Office Action dated Nov. 7, 2019 for Canadian Patent Application No. 2,893,294, a counterpart of U.S. Pat. No. 9,085,355, 6 pages.

\* cited by examiner

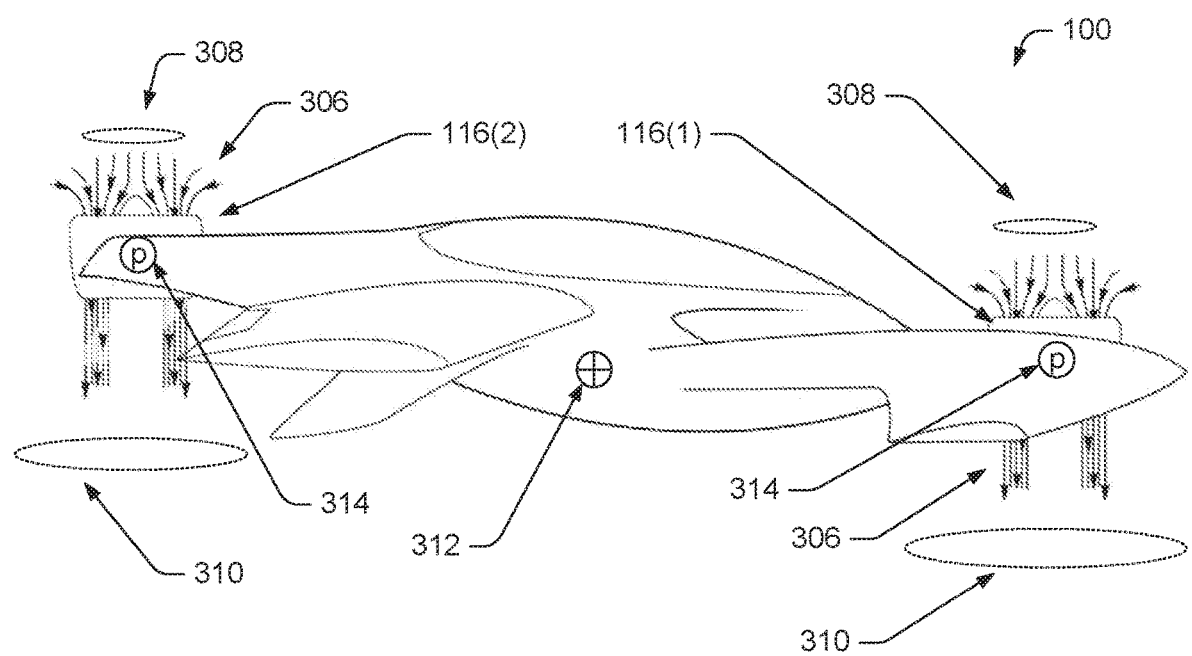
FIG. 3C
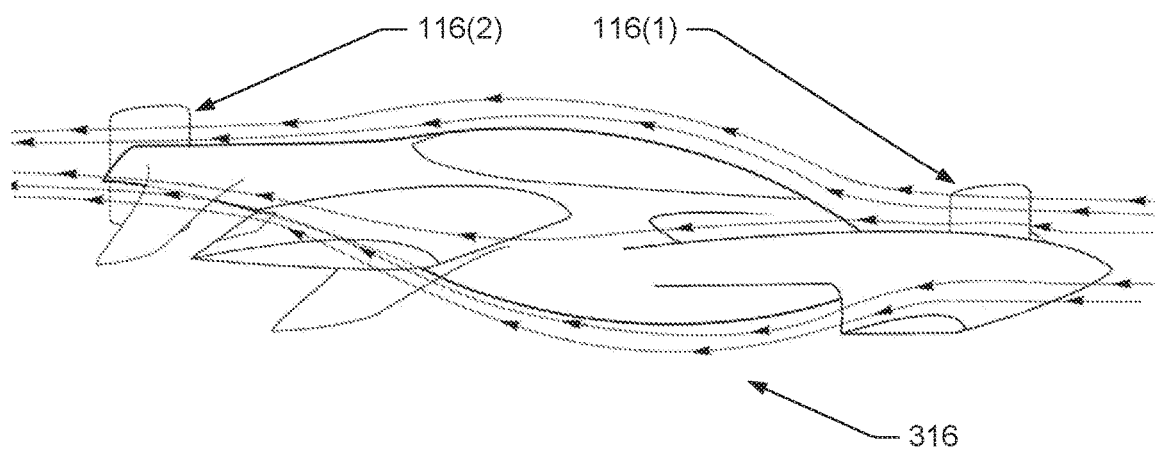
FIG. 3(b)
FIG. 3D

VERTICAL TAKEOFF AND LANDING AIRCRAFT

RELATED APPLICATIONS

This application is a continuation of and claims priority to U.S. patent application Ser. No. 15/456,173, filed on Mar. 10, 2017, which claims priority to and is a continuation-in-part application of U.S. patent application Ser. No. 14/738,675, filed on Jun. 12, 2015, now U.S. Pat. No. 9,862,486, which is a continuation of U.S. patent application Ser. No. 13/708,612, filed on Dec. 7, 2012, now U.S. Pat. No. 9,085,355, which issued on Jul. 21, 2015, all of which are incorporated by reference herein.

BACKGROUND

The field of aviation encompasses many different versions of personal aircraft. The vast majority of readily accessible, affordable personal aircraft are fixed wing designs that require the use of a hangar or ramp space for storage, and an air strip for take-off and landing. These requirements increase the overall cost of operating the aircraft, and can render it inaccessible to the average citizen. In addition, most personal aircraft rely on traditional controls and require training and expertise to operate them. The degree of difficulty and knowledge required to operate these aircraft is often multiple times that of driving a traditional automobile, for example.

In contrast, vertical takeoff and landing (VTOL) aircraft can be operated without use of an air strip. Since their inception at the early part of the twentieth century, VTOL aircraft have been powered by internal combustion, turbo-fans or turbo-shaft engines. These types of engines, though reliable, suffer from the threat of engine loss due to foreign object debris (FOD), largely rely on petroleum based products as their fuel, and are highly complex and extremely expensive. The dangerous and cost prohibitive nature of the turbo-fan and turbo-shaft engines used in today's modern VTOL aircraft has deterred their use in the personal aircraft market.

A large number of VTOL aircraft in use today are in the form of tilt-rotor aircraft, and are employed by various militaries throughout the world. Many of these aircraft provide balanced thrust from rotors located on the main wings, thus making them difficult if not impossible to maneuver after a rotor becomes nonoperational. In addition, the overall complexity of today's tilt-rotor aircraft has limited their use to well trained, professional pilots. However, the many advantages of the tilt-rotor unit platform, including vertical lifting capabilities combined with the speed and efficiency of a conventional fixed wing aircraft, if available to the general public, could revolutionize the transportation industry.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3C is a side elevation view of an illustrative VTOL aircraft shown in FIG. 2 and shows airflow through rotor units during vertical flight.

FIG. 3D is a side elevation view of an illustrative VTOL aircraft in forward flight mode and shows airflow through rotor units during forward flight.

FIG. 28A illustrates the VTOL aircraft in a forward flight mode. FIG. 28B illustrates the VTOL aircraft in a hover mode. FIG. 28C illustrates the VTOL aircraft in a vertical configuration while performing the degraded rotor landing protocol.

FIG. 29A illustrates the VTOL aircraft in a forward flight mode. FIG. 29B illustrates the VTOL aircraft in a hover mode. FIG. 29C illustrates the VTOL aircraft in a vertical configuration while performing the degraded rotor landing protocol.

DETAILED DESCRIPTION

Figure 1A:
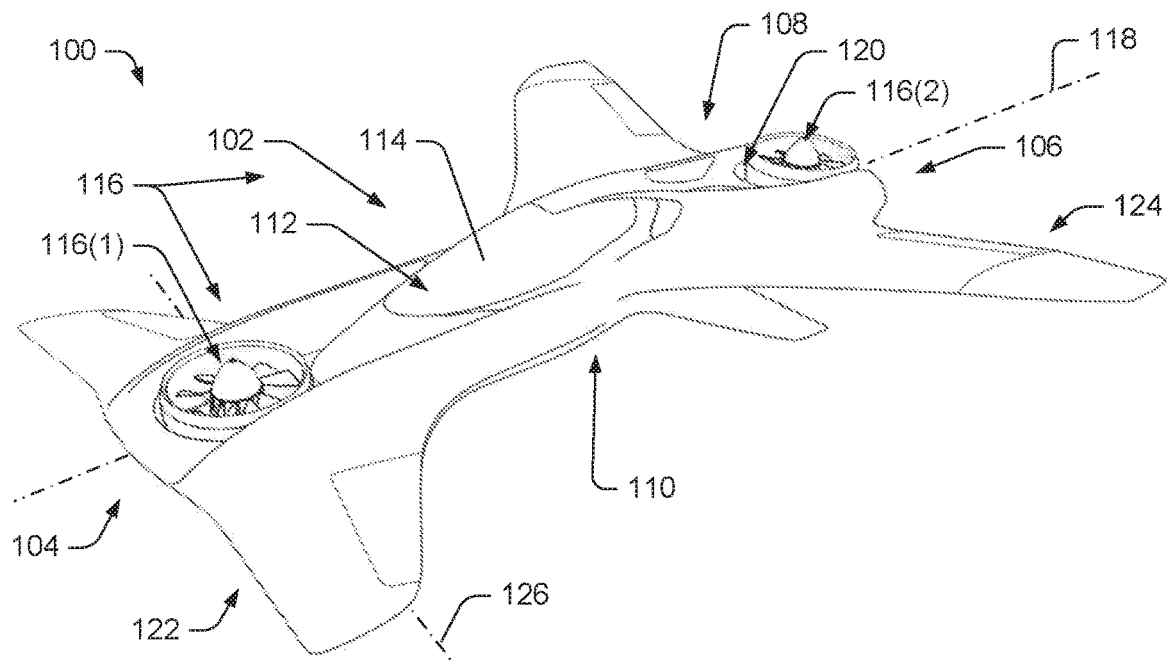
FIGS. 1A and 1B are perspective views of an illustrative vertical takeoff and landing (VTOL) aircraft.

This disclosure is directed, in part, to a vertical takeoff and landing (VTOL) aircraft that includes fixed wing flight capabilities. The VTOL aircraft may include thrust producing rotors located on opposite ends of a fuselage and along a longitudinal axis of the fuselage. The rotors may be electric ducted fans. However, other power sources may be used such as gas powered rotor units. Each rotor unit may be coupled to the fuselage via a rotating or pivoting chassis, which allows each rotor unit to provide directed thrust by movement of the rotor unit about at least one axis. By moving the rotor units, the aircraft can transition from a hover mode to a transition mode and then to a forward flight mode and back. The aircraft may take off without use of an airstrip by liftoff into the hover mode. While in the hover mode, the rotors may generate thrust that is directed primarily in a downward direction relative to the fuselage. Once the aircraft has gained altitude after sustained flight in the hover mode, the rotor units may transition, during the transition mode, to a forward-flight mode where the rotors generate centerline trust directed primarily toward the aft of the fuselage. The rotor units may later transition back to the hover mode to enable the aircraft to land without use of an airstrip.

The aircraft may include fixed wings to enable prolonged flight with minimal thrust from the rotors. In some embodiments, the aircraft may include a canard wing at the fore end of the fuselage and a delta-shaped main wing at the aft end of the fuselage. However, other wing configurations may be used as discussed below. The wings may include ailerons, flaps, flaperons, and any other control surfaces necessary to control the aircraft in forward flight. In some embodiments, the rotors may provide directed lateral thrust to assist in yaw and roll control of the aircraft.

In accordance with various embodiments, the VTOL aircraft may employ a flight control computer that controls and sustains flight in each of the flight modes (hover mode, transition mode, and forward-flight mode). Operation of the aircraft may be performed by providing simple directional commands from operator controls to the flight control computer, which in turn executes the commands while taking other necessary action to sustain flight and/or avoid objects in the surrounding environment. Thus, control of the aircraft from the operator's perspective may be akin to control of an aircraft in a video game, and may be made possible with minimal training or aviation expertise. In some embodiments, the VTOL aircraft may be an unmanned aerial vehicle (UAV) or a remote-controlled aircraft.

In various embodiments, the flight control computer (and/or control management system) of the VTOL aircraft may include instructions to cause performance of a landing protocol in the event that a rotor is operating in a degraded state (e.g., experiences degraded functionality or ceases operation). The degraded state may include the rotor producing zero thrust (i.e. rotor inoperative) or the rotor producing less thrust than required to maintain substantially level flight in a particular regime (i.e., forward flight mode, transition mode, or hover flight mode).

In some embodiments, the flight control computer may recognize that a degraded rotor is operating in a degraded state, and may initiate the landing protocol. The landing protocol may include one or more operable rotors providing vertical thrust while the aircraft assumes a substantially vertical configuration due to the loss of thrust from the degraded rotor. In some embodiments, the flight control computer of the aircraft may be configured to adjust an orientation of the one or more operable rotors to provide substantially vertical thrust. In such embodiments, the orientation adjustment may include an adjustment up to 180 degrees. The one or more operable rotors may increase or maximize a thrust output to slow a descent of the aircraft. In some embodiments, the thrust provided by the one or more operable rotors may be sufficient to stop descent or limit a rate of descent of the VTOL aircraft to less than a rate of freefall (e.g., less than 32 feet-per-second-per-second ($fps^2$)). In some embodiments, the flight control computer may be configured to identify a power source for the degraded rotor, and route excess power to one or more operable rotors, such as from a battery associated with the degraded rotor. In some embodiments, the flight control computer may be configured to couple, switch, or isolate power sources to provide the power required to perform the degraded rotor landing protocol.

In some embodiments, the one or more operable rotors may slow a rate of acceleration of the aircraft due to gravity (e.g., 20 $fps^2$, 15 $fps^2$). In various embodiments, the flight control computer may control a descent of the VTOL aircraft at a pre-determined rate (e.g., 500 fpm, 300 fpm, 100 fpm, etc.). In some embodiments, the flight control computer may control the descent of the VTOL aircraft based on an amount of power available to the operational rotor. In the controlled descent, a first end of the aircraft (i.e., the nose or the tail) may contact a landing surface. In some embodiments, the flight control computer may cause the one or more operable rotors adjust a thrust vector at or close to the landing surface, to change a pitch of the aircraft such that the aircraft impacts the ground with a canopy being generally upright. In some embodiments, the adjustment to the thrust vector may cause the VTOL aircraft to rotate onto the landing gear. Accordingly, the landing protocol may be initiated to safely land the VTOL aircraft canopy side up in the event of a degraded motor and/or rotor system.

The apparatuses, systems, and techniques described herein may be implemented in a number of ways. Example implementations are provided below with reference to the following figures.

Figure 1B:
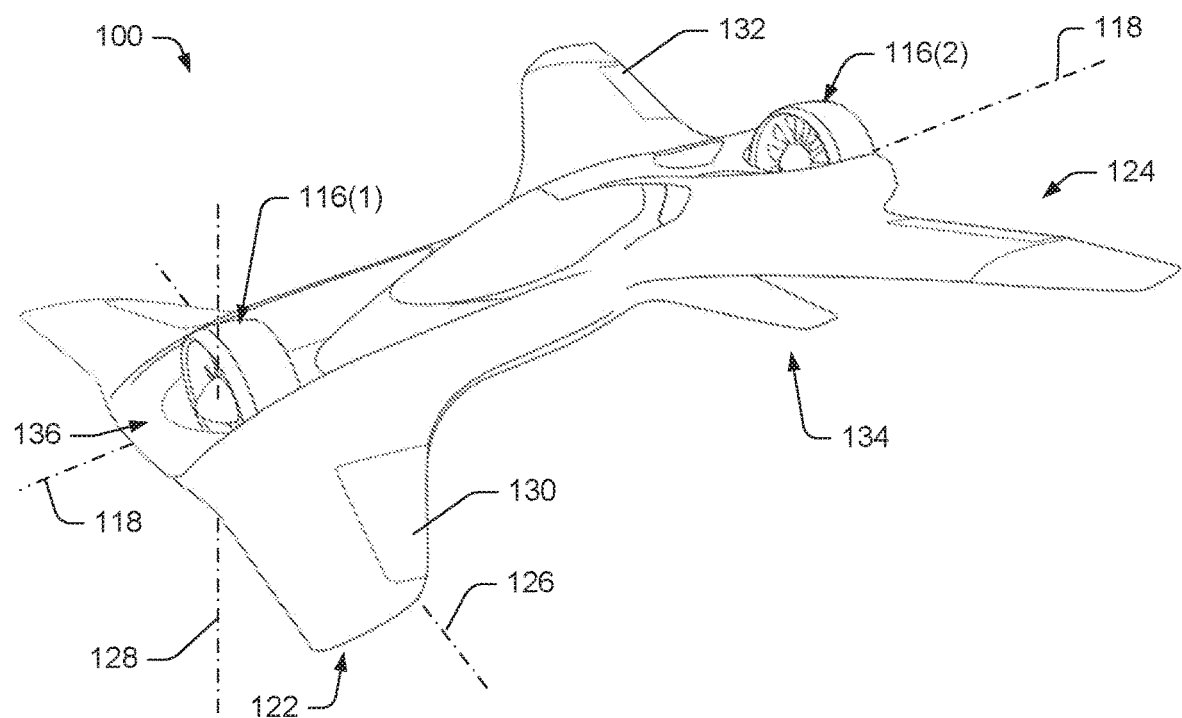

FIGS. 1A and 1B are perspective views of an illustrative vertical takeoff and landing (VTOL) aircraft.

FIG. 1A is an isometric view of an illustrative VTOL aircraft 100 while the VTOL aircraft is in the hover mode. The aircraft in FIG. 1 has a fuselage 102 with a fore end 104, an aft end 106, a top side 108, and a bottom side 110. The VTOL aircraft 100 may include a cockpit 112 located within the top side 108 of the fuselage 102. The cockpit 112 includes space for at least one operator to sit for manned flight. In some embodiments, the cockpit 112 may include space for one or more passengers and/or other payload. In some embodiments, the VTOL aircraft 100 may be equipped for unmanned flight. The cockpit 112 may include a canopy 114 that provides a weatherproof and relatively quiet environment. The canopy 114 may be formed of acrylic, plastic, glass, or any other transparent material.

The VTOL aircraft 100 includes at least two rotor units 116, including a fore rotor unit 116(1) and an aft rotor unit 116(2) that produce thrust for propulsion in a push-pull configuration. The rotor units 116 are located along a longitudinal axis 118 of the fuselage 102. The rotor units may be located along a same plane or along different planes (e.g., one rotor unit located closer to the top side 108 of the fuselage 102 than the other rotor unit, etc.). The rotor units 116 may be powered by electric motors or by gas powered engines. In some embodiments, a hybrid system may be used to convert liquid fuel to electrical energy to drive electric motor powered rotors and/or a fuel powered generator may provide electrical power to electric motors.

In accordance with one or more embodiments, the rotors 116 may be counter-rotating, in which the rotor of the fore rotor unit 116(1) spins clockwise, while the rotor of the aft rotor unit 116(2) spins counter-clockwise, or vice versa. The rotor units 116 may consist of a rotor vane, or both a rotor vane and a straightening vane (stator). In some embodiments that include both the rotor vane and the straightening vane, the rotor vane on both the fore rotor unit and aft rotor unit may rotate in the same direction. The straightening vane may be implemented with a stator that is fixed in place and supports the rotor vane. The straightening vane may be comprised of a plurality of aerodynamic blades, configured to counter the vortex imparted on the thrust from the rotor vane.

The push-pull configuration of the rotor units 116 may allow for greater controllability when only one rotor unit provides thrust in the forward-flight mode because the rotor units 116 are both located along the longitudinal axis 118 and in substantial alignment with direction of forward flight. Therefore, there may be minimal imparted yaw or roll on the VTOL aircraft 100 when only one rotor unit provides forward thrust. The VTOL aircraft 100 may operate in a push mode, in which the fore rotor unit 116(1) provides little or no thrust or a pull mode, in which the aft rotor unit 116(2) provides little or no thrust. The VTOL aircraft may also operate in a glide mode, in which the rotor units 116 provide little or no thrust.

In some embodiments, the rotor units 116 are equipped with a plurality of blades surrounded by a duct (ducted rotor units). Ducted rotor units may provide a high thrust-to-diameter ratio compared to an open propeller. Ducted rotor units are also very efficient because the duct reduces losses in thrust due to tip vortices. The reduction of tip vortices increases the efficiency of both rotor units due to reduced drag on the tip of each blade while operating within a duct. Furthermore, the reduction of tip vortices increases the efficiency of the aft rotor unit due to decreased turbulent air flow from the fore rotor unit. This increased efficiency provides an increase in thrust from the rotor unit during the forward flight mode.

In various embodiments, the rotors may not include the duct (non-ducted rotors). When the VTOL aircraft is configured with non-ducted rotors, the fuselage 102 and/or the canopy 114 may be equipped with vanes to guide laminar airflow directly to the aft rotor unit 116(2). In some embodiments, a dissipation mechanism may be used to divert turbulent air away from the aft rotor unit 116(2), thereby increasing laminar air flow to the aft rotor unit 116(2) and increasing the efficiency of the aft rotor unit 116(2).

In some embodiments, the rotor units 116 may include a housing, a stator coupled to an interior of the housing, a plurality of blades, and an electric motor coupled to the stator and coupled to the plurality of blades. The housing (when ducted) guides airflow through the rotor unit, and increases the efficiency of each rotor unit. The rotor units 116 may be approximately the same size. However different sized rotor units may be used to balance a payload of the VTOL aircraft 100 for flight in the hover mode.

Each rotor unit (107) may be mounted in a rotating chassis 120. The rotating chassis 120 for the fore rotor unit 116(1) may be coupled to the fore end 104 of the fuselage 102, possibly between or within a fore wing 122 (such as a canard wing). The rotating chassis 120 for the aft rotor unit 116(2) may be attached to the aft end 106 of the fuselage 102, possibly between or within an aft wing 124. In some embodiments, the rotating chassis may be a gimbaled chassis or a pivoting chassis.

The rotating chassis 120 may allow for at least partial freedom of movement of the rotor unit about the longitudinal axis 118 and a lateral axis 126 of each of the rotor units 116. The rotor units 116 may move independently of one another, based on a signal from a control management system. The control management system processes signals from an operator (on board operator, remote operator, or both) and a plurality of stability augmentation sensors, and sends an output signal to each of the rotor units 116, directing each of the rotor units to move about the longitudinal axis and the lateral axis as necessary.

FIG. 1B shows the illustrative VTOL aircraft 100 in a forward-flight mode. The rotor units 116 may move about the lateral axis 126 to transition from the hover mode (shown in FIG. 1A), in which the rotor units 116 direct thrust substantially perpendicular to the longitudinal axis 118 and the lateral axis 126, through a transition mode, to the forward flight mode shown in FIG. 1B, in which the rotor units 116 direct thrust substantially in line with the longitudinal axis 118. The movement about a vertical axis that is perpendicular to the longitudinal axis 118 and the lateral axis 126 may provide directed thrust for yaw control during forward flight. In some embodiments, the rotor units 116 may also include a vane at the exhaust, which may operate to direct thrust from the rotor units 116.

The VTOL aircraft 100 may comprise a monocoque structure, made of carbon fiber, titanium, aluminum, or any other material appropriate for aircraft construction. In another embodiment, the structure may comprise a semi-monocoque design, with a shell and longerons made of carbon fiber, titanium, aluminum, or any other material appropriate for aircraft construction. The aircraft skin is a low friction surface that may include built-in solar cells.

In some embodiments, the fore wing 122 may be a canard wing and the aft wing 124 (main wing in this configuration) may be a delta wing. However, other wing configurations may be used and are described below with reference to some illustrative aircraft. The fore wing 122, coupled to the fore end 104 of the fuselage 102, may act as a lifting surface and provide pitch stability in the forward-flight mode. The canard wing may have control surfaces 130 such as ailerons, to allow for maneuverability about the longitudinal axis 118 of the VTOL aircraft 100. The ailerons, elevators, rudder are actuated in normal fashion during forward flight The aft wing 124 is attached to the aft end 106 of the fuselage 102 and may be a lift-generating airfoil. The aft wing 124 may be a conventional shaped airfoil, a delta wing, or an ovular shaped wing. The aft wing 124 may be equipped with control surfaces 132, comprised of a set of any of the following alone, or in combination: ailerons, flaps, flaperons, and any other control surface which may enable the operator to control the roll, and/or speed of the VTOL aircraft 100 while in the forward-flight mode. The control surfaces 132 on the aft wing 124 may also be configured to move simultaneously in the same direction, thereby providing pitch control of the VTOL aircraft 100 while in forward flight.

The VTOL aircraft 100 may include ventral fins 134 that extend outward from the bottom side 110 of the fuselage 102 near the aft end 106. The ventral fins 134 may provide directional stability (e.g., yaw and pitch stability). In some embodiments, the ventral fins 134 may house and/or support landing gear and/or control surfaces, and also serve as energy absorbing devices during hard landings. The landing gear may be implemented as in a tricycle-style configuration that includes two aft struts and one fore strut which may or may not be retractable after take-off in order to reduce drag.

A fixed or movable portion of the fuselage or body surface 136 may enhance inlet airflow entering the rotor units during conversion from hover to forward flight. This may improve the airflow entering the ducts giving better efficiency with less turbulence and/or drag from inlet lip flow separation.

Figure 2:
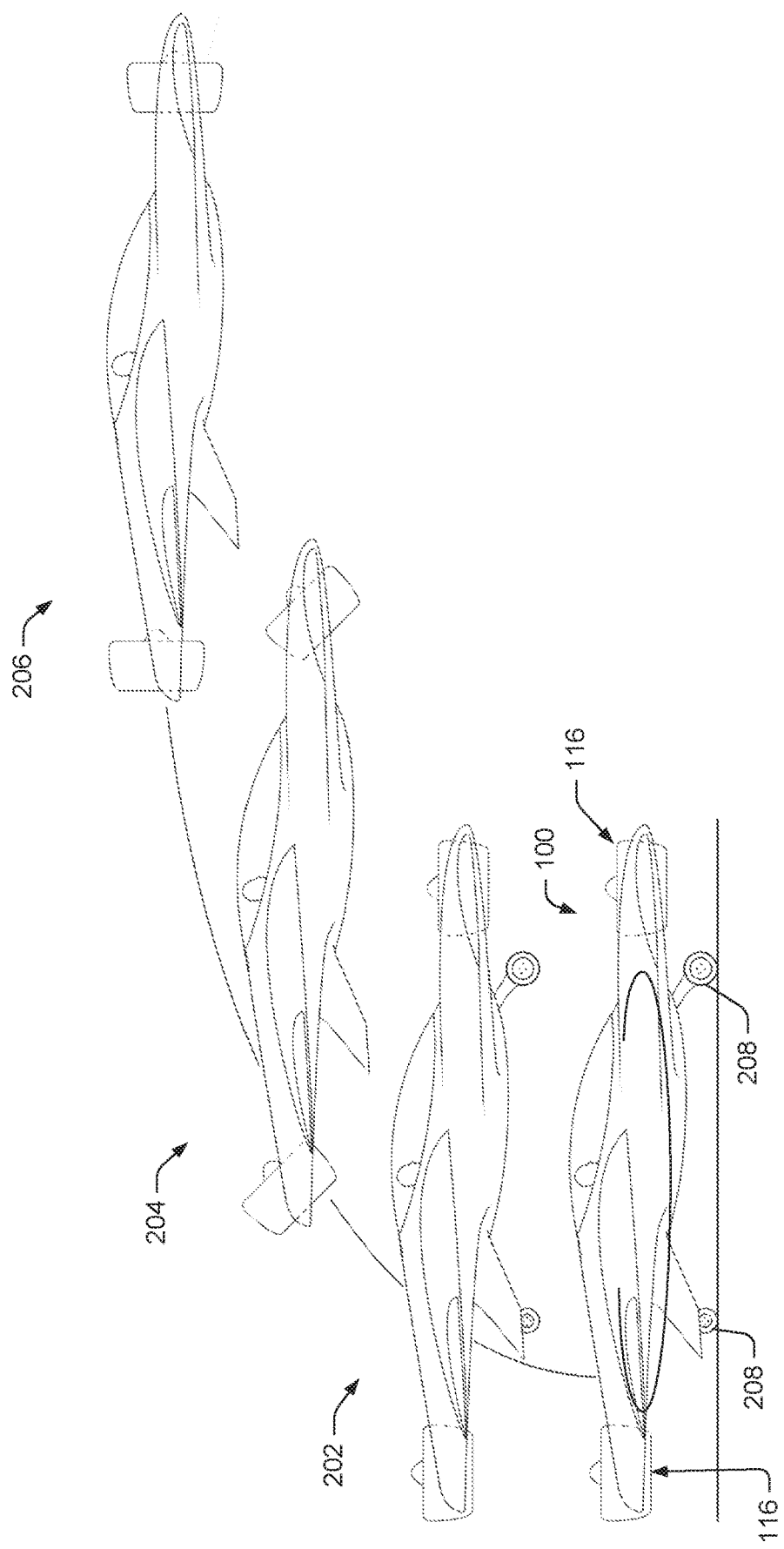
FIG. 2 is a schematic diagram showing a transition of flight of an illustrative VTOL aircraft from takeoff to a transitional mode to a forward flight mode.

FIG. 2 is a schematic diagram showing a transition of flight of an illustrative VTOL aircraft from a hover mode 202 to a transitional mode 204 to a forward-flight mode 206.

The hover mode 202 may be initiated prior to takeoff. In the hover mode 202, the rotor units 116 may be substantially parallel to the ground. Landing gear 208 may be deployed. The control management system may make rapid micro and/or macro adjustments to the thrust level and direction of each of the rotor units 116 to support flight in the hover mode 202. The operator may direct the aircraft in the hover mode 202, which may include providing directional data to the control management system. After take-off into the hover mode 202, the operator may direct the aircraft to remain in the hover mode, or start a transition to forward flight, via the transition mode 204.

The transition mode 204 may be a temporary mode used to transition between the hover mode 202 and the forward-flight mode 206. However, the VTOL aircraft 100 may sustain prolonged flight in the transition mode 204. The transition mode may be controlled largely by the control management system. In the transition mode 204, the rotor units 116 may rotate substantially simultaneously from a position that directs trust downward toward the ground (used in the hover mode 202) to a position that directs thrust rearward to cause forward flight. In the transition mode 204, the fore wing 122 and the aft wing 124 may begin to generate some lift, and the control surfaces 130, 132 may become effective to control the pitch and roll of the VTOL aircraft 100. The VTOL aircraft 100 initiates the forward-flight mode 206 once airspeed of the VTOL aircraft 100 has reached a threshold airspeed and the wings provide lift. In some embodiments, the thrust from one or more of the rotor units 116 may be significantly reduced once the VTOL aircraft 100 begins operation in the forward-flight mode because the lift provided by the wings may replace the lift generated by the rotor units 116 during the hover mode 202 and during the transition mode 204.

In the forward flight mode 206, the rotor units 116 may operate in a push-pull capacity to generate thrust and propel the aircraft forward. In the forward flight mode 206, the rotor units may provide directed thrust under control of the operator and/or the control management system. The directed thrust may increase the stability of the aircraft in forward flight mode.

Figure 3A:
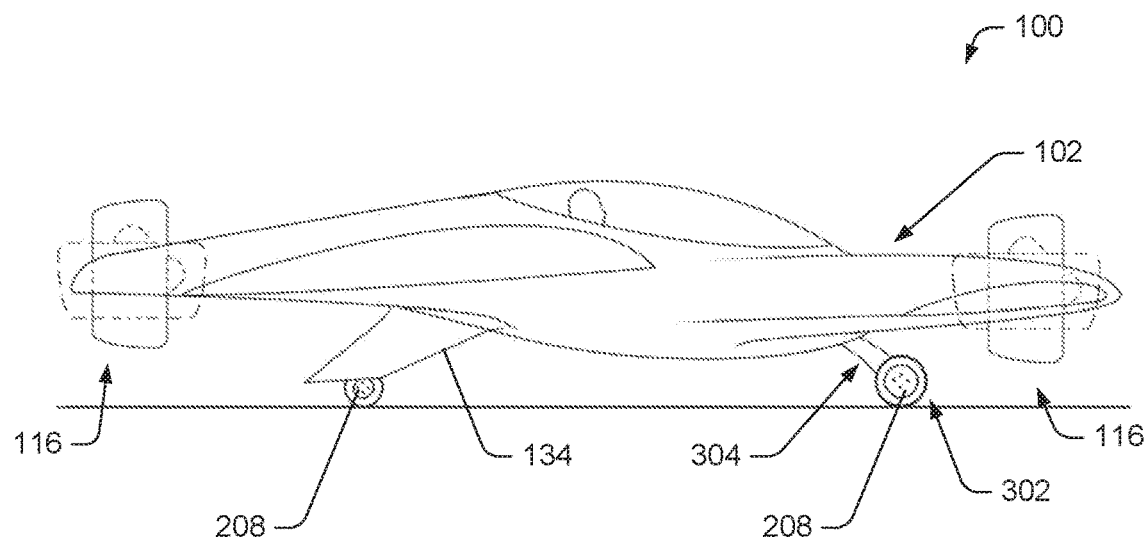
FIG. 3A is a side elevation view of an illustrative VTOL aircraft with extended landing gear.

FIGS. 3A-3D show the illustrative VTOL aircraft 100 in various operational modes. FIG. 3A is a side elevation view of an illustrative VTOL aircraft with extended landing gear. The VTOL aircraft 100 may include the landing gear 208 that is fixed or retractable. The aft landing gear may be coupled to the ventral fins 134. The landing gear may be implemented as in a tricycle-style configuration that includes two aft struts and one fore strut which may or may not be retractable after take-off in order to reduce drag. However, other configurations of the landing gear 208 may be used depending on the type of wings used in the VTOL aircraft 100. For example, when the VTOL aircraft 100 is configured with the fore wing 122 as a main wing, then the landing gear may include two fore struts and one aft strut (tail dragging configuration).

The fore wheel 302 may extend and retract from the fuselage 102. The fore wheel 302 may include a fore strut 304 that provides some shock absorption for the fore wheel 302. In some embodiments, the ventral fins 134 may be coupled to an aft strut or may act as the aft strut.

FIG. 3A also shows the rotation of the rotor units 116, thereby enabling the transition from hover mode 202 to forward flight mode 206, and vice versa, as described above. FIG. 3A also shows a rotor unit configuration whereby conventional launches and landings may be accomplished, as the rotating ducts are clear of the ground plane in forward flight mode.

Figure 3B:
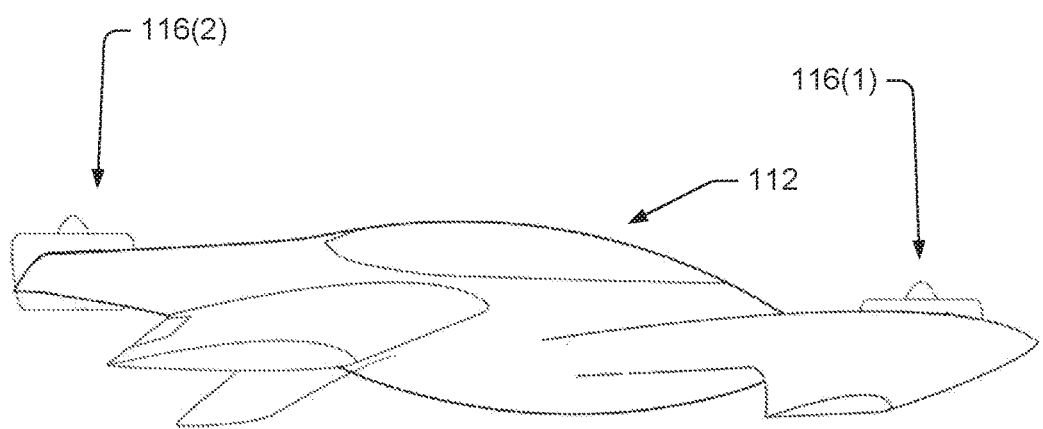
FIG. 3B is a side elevation view of an illustrative VTOL aircraft in vertical (hover) flight mode.

FIG. 3B is a side elevation view of the illustrative VTOL aircraft 100 in the hover mode 202. FIG. 3B shows the fore rotor unit 116(1) being located on a lower plane than the aft rotor unit 116(2). However, the fore rotor unit 116(1) may be located on a higher plane or a same plane as the aft rotor unit 116(2). Turbulent airflow from the fore rotor unit 116(1) may be at least partially diverted away from the aft rotor unit based on the placement of the rotor units with respect to the fuselage while the rotor units 116 are still situated along the longitudinal axis 118. The diversion of airflow allows more undisturbed air to reach the aft rotor unit 116(2), possibly increasing an efficiency of the aft rotor unit 116(2).

As previously discussed, the VTOL aircraft 100 may include a cockpit 112 mounted on the top side 108 of the fuselage 102. The cockpit 112 may includes space for an operator to sit for manned flight. The cockpit 112 may include hardware, controls, the control management system (or portions thereof), and/or other control, navigational, or flight equipment. In some embodiments, the VTOL aircraft 100 may be equipped for unmanned flight, and therefore may or may not include the cockpit 112.

FIG. 3C is a side elevation view of an illustrative VTOL aircraft 100 shown in FIG. 3B and shows airflow 306 through the rotor units 116 during vertical flight in the hover mode 202. The airflow 306 may create a low pressure volume 308 above the rotor units 116 and a high pressure volume 310 below the rotor units 116. The low pressure volume 308 sustains flight by drawing the respective portion of the aircraft toward the low pressure volume 308. The low pressure volume 308 and the high pressure volume 310 create a pressure differential across the airflow 306. The pressure differential creates the lift needed to keep the aircraft airborne, while the rotor units 116 move air to create thrust. The higher location of the low pressure volume 308 provides stability to flight of the VTOL aircraft 100 that is akin to attachment of ends of a hammock that create stability to a body supported by the hammock. A low center of mass 312 relative to the pressure centers 314 of the rotor units creates inherent stability via the pendulum effect.

The airflow 306 through the rotor units 116 lifts the VTOL aircraft 100 into a hover. The airflow 306 is determined based in part on a speed of rotation of the rotors 116, a pitch of the blades in the rotor units, and other factors. The rotors 116 may rotate at a same speed during hover, or they may rotate at a different speed during hover. The speed of each of the rotors 116 is determined by the control management system based on operator input and sensor input of stability augmentation sensors. The fore rotor unit 116(1) and the aft rotor unit 116(2) may be the same size or may be different sizes. The rotor units 116 produce enough lift to maintain a hover in and out of ground effect.

FIG. 3D is a side elevation view of the illustrative VTOL aircraft 100 in the forward flight mode 206 and shows airflow 316 through the rotor units 116 during forward flight. As the operator directs, the VTOL aircraft 100 may transition from the hover mode 200 to the forward-flight mode 206. The airflow 316 includes a boundary airflow having some laminar and some turbulent airflow. Various considerations may be employed to reduce turbulent airflow into the aft rotor unit 116(2). Vanes may be added to wings and/or the fuselage 102 (or other locations) to provide laminar airflow to the aft rotor unit 116(2). A dissipation mechanism may divert turbulent air away from the aft rotor unit 116(2).

In some embodiments, forward flight may be powered by a single rotor unit, such as the fore rotor unit 116(1), which may negate a desire to reduce turbulent airflow in some regions around the VTOL aircraft 100 during forward flight.

In the forward flight mode 206, the rotor units 116 provide thrust that is directed substantially parallel to the flight path. The rotor units 116 may operate in a push-pull capacity, with the aft rotor unit 116(2) pushing the aircraft forward, and the fore rotor unit 116(1) pulling the aircraft forward. The forward-flight airflow generates a pressure differential between the top of the aircraft, fuselage and wings, and the bottom. The pressure differential creates the lift needed to keep the aircraft airborne, while the rotor units push and pull the air through to create thrust for forward movement. In various embodiments, the lift may be generated largely by the wings during flight in forward-flight mode 206 while the lift may be largely or solely generated by thrust of the rotor units 116 during flight in the hover mode 202.

Figure 4:
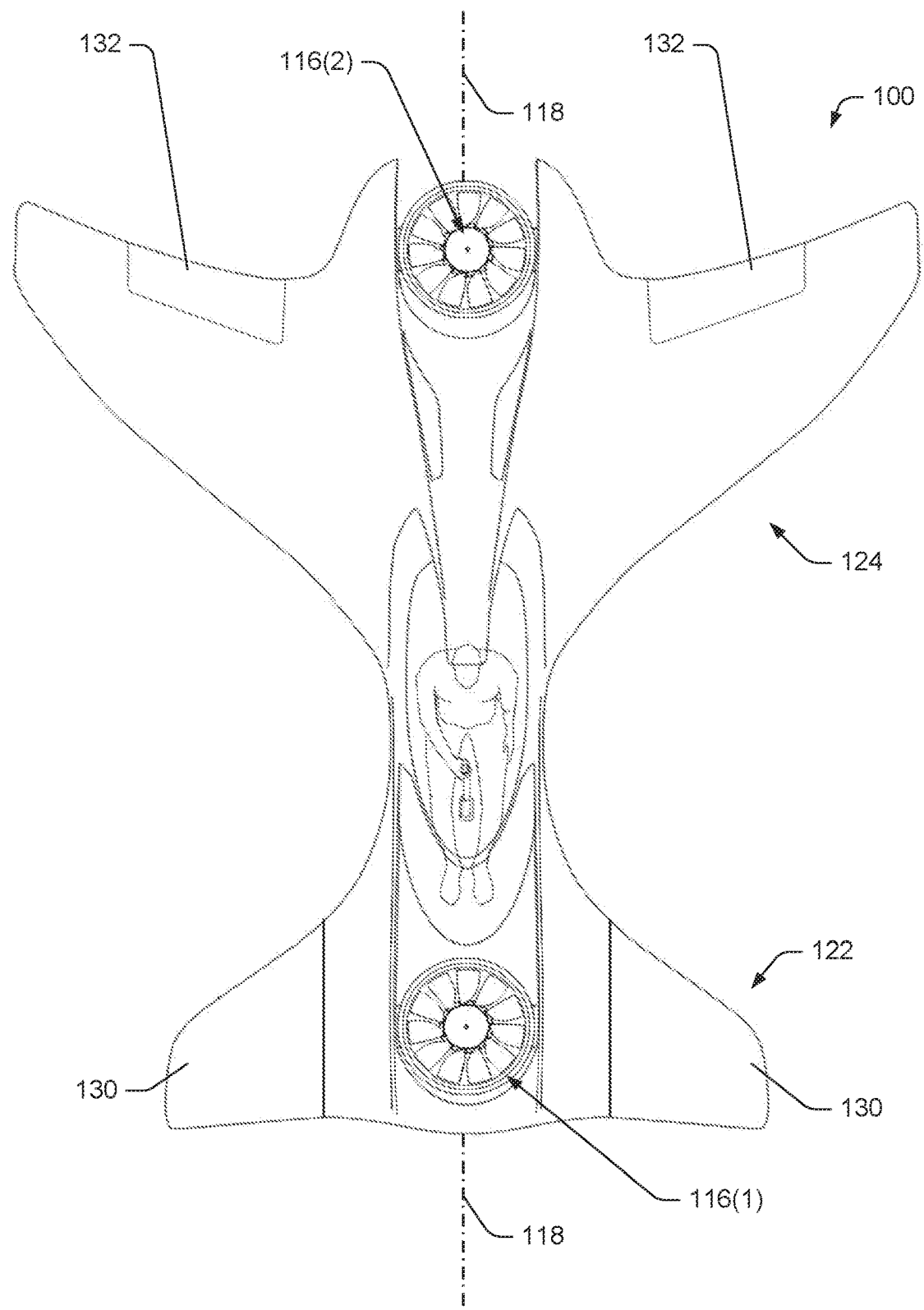
FIG. 4 is a top view of the illustrative VTOL aircraft shown in FIG. 3B.

FIG. 4 is a top view of the illustrative VTOL aircraft 100 shown in FIG. 3B and shows the rotor units 116 in the hover mode 202. The VTOL aircraft 100 is shown with the fore wing 122 as a canard wing and the aft wing 124 as a delta wing that is a main wing. The rotor units 116 are aligned with the longitudinal axis 118. In some embodiments, the fore wing 122 may include the fore control surfaces 130 that rotate an entire portion of the fore wing. However, the fore wing 122 may employ traditional ailerons and/or other control surfaces, vanes, and/or other air directing features.

Figure 5:
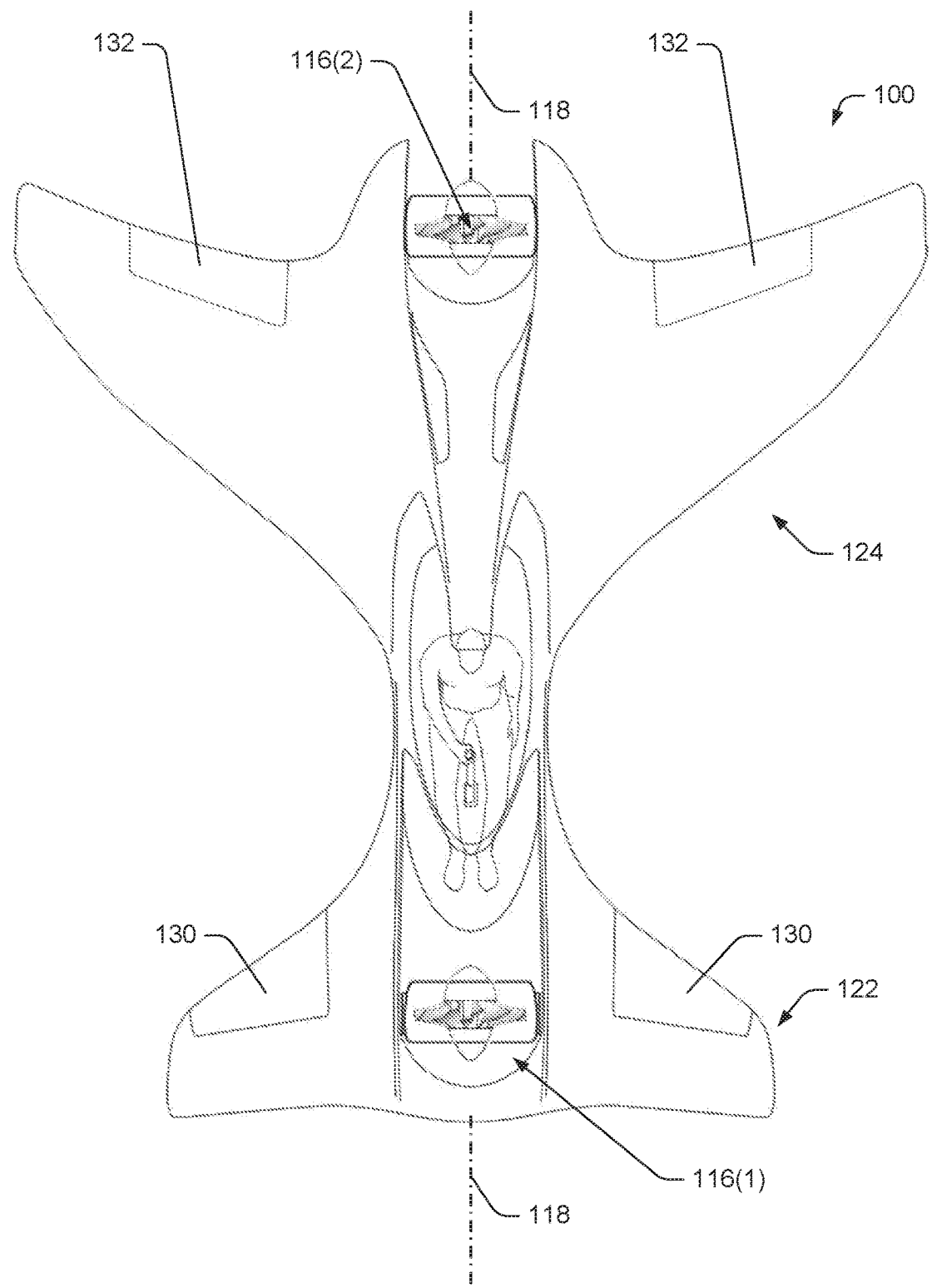
FIG. 5 is a top view of the illustrative VTOL aircraft shown in FIG. 1A.

FIG. 5 is a top view of the illustrative VTOL aircraft shown in FIG. 1A. The VTOL aircraft 100 is shown with the rotor units 116 in the forward-flight mode 206. The fore control surfaces 130 show a configuration with traditional ailerons.

Figure 6A:
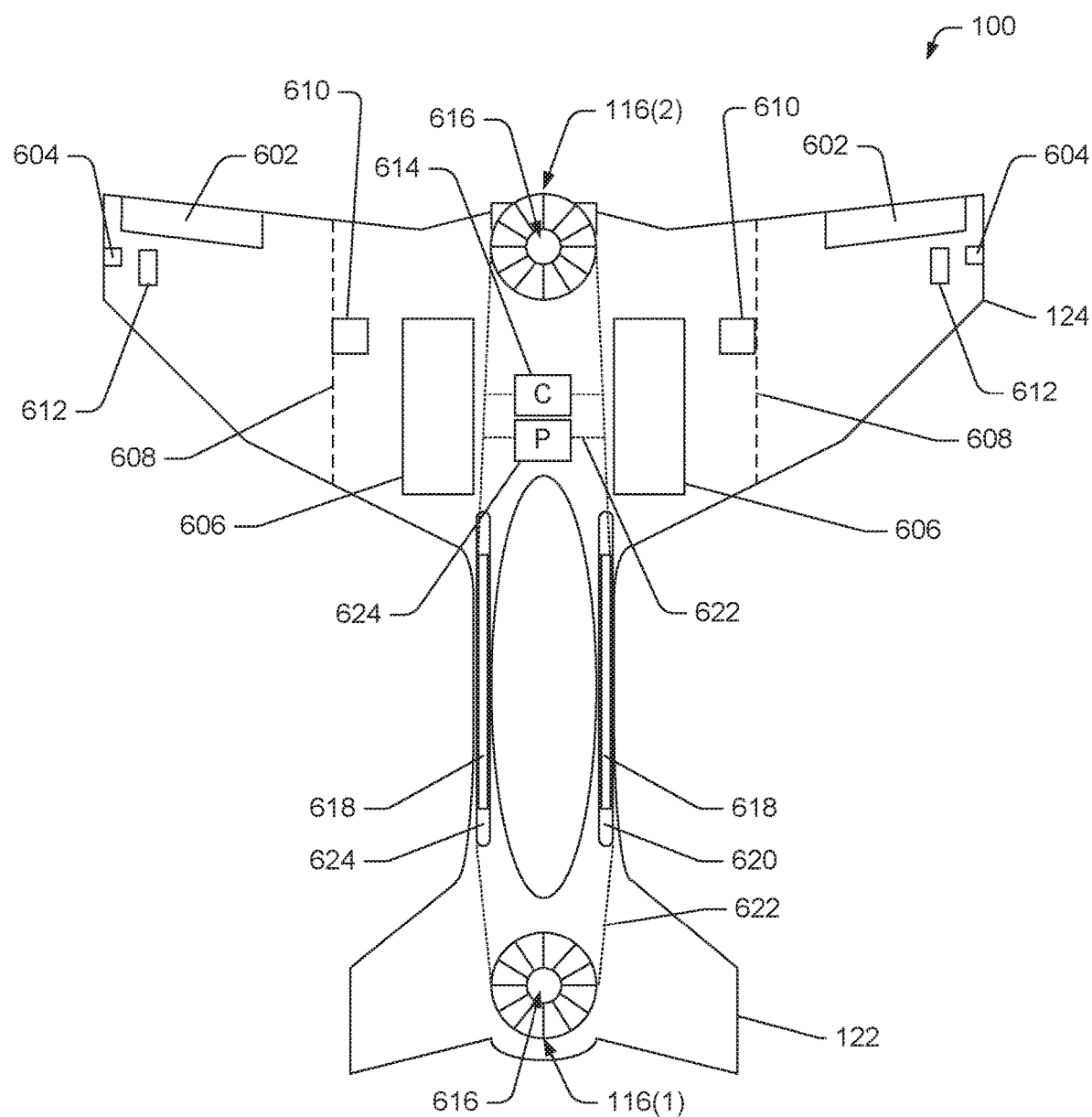
FIGS. 6A and 6B are top views of the illustrative VTOL aircraft shown in FIG. 3B and show various components that may be selectively included in the VTOL aircraft.

FIG. 6A is a top view of the illustrative VTOL aircraft 100 shown in FIG. 3B and shows various components and compartments including control services and storage compartments. The VTOL aircraft 100 may include some or all of the features described below, in accordance with various embodiments.

The aft wing 124 may be a main wing and may provide a lifting surface during flight in the forward-flight mode 206. The aft wing 124 may include ailerons 602, which provide roll control during flight in the forward-flight mode 206 and possibly during flight in the transition mode 204. In some embodiments, the aft wing 124 may include flaps or flaperons for speed and roll control during flight in the forward-flight mode 206 and possibly during flight in the transition mode 204.

In some embodiments, the aft wing 124 may include wing tip thrusters 604 to provide roll stability during flight in the hover mode 202 and possibly during flight in the transition mode 204. The wing tip thrusters 604 may comprise an exhaust connected to compressed air, which releases high pressure air downward, substantially perpendicular to the aft wing 124. In some embodiments, the wing tip thrusters may be electrically driven rotors mounted in the aft wing 124 and/or possibly mounted on the fore wing 122, which is described in more detail with reference to FIG. 16.

The aft wing 124 may include a storage compartment 606 for storing compressed air, extra batteries, hardware, personal items, and/or other payload. The aft wing 124 may comprise a hinge 608 that enables folding of the aft wing 124 during storage of the VTOL aircraft 100. The hinge 608 may enable folding an outer section of the wing against or toward an inner section of the wing (or vertically) to reduce a width of the aft wing 124. A folding mechanism 610 may be used to transition the wing from a folded position to a flight position (via rotation about the hinge 608). The folding mechanism 610 may include a motor to aid in lifting the outer section of the aft wing 124. The folding mechanism 610 may lock and unlock the aft wing 124. The folding mechanism 610 may transmit a signal to indicate whether the aft wing 124 is locked or unlocked and/or folded or not folded. The hinge 608 and the folding mechanism 610 may be implemented on the fore wing 122. For example, when the fore wing 122 is the main wing, then the hinge 608 and the folding mechanism may be located on the fore wing 122.

In accordance with one or more embodiments, the VTOL aircraft 100 may include one or more stability augmentation sensors 612 that monitor a position, angle, acceleration, and/or orientation of a portion of the VTOL aircraft. For example, the stability augmentation sensors 612 may comprise gyroscopes and/or accelerometers that monitor the pitch, roll, and yaw of the VTOL aircraft 100, and changes of each over time. The stability augmentation sensors 612 may provide input via signals to a control management system 614.

The control management system 614 may process the signals from the stability augmentation sensors 612, as well as input from an operator (pilot) via operator controls, to determine how to direct and power the rotor units 116 to maintain flight in the hover mode 202, the transition mode 204, and the forward-flight mode 206. For example, the stability augmentation sensors 612 may detect a sudden tilt of the aircraft due to a gust of wind or other force exerted on the VTOL aircraft 100. In response, the stability augmentation sensors 612 may transmit a signal to the control management system 614. The control management system 614 may cause repositioning of one or more of the rotor units 116 to cause the one or more rotor units to direct a thrust to counter the force of the wind, etc., and thus stabilize flight of the VTOL aircraft 100. Meanwhile, the control management system 614 may also process commands from the operator. The control management system 614 may prioritize control input from the stability augmentation sensors 612 and the operator to maintain stable flight. For example, when an operator provides a command that may compromise sustained flight, the control management system 614 may ignore the command and/or only execute the command for a limited duration before issuing another command (possibly in response to a signal from the stability augmentation sensors 612) to take action to sustain flight.

The operator, using flight controls, sends input signals to the control management system 614. In turn, the control management system receives the signals from the flight controls and/or the stability augmentation sensors 612. The control management system 614 prioritizes the inputs from the stability augmentation sensors 612 and inputs from the operator and then adjusts a direction/orientation and/or power level of each rotor unit. The control management system 614 may also determine the position of the ailerons 602 and/or other control services for roll control during flight in the forward-flight mode 206 and possibly during flight in the transition mode 204. However, in some embodiments, the ailerons 602 and/or other control services may be controlled mechanically, such as by use of cables and levers, and thus bypass use of the control management system 614. During flight in the hover mode 202, the control management system 614 may send signals to the wing tip thrusters 604 to provide for directed thrust to cause or counter roll control.

The rotors 116 may be driven by electric motors 616 located at a hub of each of the rotors 116. The electric motors 616 may be brushless magnet motors. The electric motors 616 may be powered by one or more battery in a battery set 618. The battery set 618 may be implemented using one or more cells that are placed in one or more locations in the VTOL aircraft 100. Placement of the battery or batteries may include consideration of a distribution of a payload such that the center of mass is substantially near a midpoint between the rotor units. Thus, the battery or batteries may be placed in other locations throughout the VTOL aircraft to distribute the weight of the battery or batteries. The battery 118 may be in fluid communication with a cooling duct 620, which may pass external air and/or fluid past the battery 118 to reduce heat generated by the battery 118. A wiring grid 622 may connect the battery set 618, the control management system 614, and a power management system 624.

The power management system 624 may determine, monitor, and manage battery power of the battery set 618. The power management system 624 may communicate battery power and/or other information to the control management system 614, which may then use this information when determining how to control the VTOL aircraft (e.g., determining direction and amount of thrust, transmitting warning messages to an operator, causing and/or preventing modes of flight, etc.). For example, when the power management system 624 indicates that the battery power is depleted or close to being depleted (e.g., past a threshold amount), the control management system 614 may provide a signal to the operator to land the VTOL aircraft using an airstrip while sustaining flight in the forward-flight mode 206 because the battery set 618 may not be capable of powering the rotor units 116 to provide sustained flight in the hover mode 202.

In some embodiments, the power management system 624 may provide for the operator to choose a power conservation mode, in which one rotor provides all of the thrust for the aircraft in a pull mode (e.g., the fore rotor unit 116(1)) or a push mode (e.g., using the aft rotor unit 116(2)).

Figure 6B:
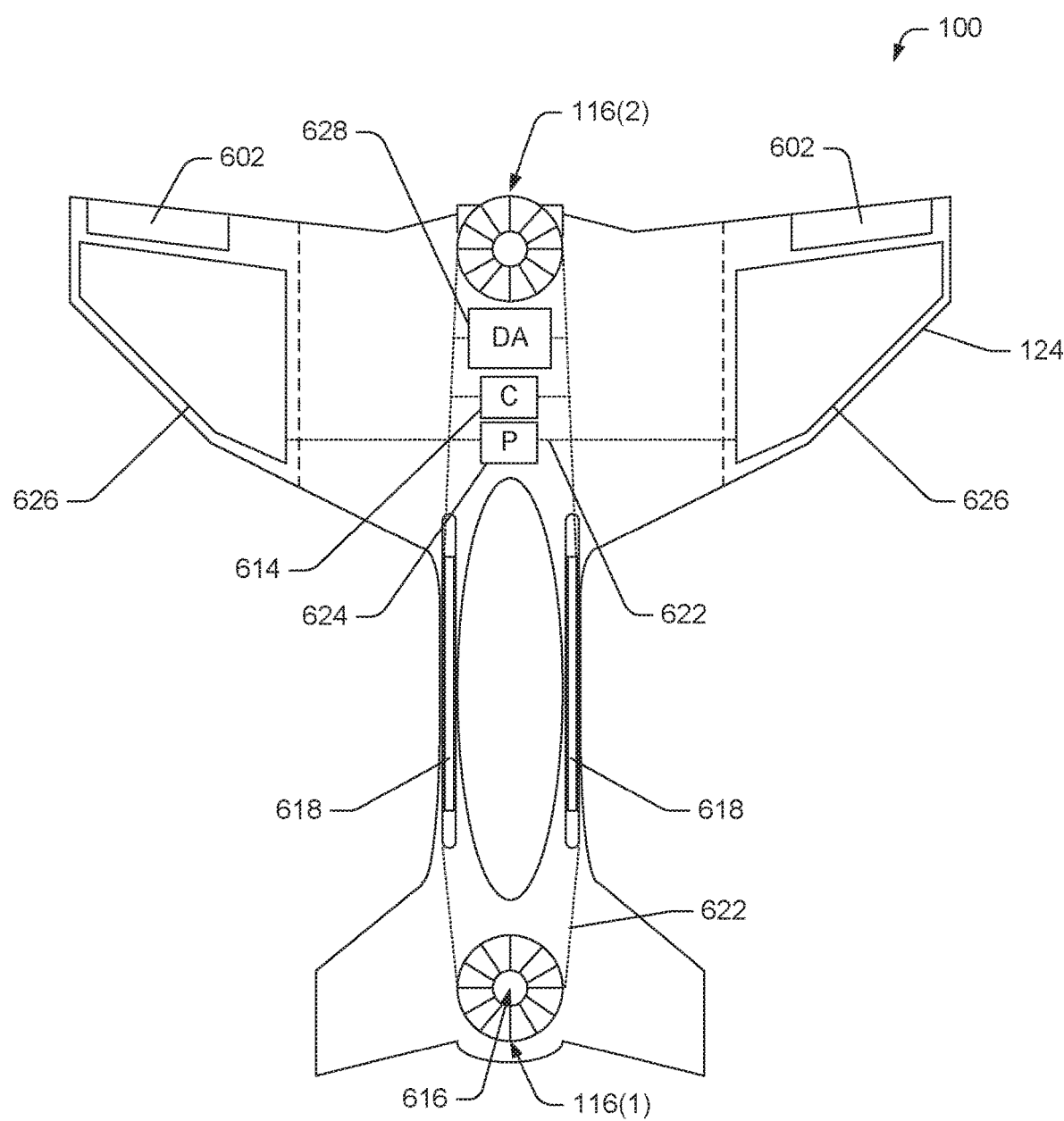

FIG. 6B is a top view of the illustrative VTOL aircraft 100 shown in FIG. 6A and shows various components to provide reserve and/or emergency power. The various components may be selectively included and/or used to provide power to the electric motors 616 and/or charge the battery set 618.

In accordance with some embodiments, the VTOL aircraft 100 may be equipped with solar cells 626 in communication with the power management system 624 via the wiring grid 622. The solar cells 626 may enable charging the battery set 618 while the VTOL aircraft is in flight and/or while the VTOL aircraft 100 is not in flight (e.g., stored in a sunny spot, etc.). The solar cells 626 may be mounted on the main wings (e.g., the aft wing 124 in FIG. 6B). However, the solar cells 626 may be mounted on any surface of the VTOL aircraft 100, or the solar cells (709) may be integrated in at least a portion of the skin of the VTOL aircraft 100.

In various embodiments, the VTOL aircraft may include a drag alternator 628 that deploys a fan, blade, or wing. The fan, blade or wing may cause motion which may in turn cause the drag alternator to generate a current. The drag alternator 628 may be in communication with the battery 118 and the power management system 624 via the wiring grid 622. The current generated by the drag alternator 628 may be used to charge the battery set 618. The fan, blade, or wing of the drag alternator may be stored within the aircraft skin when not in use to negate drag. Upon signal from the operator, the power management system 624, and/or the control management system 614, the fan, blade, or wing may be deployed to generate the current that may be converted to DC power to charge the battery set 618. Use of the drag alternator may be reserved to emergency situations where the VTOL aircraft is able to deploy the drag alternator 628 during glided flight or other situations where the additional drag from the fan, blade, or wing does not hinder flight of the VTOL aircraft 100.

Figure 7:
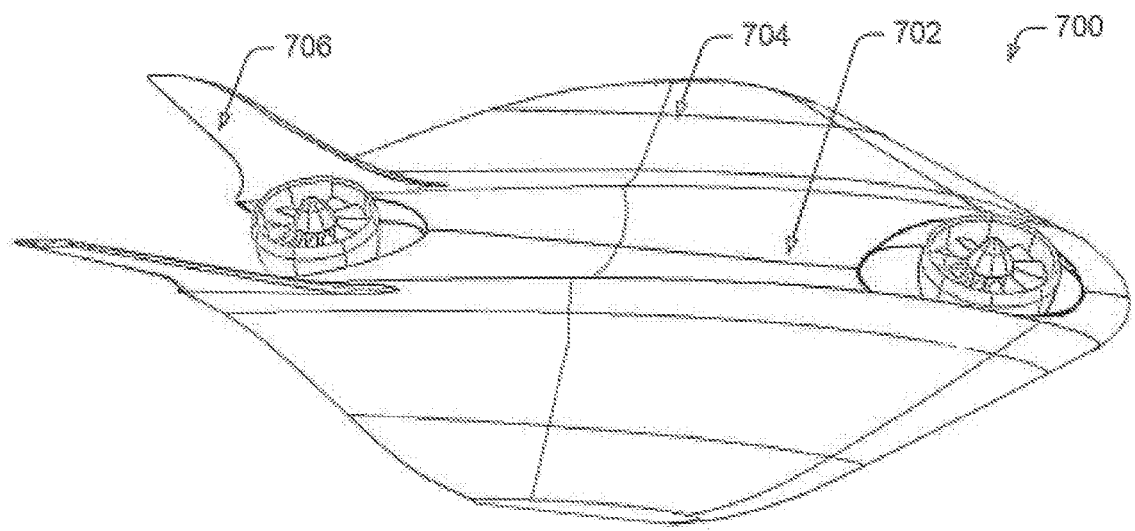
FIG. 7 is a perspective view of a VTOL unmanned aerial vehicle (UAV).

FIG. 7 is a perspective view of a VTOL unmanned aerial vehicle (UAV) 700. The VTOL UAV 700 may include a recessed fuselage 702 located between one or more wings. In some embodiments, the VTOL UAV 700 may include a single wing 704 (e.g., an ovular-shaped wing surrounding the recessed fuselage 702) and one or more stabilizers 706 to reduce aerodynamic side slip and increase directional stability in forward flight. However, the VTOL UAV 700 may only differ from the VTOL aircraft 100 in that the VTOL UAV 700 does not include a cockpit and operator controls located within the aircraft. The VTOL UAV 700 may include a control management system that may or may not receive input from an operator that is located remote from the VTOL UAV 700. The VTOL UAV 700 may include a monocoque structure, made of carbon fiber, titanium, aluminum, or any other material appropriate for an aircraft frame. In some embodiments, the structure may be a semi-monocoque design, with a shell and longerons made of carbon fiber, titanium, aluminum, or any other material appropriate for an aircraft frame. The skin is a low friction surface that may include built-in solar cells, as discussed above.

Figure 8:
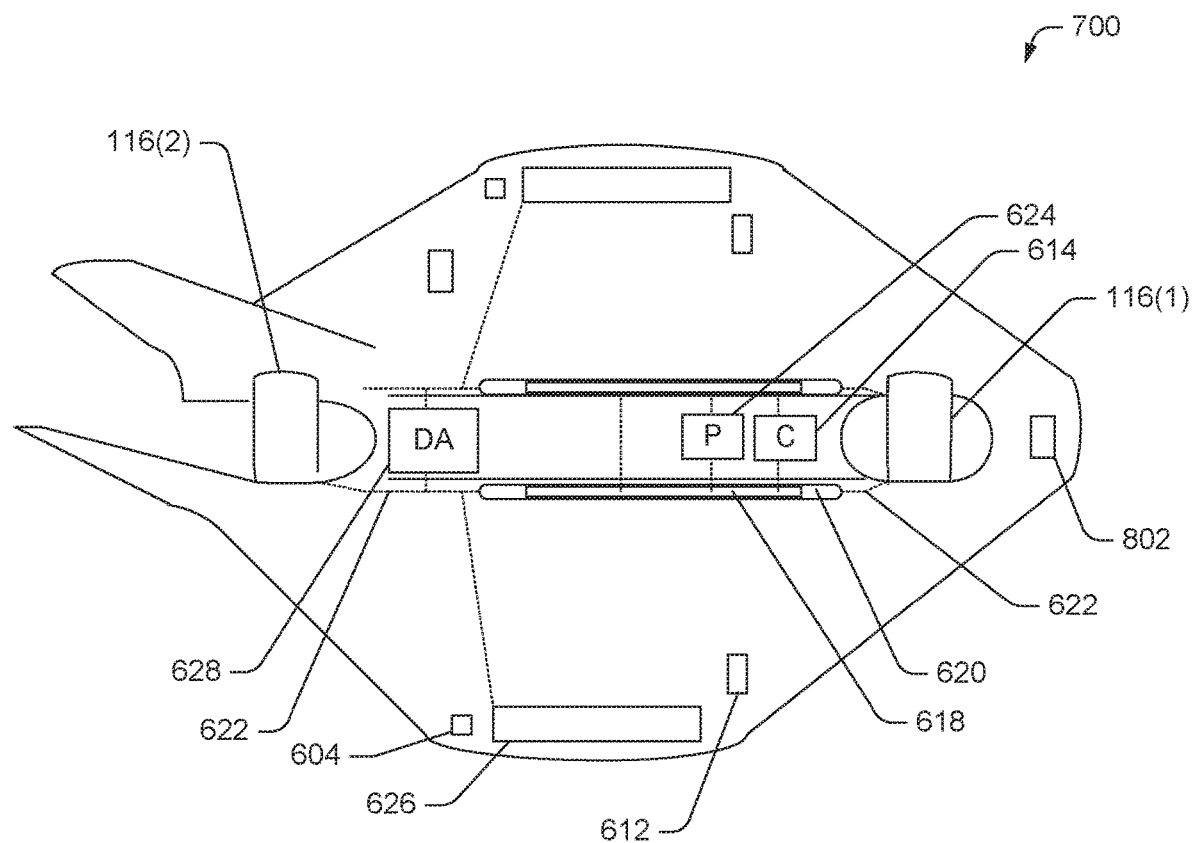
FIG. 8 is a top view of the illustrative VTOL UAV shown in FIG. 7 and shows various components and compartments including locations of batteries and storage compartments.

FIG. 8 is a top view of the illustrative VTOL UAV 700 shown in FIG. 7 and shows various components and compartments including locations of batteries and storage compartments. The VTOL UAV 700 includes the rotor units 116 that produce thrust for propulsion in a push-pull configuration. The rotor units 116 and/or other components may be configured in a similar manner as discussed above with reference to the VTOL aircraft 100. For example, the VTOL UAV 700 may include one or more of the wing tip thrusters 604, the stability augmentation sensors 612, the control management system 614, the electric motors 616, the battery set 618, the cooling duct 620, the wiring grid 622, the power management system 624, the solar cells 626, and/or the drag alternator 628.

In some embodiments, the VTOL UAV 700 may include surveillance and/or operational components 802, such as a plurality of cameras. For example, a camera may be located on the bottom of the fuselage and be capable of viewing objects, landscape, and so forth below the VTOL UAV 700. Another camera (or the same camera, may be able to view objects, landscape, and so forth in front of and/or behind the aircraft. Other cameras and/or surveillance components (e.g., radios, thermo sensors, etc.) may be employed by the VTOL UAV 700. The surveillance and/or operational components 802 may transmit signals to the operator or other person or device located remote from the VTOL UAV 700 via transmission of data using a radio, optics, or other transmission techniques.

Figure 9A:
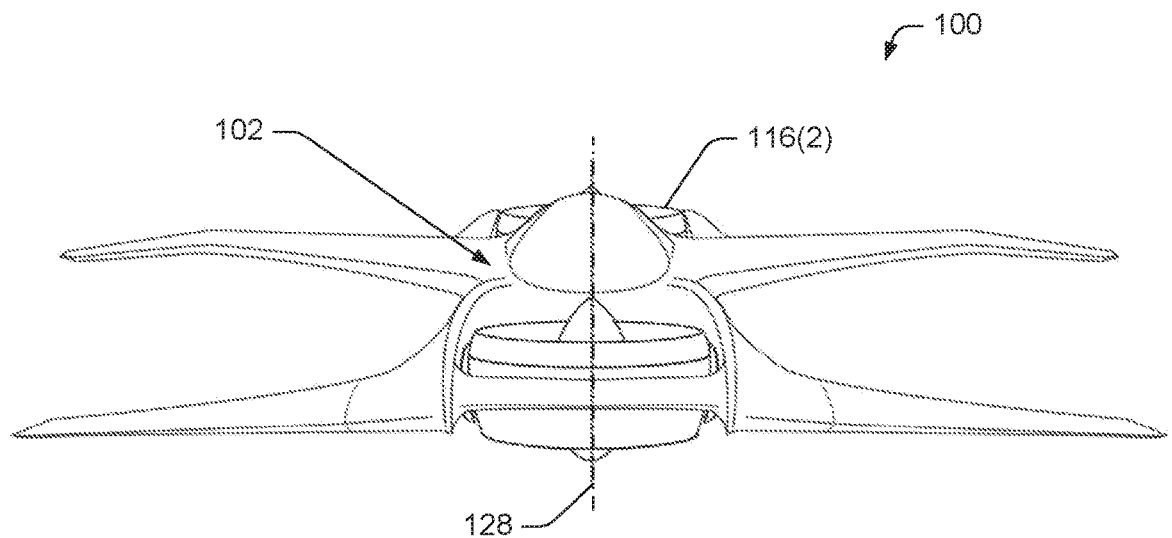
FIG. 9A is a front elevation view of the illustrative VTOL aircraft shown in FIG. 3B and shows the fore rotor unit and aft rotor unit configured to provide thrust in a direction of a vertical axis that bisects the aircraft in symmetrical halves.

FIG. 9A is a front elevation view of the illustrative VTOL aircraft 100 shown in FIG. 3B and shows the fore rotor 116(1) configured to provide thrust in a direction of the vertical axis 128 that bisects the fuselage 102 in symmetrical halves. Thrust from the fore rotor unit 116(1) is directed substantially parallel to the vertical axis 128.

Figure 9B:
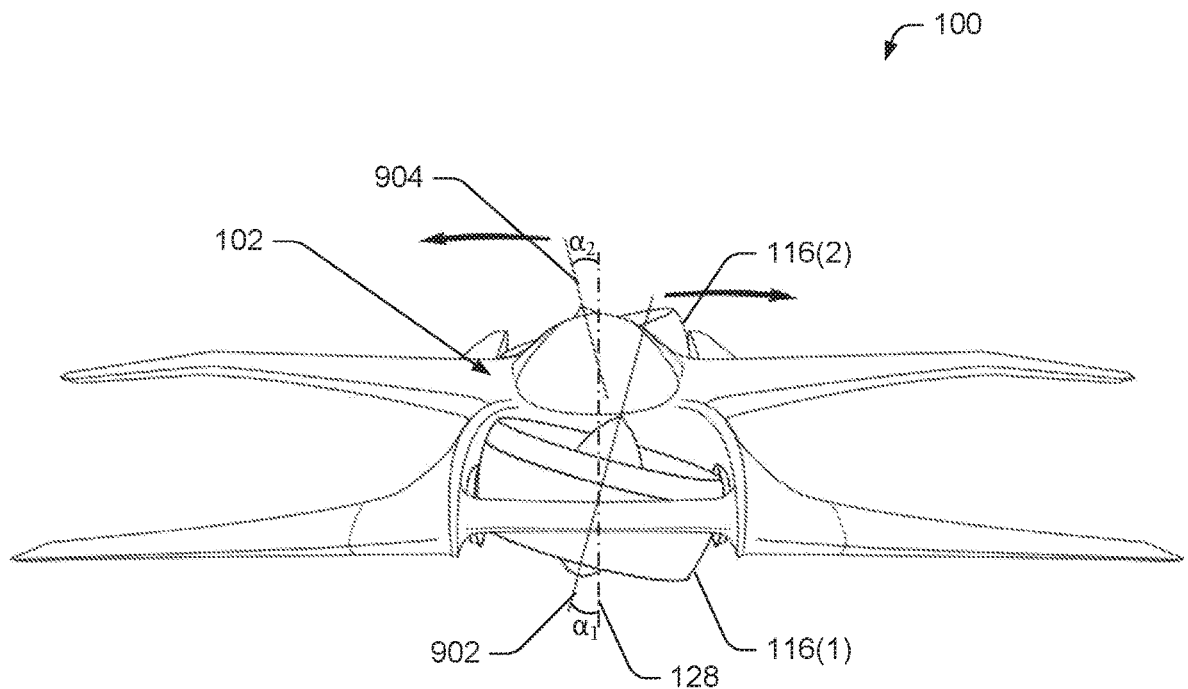
FIG. 9B is a front elevation view of the illustrative VTOL aircraft shown in FIG. 3B and shows the fore rotor unit and aft rotor unit configured to provide thrust in a direction having an angle $\alpha$ from a vertical axis that bisects the aircraft in symmetrical halves.

FIG. 9B is a front elevation view of the illustrative VTOL aircraft 100 shown in FIG. 9A and shows the fore rotor 116(1) configured to provide thrust in a direction having an angle $\alpha_1$ between a fore rotor unit thrust axis 902 and the vertical axis 128 that bisects the aircraft in symmetrical halves. The rotor unit thrust axis 902 is parallel to a direction of thrust generated by the fore rotor unit 116(1). The aft rotor 116(2) may be configured to provide thrust in a direction having an angle α2 between an aft rotor unit thrust axis 904 and the vertical axis 128. As discussed above, the control management system 614 may cause the rotor units to move via the rotating chassis 120 to provide stabilized flight in response to signals from the stability augmentation sensors 612 and/or inputs from an operator. Thus, the rotor units 116 may move independently of one another and under control of the control management system 614 to maintain flight of the VTOL aircraft 100. The freedom of movement of the rotor units described herein aids in maintaining stable flight in the hover mode 202.

Figure 9C:
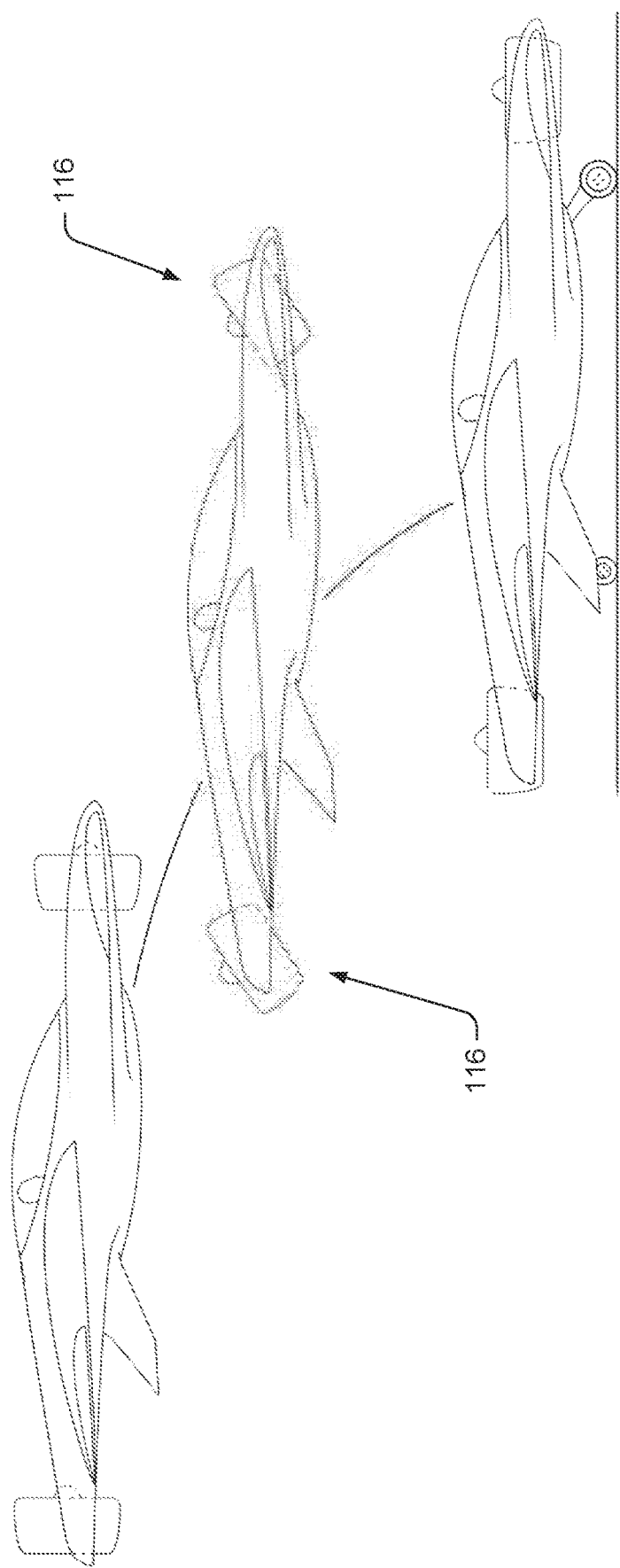
FIG. 9C is a schematic diagram showing a transition of flight of an illustrative VTOL aircraft using the rotor units as an air-brake.

FIG. 9C shows the rotor units rotated negatively beyond 90 degrees to rapidly slow the aircraft prior to landing. In this configuration, the thrust generated from the rotor units is directed in the direction of flight, thereby slowing the forward airspeed of the aircraft.

Figure 10:
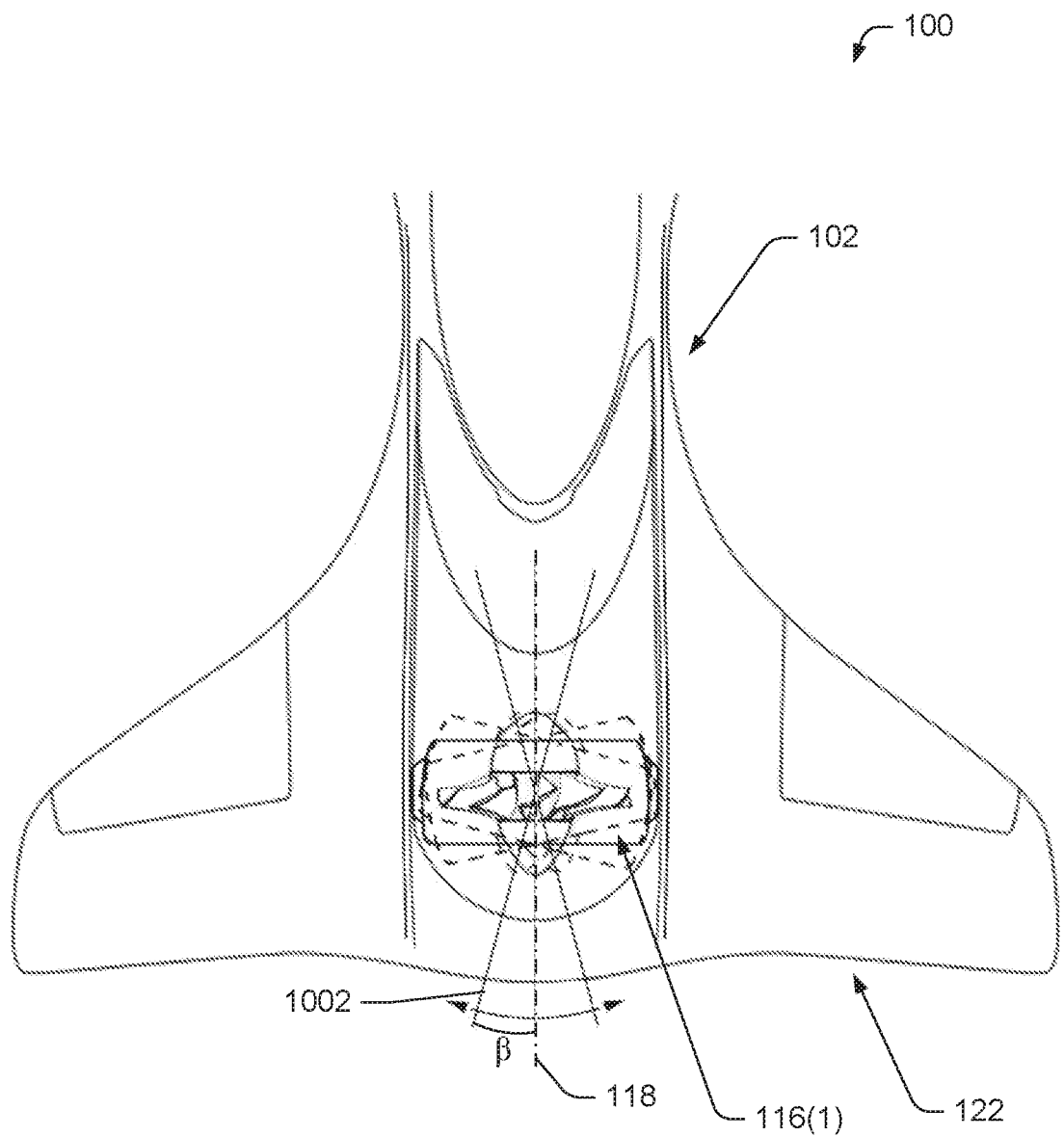
FIG. 10 is a partial top view of the illustrative VTOL aircraft shown in FIG. 1A and shows the fore rotor unit configured to provide directed thrust in a direction between an angle $\beta$ from a longitudinal axis of the fuselage.

FIG. 10 is a partial top view of the illustrative VTOL aircraft 100 shown in FIG. 1A and shows the fore rotor 116(1) configured to provide directed thrust in a direction between an angle β between the fore rotor unit thrust axis 1002 and the longitudinal axis 118 of the fuselage 102. As discussed above, the control management system 614 may cause the rotor units to move via the rotating chassis 120 to provide directed thrust in response to signals from the stability augmentation sensors 612 and/or inputs from an operator. Thus, the rotor units 116 may move independently of one another and under control of the control management system 614 to maintain flight of the VTOL aircraft 100. The freedom of movement of the rotor units described herein allows for directed thrust laterally during flight in the forward-flight mode 206 and possibly during flight in the transition mode 204.

Figure 11A:
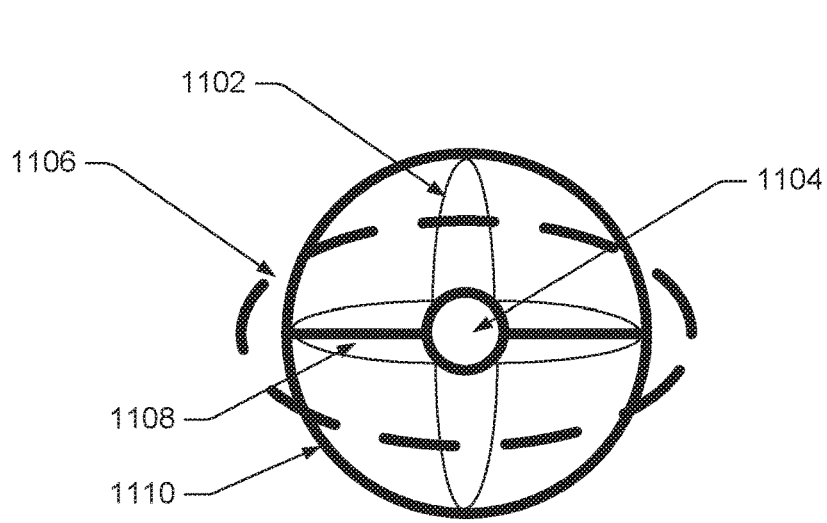
FIGS. 11A-11C are isometric views of an illustrative rotating assembly that connects a rotor to the fuselage of the illustrative VTOL aircraft.
Figure 11B:
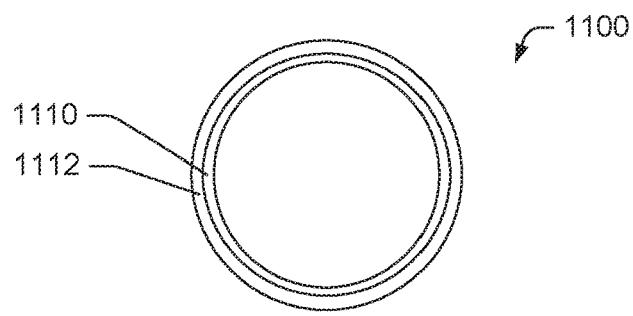
Figure 11C:
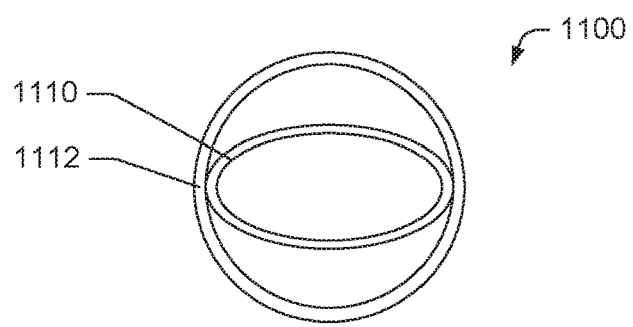

FIGS. 11A-11C are isometric views of an illustrative rotating assembly 1100 that moveably couples a rotor unit to the fuselage 102 of the illustrative VTOL aircraft 100.

FIG. 11A shows the illustrative rotating assembly 1100 including a rotor 1102 with an electric motor 1104 located at the center of the rotor unit 1102. The rotor 1102 is mounted in a rotating chassis 1106, which allows rotation about its lateral and longitudinal axes. The rotating chassis 1106 may include an inner frame 1110 connected to a beam 1108 (e.g., stator), which supports the rotor 1102 and the electric motor 1104. The dashed line depicts the rotor unit in the transition mode 204.

FIG. 11B shows the illustrative rotating assembly 1100 with an outer frame 1112 supporting the inner frame 1110. The outer frame 1112 and the inner frame 1110 are rotatable with respect to each other about the longitudinal and lateral axes, as shown in FIG. 11C. The fuselage 102 of the VTOL aircraft 100 may provide the outer frame 1112, or the outer frame 1112 may be coupled to the fuselage 102. In some embodiments, the rotating chassis may be a gimbaled chassis and/or a pivoting chassis.

Figure 12A:
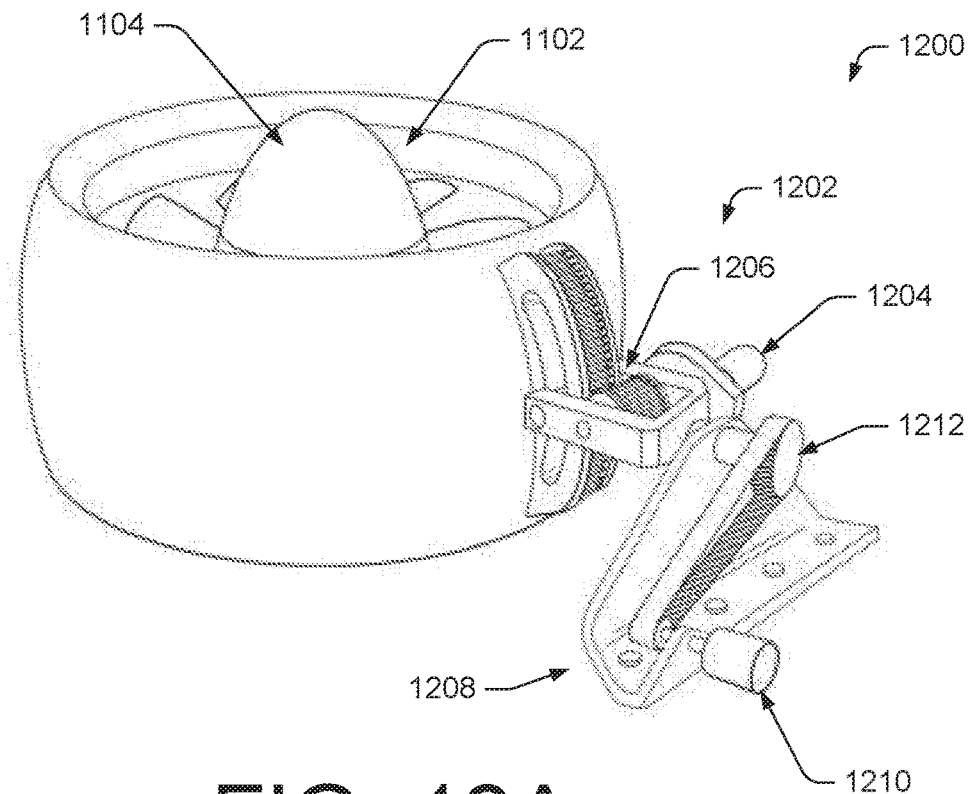
FIGS. 12A-12C are views of a rotor and illustrative apparatus to cause lateral movement of the rotor in accordance the FIGS. 9B and 10.
Figure 12B:
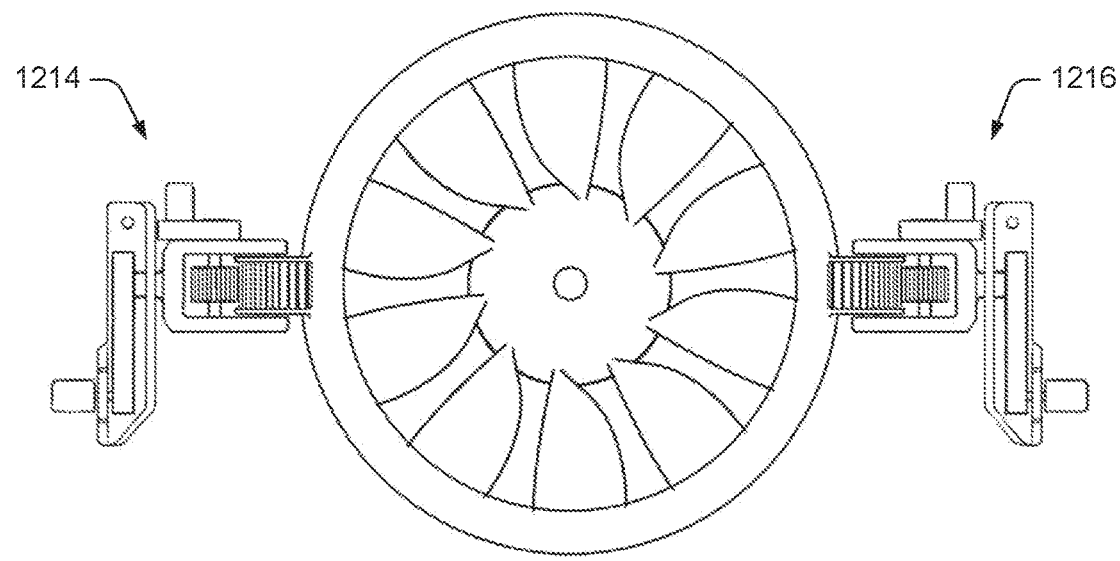
Figure 12C:
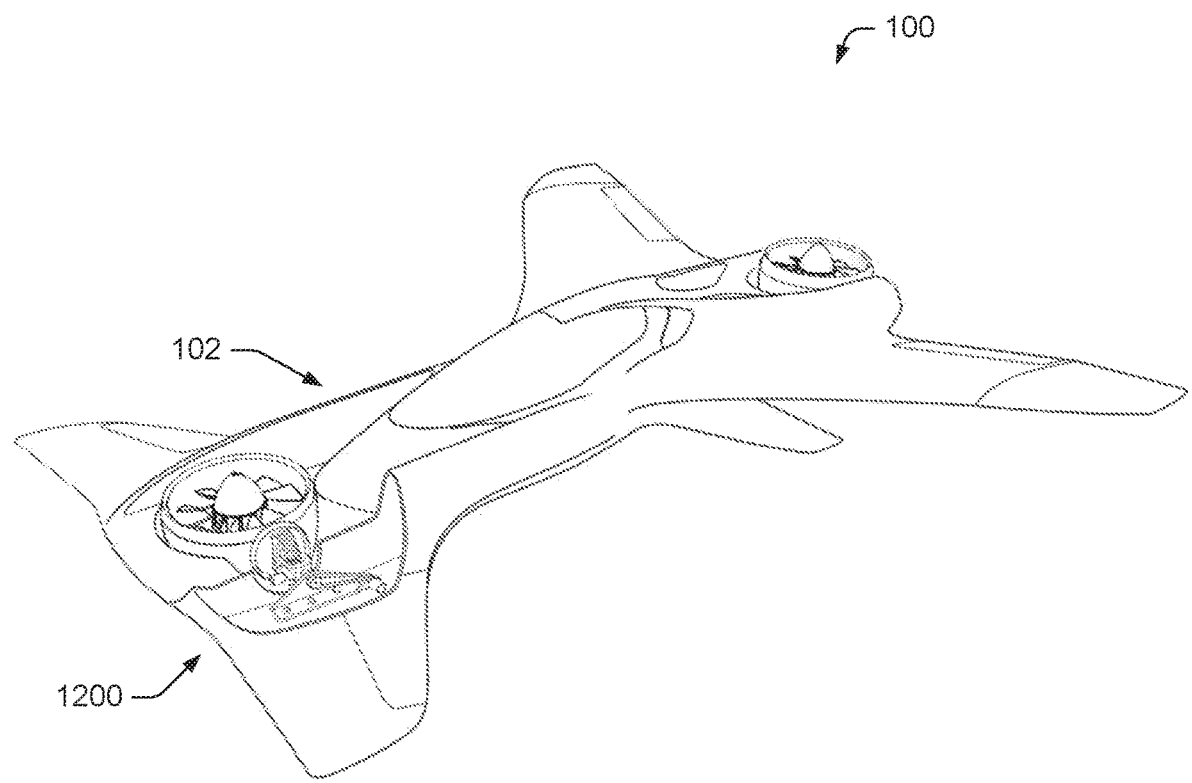

FIGS. 12A-12C are isometric views of an illustrative mechanism 1200 to cause movement of the rotor 1102 via the rotating assembly 1100 in accordance the FIGS. 9B and 10.

FIG. 12A shows a first drive assembly 1202 that includes a first motor 1204 and a gear 1206 that causes movement of the rotor unit 1102. The first drive assembly 1202 may be under control of the control management system 614, which may selectively power the first motor 1204 in either direction to cause transition of the rotor 1102 about a first axis (e.g., such as the transition shown in FIG. 9B and FIG. 10). The first drive assembly 1202 may include the inner frame 1110 described with reference to the rotating assembly 1100.

A second drive assembly 1208 may include a second motor 1210 and pulley 1212 that causes movement of the rotor 1102 for tilt control along an axis. The second drive assembly 1208 may be under control of the control management system 614, which may selectively power the second motor 1210 in either direction to cause transition of the rotor unit 1102 about a second axis (e.g., such as the transition shown in FIG. 3A). The second drive assembly 1208 may include the inner frame 1110 described with reference to the rotating assembly 1100. FIG. 12b shows a configuration that includes multiple instances of the mechanism 1200, such as a first mechanism 1214 and a second mechanism 1216. FIG. 12C shows the illustrative mechanism 1200 within the fuselage 102 of the VTOL aircraft 100.

Figure 13A:
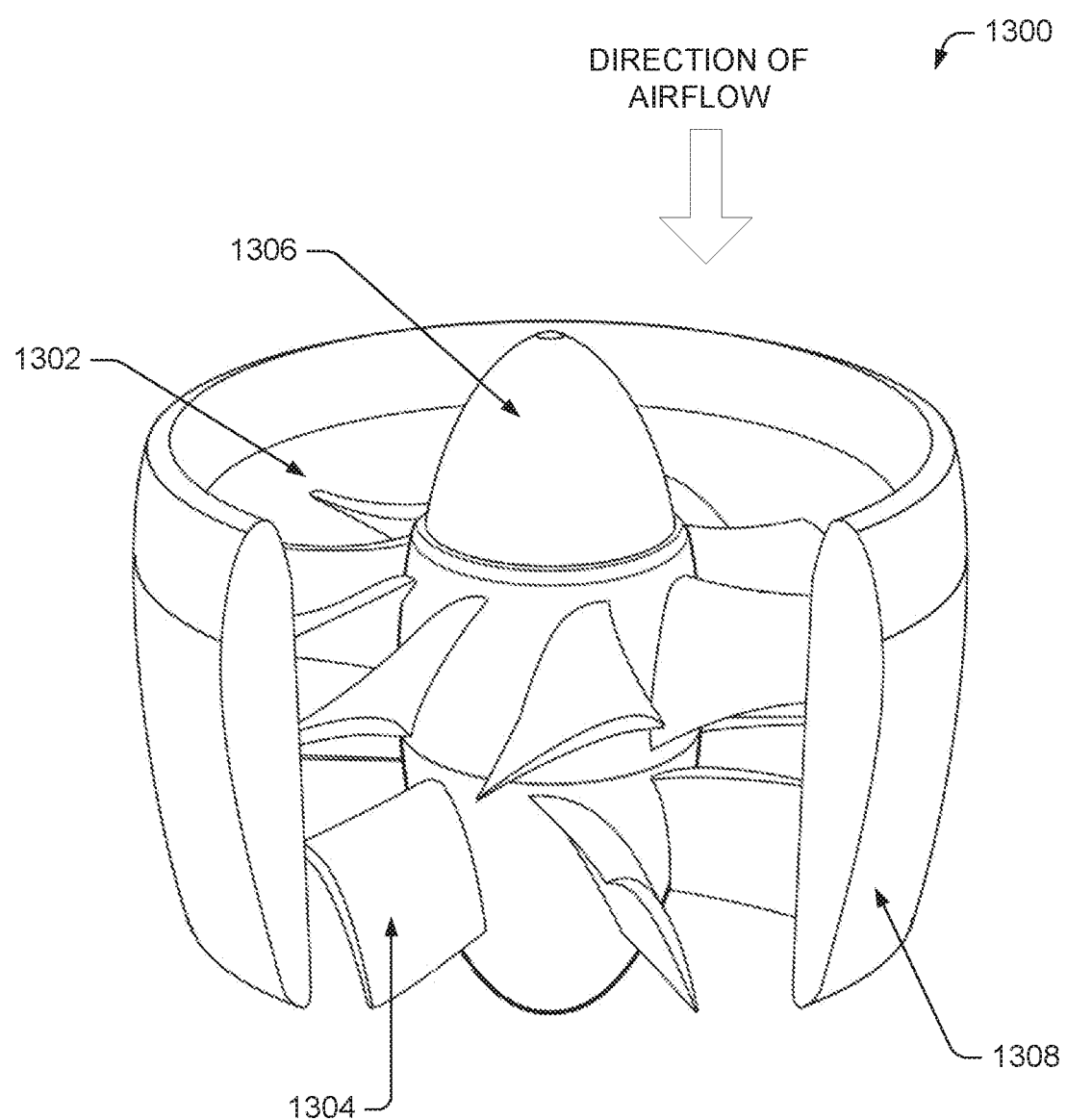
FIG. 13A is a partial cutout perspective view of an illustrative rotor unit.

FIG. 13A is a partial cutout isometric view of an illustrative rotor unit 1300. The rotor unit 1300 (also referred to herein as a rotor and/or the rotor units 116) includes a rotor vane 1302, a stator 1304, and an electric motor 1306. In some embodiments, the rotor unit 1300 may include a duct 1308, which may be a housing that directs airflow through and from the rotor unit 1300. The rotor vane 1302 may be rotated by the electric motor 1306, and pulls air through the rotor unit to produce thrust. As the air flows through the rotor unit vane 1302, a rotation is imparted on the air in the duct 1308. The stator 1304 couples the rotor unit vane 1302 and electric motor 1306 to the duct 1308 (which also acts as a housing).

guide vanes may be arranged radially within each duct, and actuated to direct thrust In some embodiments, the stator 1304 may include curved blades that provide structural support and act as a straightening vane. The straightening vane includes blades that are pitched in a direction opposite to the blades of the rotor unit vane 1302. The opposite direction of the pitched blades of the straightening vane reduces the rotation imparted on the air by the rotor unit vane 1302; thereby resulting in exhaust air that is substantially less turbulent than without use of the straightening vane. However, a second vane 1302(2) may be rotatable and a separate part from the stator 1304. In some embodiments, the rotor unit 1300 may be a non-ducted rotor unit and may not include the duct 1308.

Figure 13B:
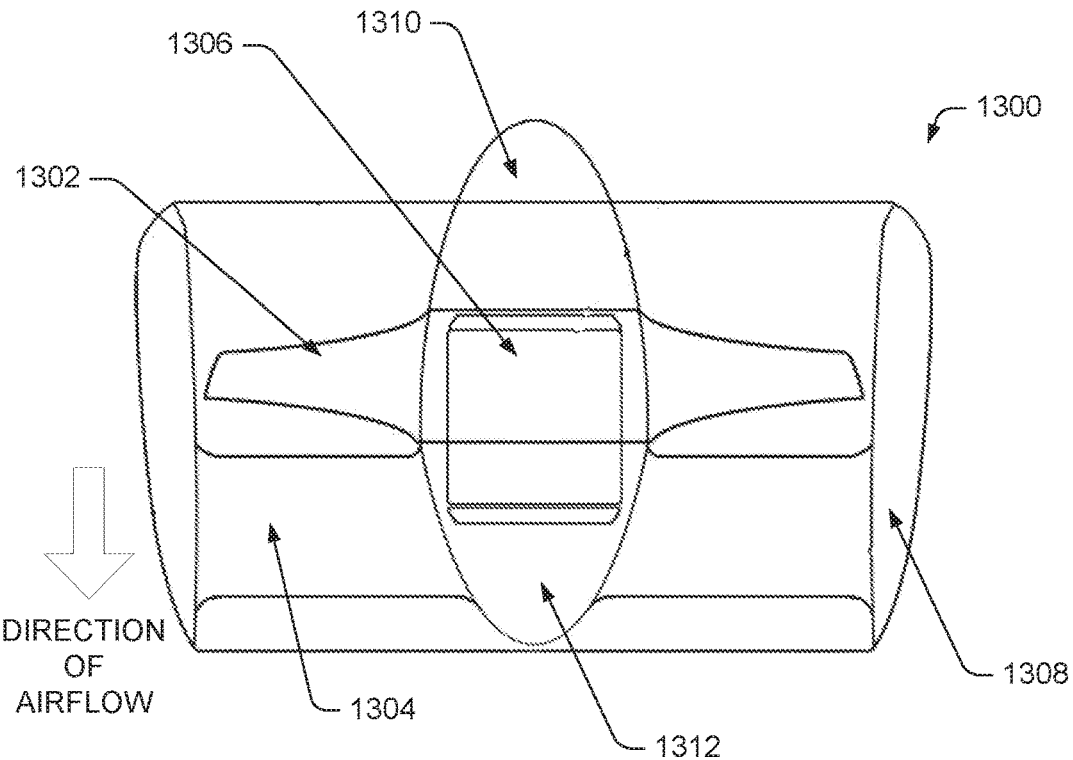
FIGS. 13B and 14 are side elevation views of illustrative rotor units.

FIG. 13B is a side elevation view of the illustrative rotor unit 1300. The electric motor 1306 may be housed between a fore cone 1310 and an aft cone 1316, which is located on the side of the rotor unit that exhausts the thrust of air. The fore cone 1310 and the aft cone 1316 are aerodynamic features that reduce drag caused by the rotor unit 1300 during flight of the VTOL aircraft 100. The fore and aft cones may be ventilated to improve motor cooling.

Figure 14:
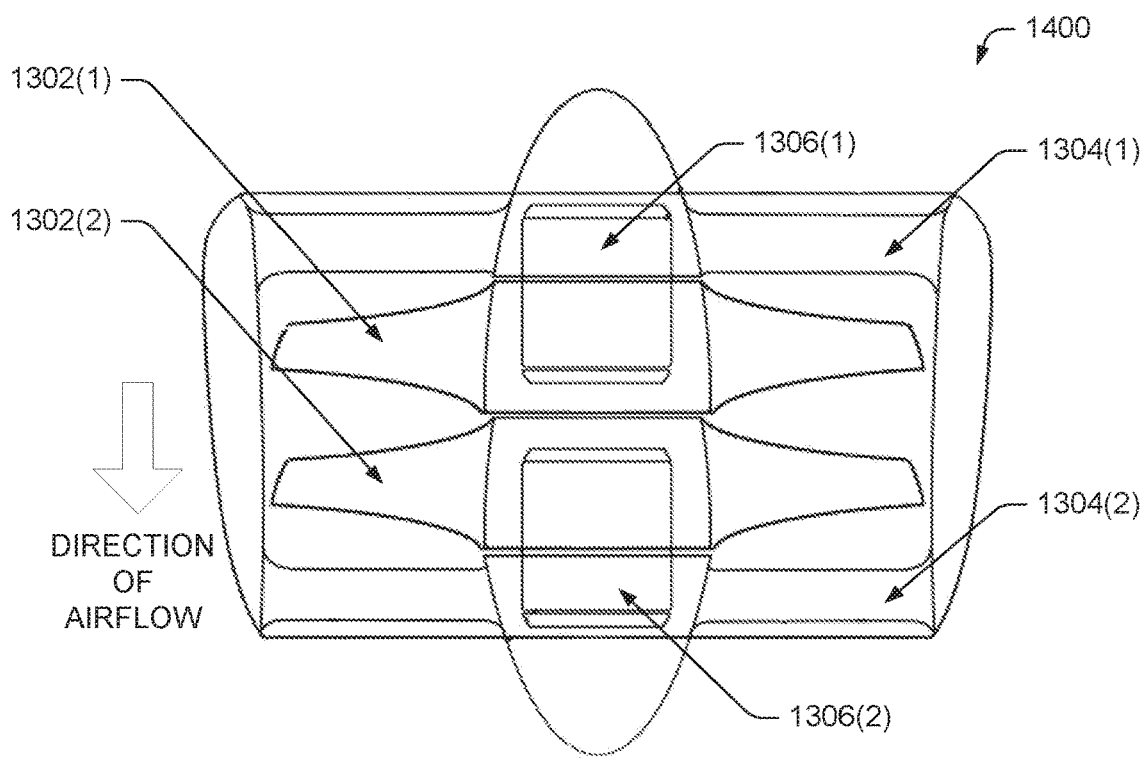

FIG. 14 is a side elevation view of an illustrative multi-vane rotor unit 1400. The multi-vane rotor unit 1400 may include a fore rotor vane 1302(1) and an aft rotor vane 1302(2), a fore stator 1304(1) and an aft stator 1304(2), and a fore motor 1306(1) and an aft motor 1306(2). In some embodiments, the fore motor 1306(1) and the aft motor 1306(2) may cause rotation of the respective rotor unit vanes in opposite directions. The fore stator 1304(1) may include straight blades while the aft stator 1304(2) may be a straightening vane and may include blades curved opposite the curvature of the blades of the rotor unit vane 1302(2). When more than one rotor vane is in each duct, rotors may rotate in opposite directions to counter vortex effect, and improve efficiency.

Figure 15A:
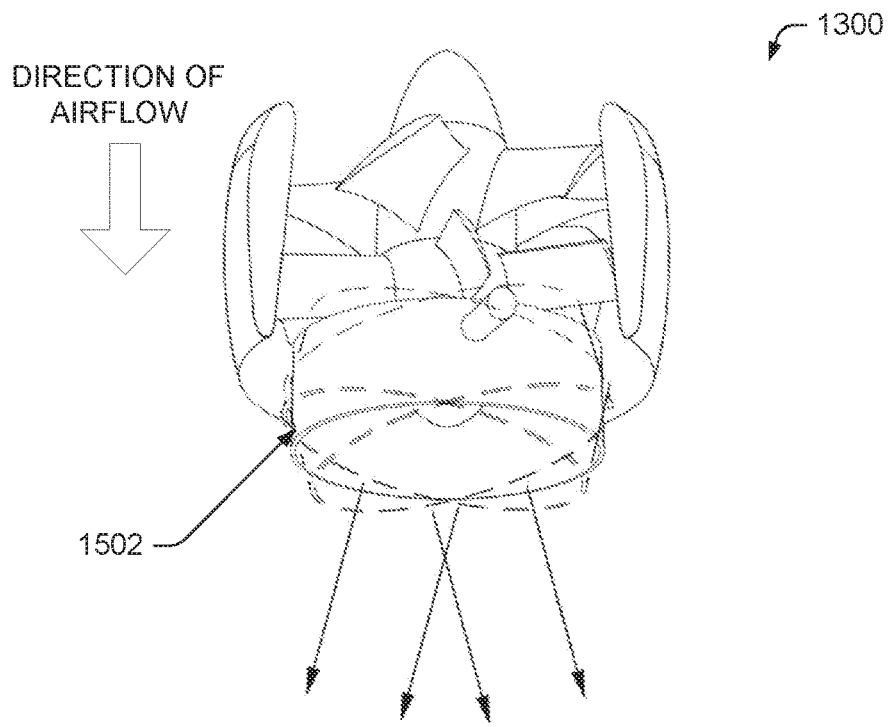
FIGS. 15A and 15B are partial cutout isometric views of the illustrative rotor unit shown in FIG. 13 and show lateral thrust directing apparatuses.
Figure 15B:
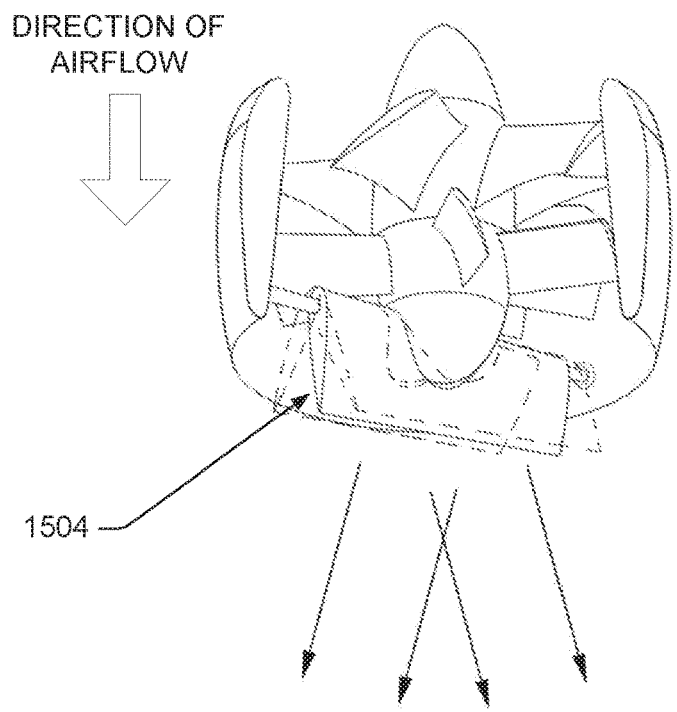

FIGS. 15A and 15B are partial cutout isometric views of the illustrative rotor unit shown in FIG. 13 and show thrust directing apparatuses. FIG. 15A shows the rotor unit 1300 with a rotating inner duct 1502 that is rotatably coupled to the inner duct. FIG. 15B shows the rotor unit 1300 with a rotating vane 1504 that is rotatably coupled to the inner duct. The rotating inner ring 1502 and the rotating vane 1504 may provide yaw and roll control during VTOL and horizontal flight in the forward-flight mode 206 and the transition mode 204, and may provide yaw and roll control during flight in the hover mode 202. During flight in the forward flight mode 206, the ailerons (or other control surfaces) may control yaw and roll.

Figure 16:
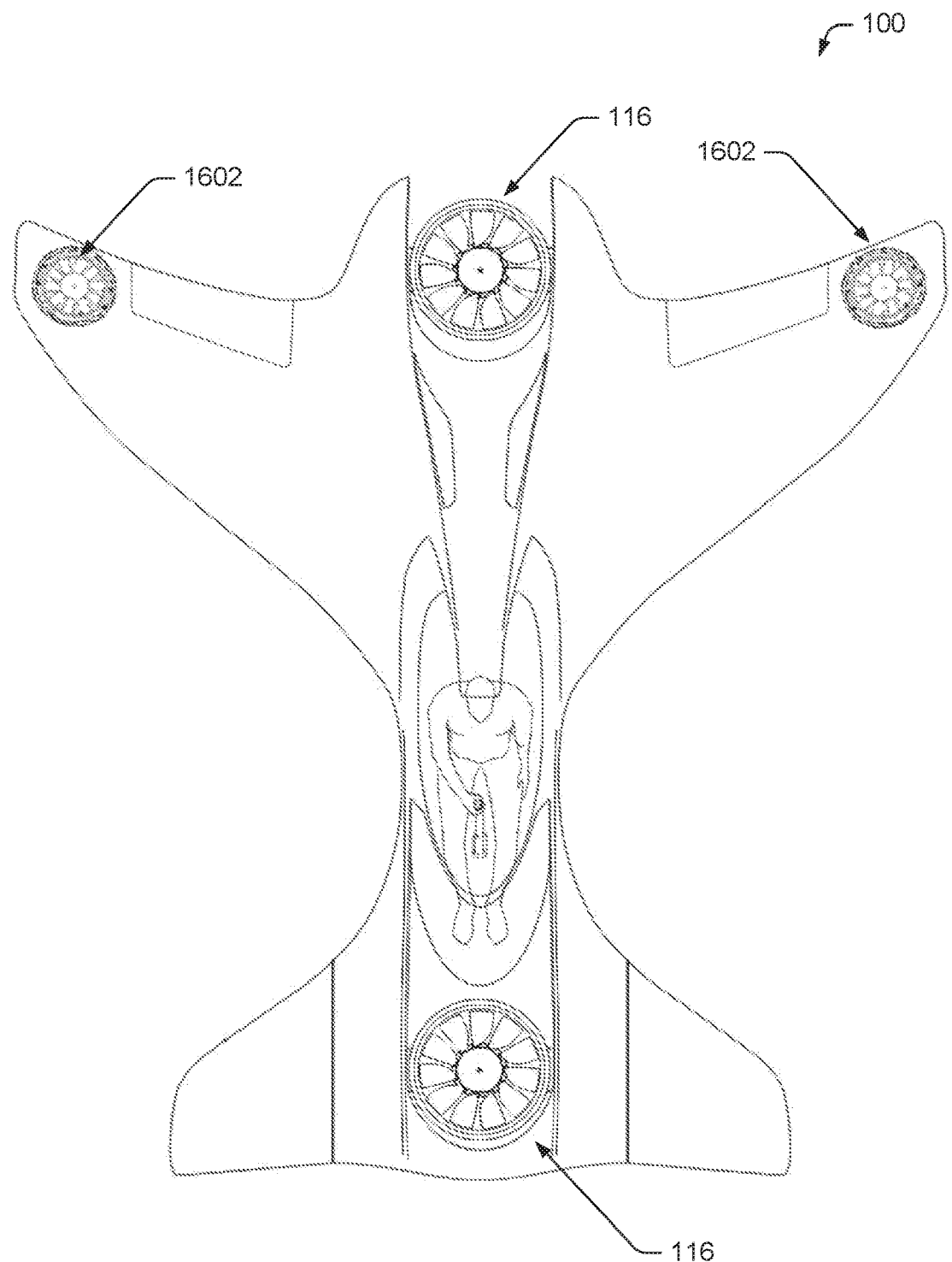
FIG. 16 is a top view of an illustrative VTOL aircraft that includes wingtip rotors.

FIG. 16 is a top view of an illustrative VTOL aircraft 100 that includes wing tip rotors 1602. The wing tip rotors 1602 may provide roll stability during flight in the hover mode 202 and possibly during flight in the transition mode 204. The wing tip rotors 1602 may be located near a tip of the main wing. However, the wing tip rotors 1602 may be located in other locations to direct thrust outward towards the general direction of the wing tips and/or downward from the wingtips.

The wing tip rotors 1602 may be smaller sized rotors than the main rotors 116 described above. The wing tip rotors 1602 may also be thinner than the main rotors 116 such that a profile of the wing tip rotors does not project substantially above a top surface of the wing or below a bottom surface of the wing. In some embodiments, the wing tip rotors may not include the rotating chassis 120 and therefore may not be able to move to direct thrust in different directions. However, the wing tip rotors 1602 may be configured to include directional mechanisms, such as the rotating chassis 120, the rotating inner duct 1502, and/or the rotating vane 1504.

In the hover mode, the thrust from the main rotor units 116 is directed down, allowing for the VTOL aircraft 100 to hover, both in and out of ground effect. The control management system 614 may vary the rotor speed in the hover mode 202 in order to maintain a level, balanced hover. The control management system 614 may also send signals to the rotor units 116, directing the rotor units 116 to move slightly about the longitudinal and lateral axes to maintain a stable hover, or to move the VTOL aircraft 100 forward, aft, or laterally. Wing tip rotors 1602 may be controlled by the control management system 614 and may aid the main rotor units 116 in lift and in hover stability.

The wing tip rotors 1602 may generate thrust perpendicular to the VTOL aircraft 100 at varying intervals as necessary to maintain a stable hover. The power output of the wing tip rotors 1602 may be determined by the control management system 614. In some embodiments, the wing tip rotors may include a cover that can be placed over the wing tip rotors 1602 during flight in the forward-flight mode 206 to reduce drag caused by the wing tip rotors 1602. The wing tip rotors 1602 may have a cover on the top side and the bottom side of the wing which opens below a certain airspeed. The cover may be substantially flush with the aircraft skin in order to decrease drag during flight in the forward-flight mode 206 and the transition mode 204.

FIGS. 17-25B show various configurations of VTOL aircraft that utilize the rotor units 116 configured substantially as described above. The VTOL aircraft shown and described below may be implemented with an on-board operator (pilot) and/or in a UAV configuration that may or may not include a cockpit.

Figure 17:
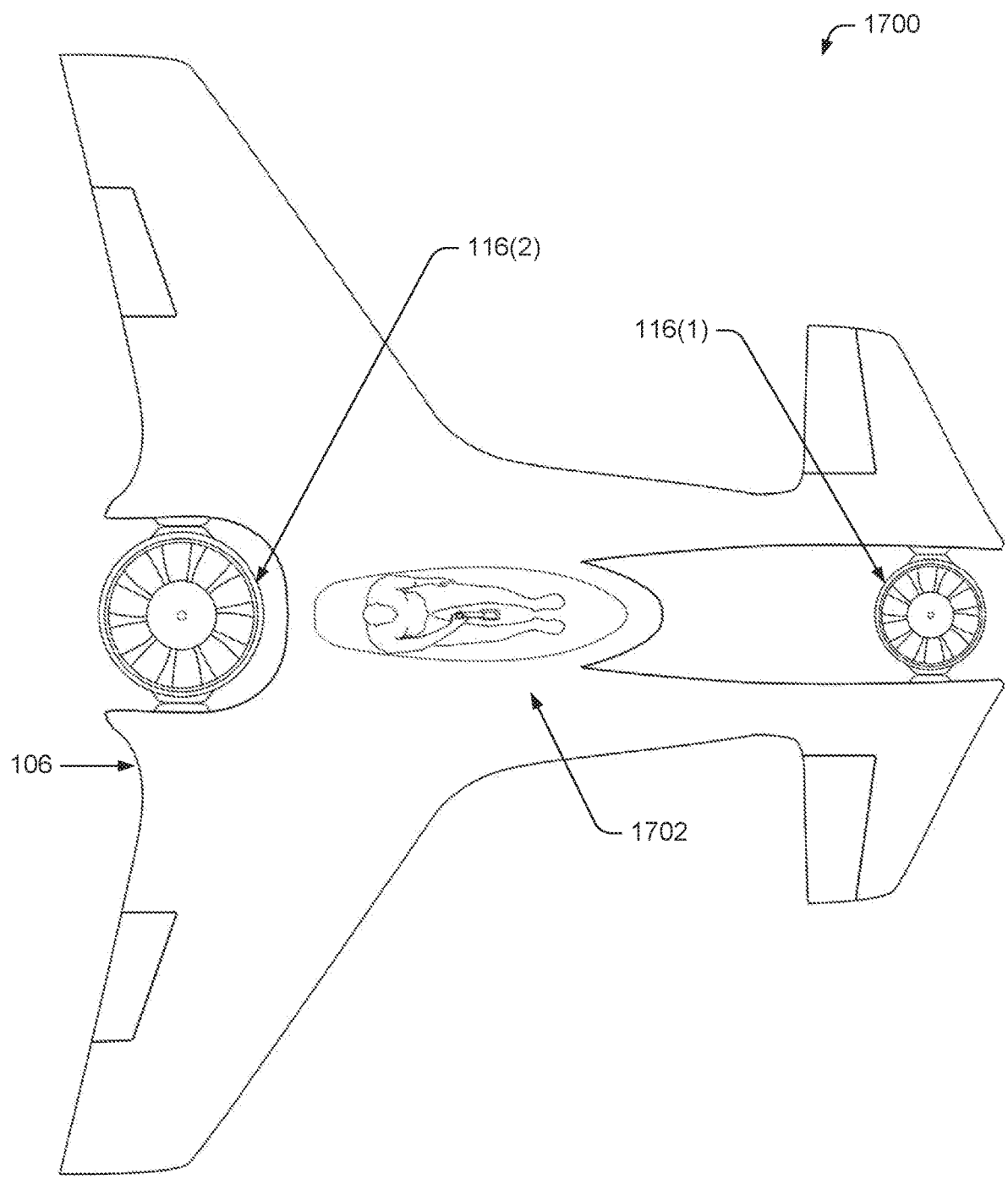
FIG. 17 is a top view of an illustrative VTOL aircraft having a shortened fuselage and rotors selected to balance a payload of the VTOL aircraft.

FIG. 17 is a top view of an illustrative VTOL aircraft 1700 having a shortened fuselage and rotor units of differing sizes selected to balance a payload of the VTOL aircraft. When a center of mass of expected payload of the VTOL aircraft 1700 is located closer to the aft end 106, then the aft rotor unit 116(2) may be a larger or more powerful rotor unit than the fore rotor unit 116(1) to enable stable flight in the hover mode 202. The larger rotor unit may produce more thrust at the same revolution-per-minute speed. The VTOL aircraft 1700 may have a stronger push-type thrust from the aft rotor unit 116(2) when the aft rotor unit is the larger rotor unit.

The VTOL aircraft 1700 may include shortened fuselage 1702 as compared to the fuselage 102 depicted in the VTOL aircraft 100 shown in FIG. 1. The shortened fuselage 1702 may allow for increased dissipation of airflow from the fore rotor unit 116(1) resulting in increased efficiency of the aft rotor unit 116(2).

Figure 18:
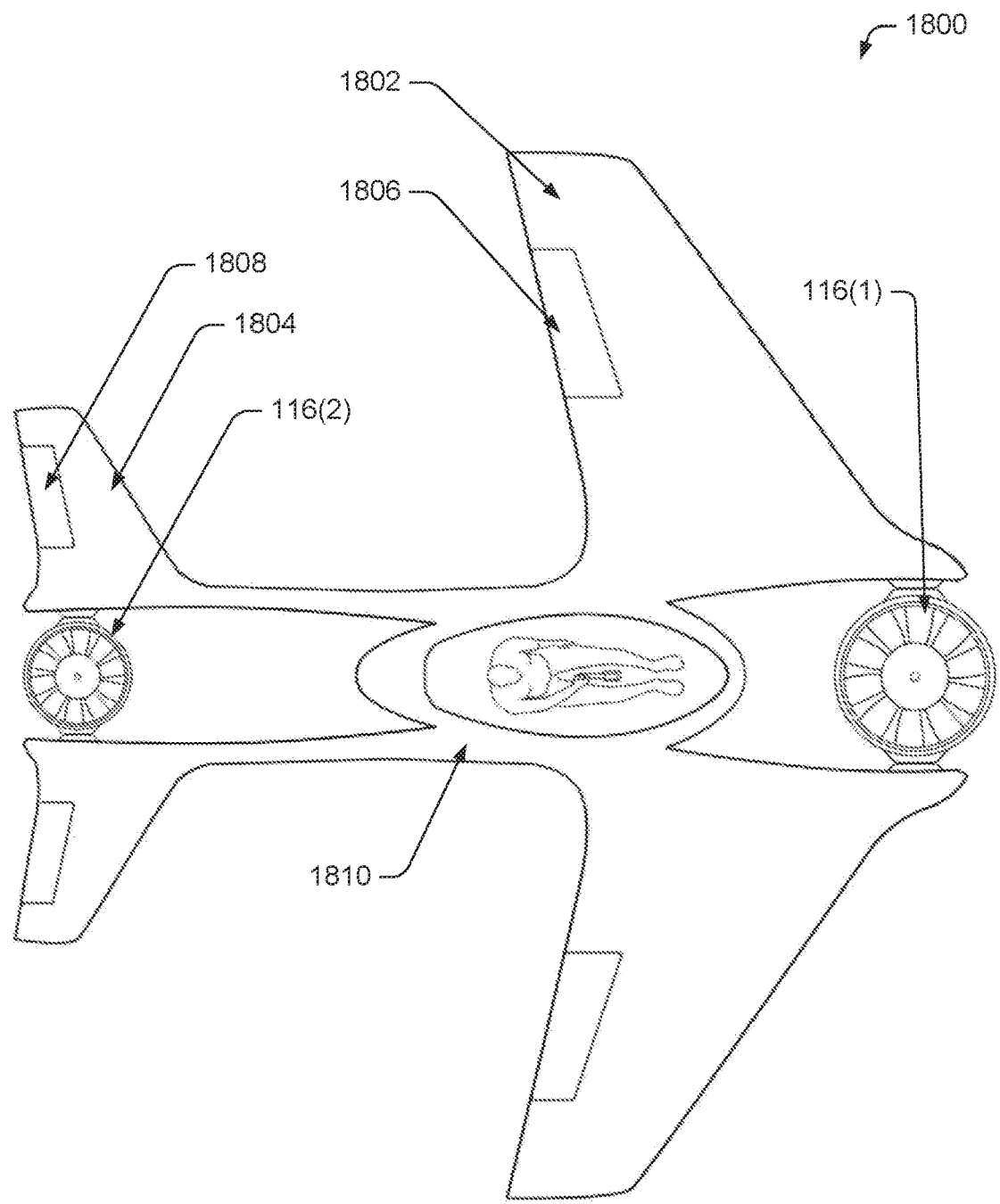
FIG. 18 is a top view of an illustrative VTOL aircraft having a traditional wing configuration.

FIG. 18 is a top view of an illustrative VTOL aircraft 1800 having a traditional wing configuration. The VTOL aircraft 1800 includes two lift generating surfaces, a fore wing 1802 and an aft wing 1804. The fore wing 1802 provides the majority of the lift for the aircraft. The fore wing 1802 has ailerons 1806, which allow the operator to maneuver the aircraft about the longitudinal axis. The aft wing 1804 acts as a lifting surface and provides pitch stability. The aft wing 1804 has elevators 1808, which allow the operator to maneuver the aircraft about the lateral axis, to pitch up and down.

The VTOL aircraft 1800 has two rotor units mounted in a rotating chassis along a longitudinal axis of a fuselage 1810. In this embodiment, the fore rotor unit 116(1) has a larger diameter than the aft rotor unit 116(1). The larger rotor unit may produce more thrust at the same revolution-per-minute speed. The configuration show in FIG. 18 may result in a stronger pull-type thrust from the fore rotor unit 116(1).

The VTOL aircraft 1800 may include shortened fuselage 1810 as compared to the fuselage 102 depicted in the VTOL aircraft 100 shown in FIG. 1. The shortened fuselage 1810 may allow for increased dissipation of airflow from the fore rotor unit 116(1) resulting in increased efficiency of the aft rotor unit 116(2).

Figure 19:
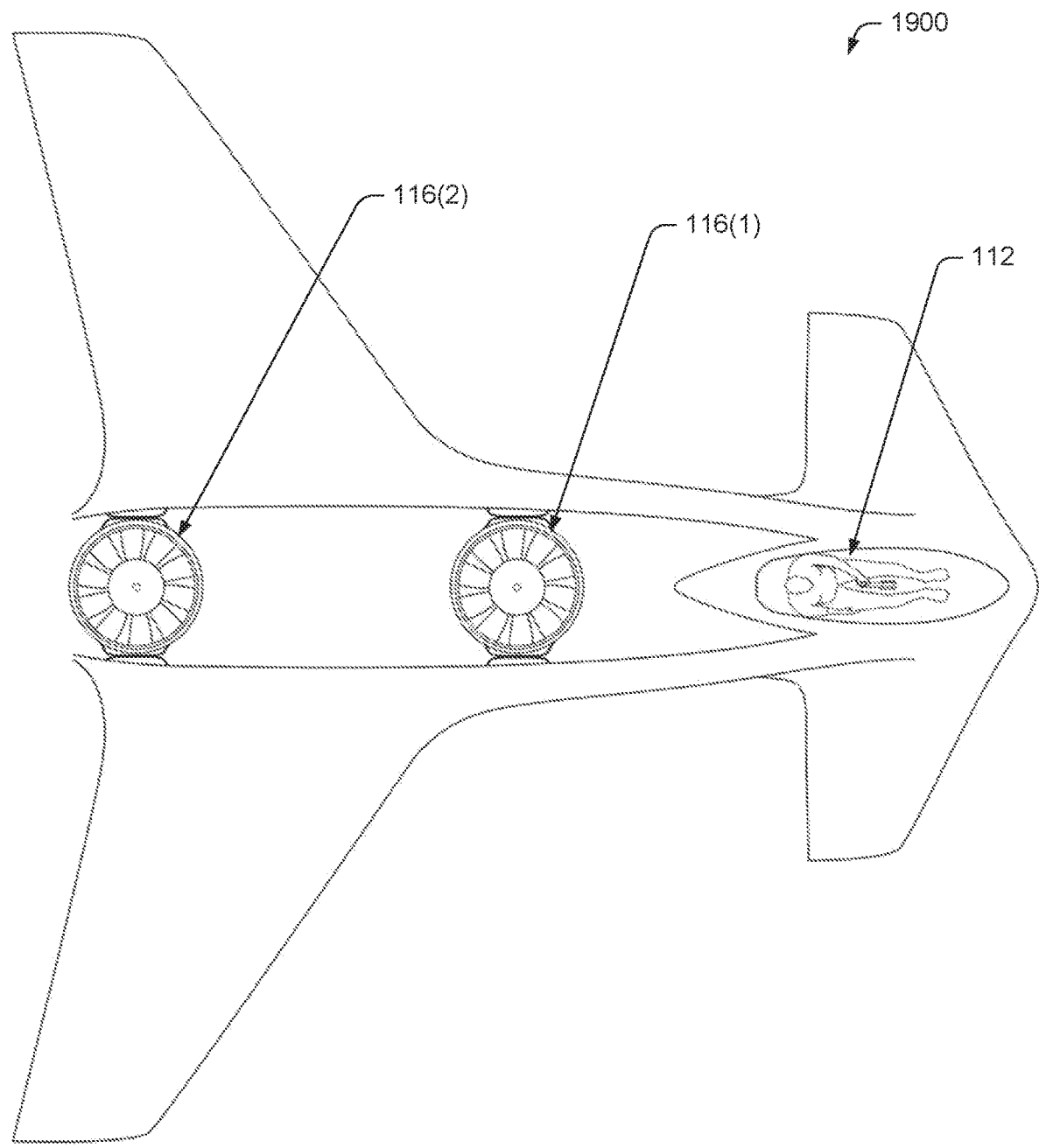
FIG. 19 is a top view of an illustrative VTOL aircraft where the fore rotor unit is located between the aft rotor unit and a cockpit.

FIG. 19 is a top view of an illustrative VTOL aircraft 1900 where the fore rotor is located between the aft rotor and a cockpit. The cockpit 112, when included, may located forward of the fore rotor unit 116(1). In some embodiments, the cockpit 112 may be located behind the aft rotor 116(2), which may be another alternative configuration.

Figure 20:
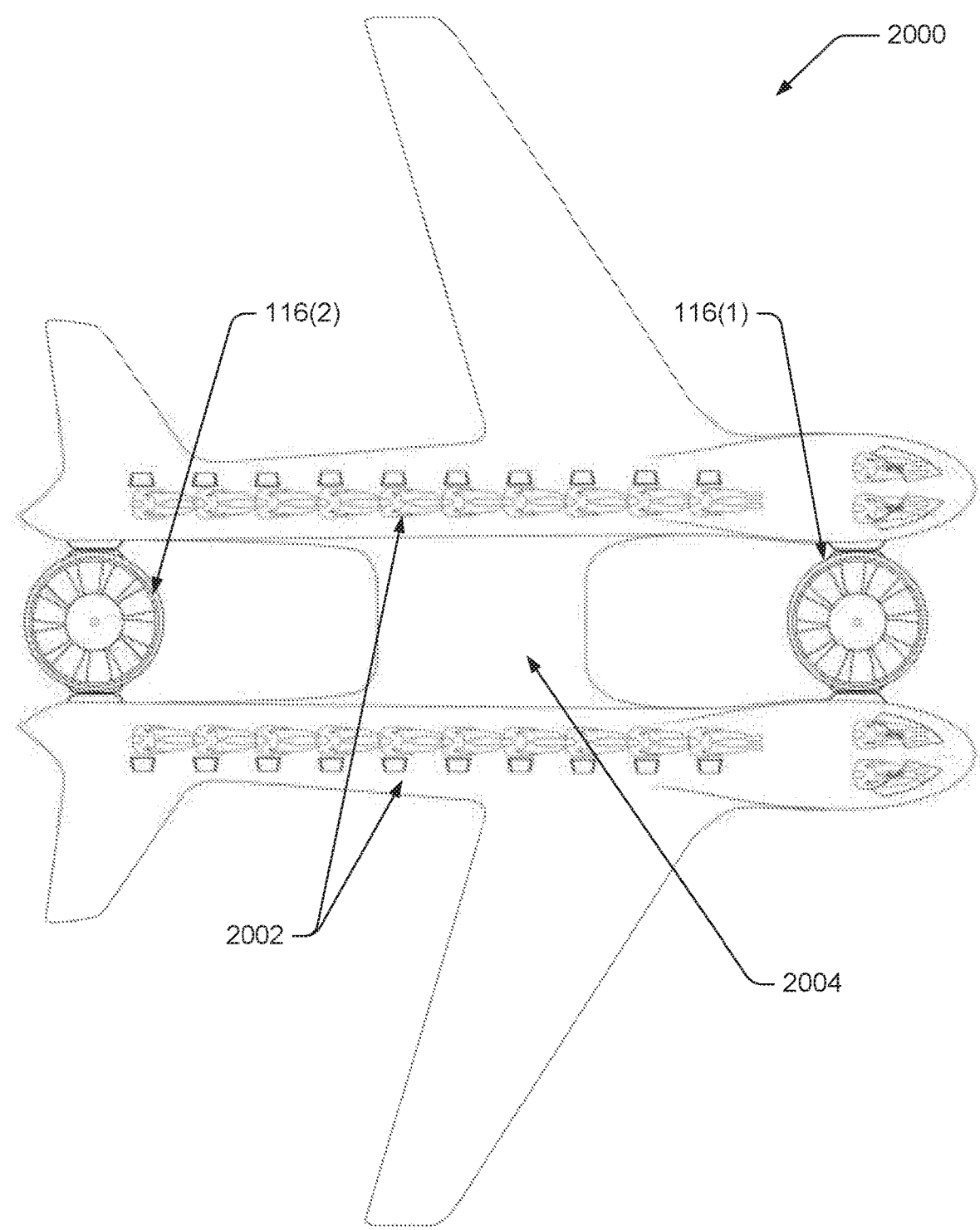
FIG. 20 is a top view of an illustrative multi-occupant VTOL aircraft.

FIG. 20 is a top view of an illustrative multi-occupant VTOL aircraft 2000. The multi-occupant VTOL aircraft 2000 may effectively have two fuselages 2002 with a fore end and an aft end, two main wings, and two rotor units 116. The fuselages 2002 may be configured substantially parallel to each other, and may be large enough to hold passengers or other payload. The two fuselages 2002 may be coupled by an aerodynamic strut 2004 in substantially the center of mass of the aircraft, and between the fore and aft rotor units.

Figure 21A:
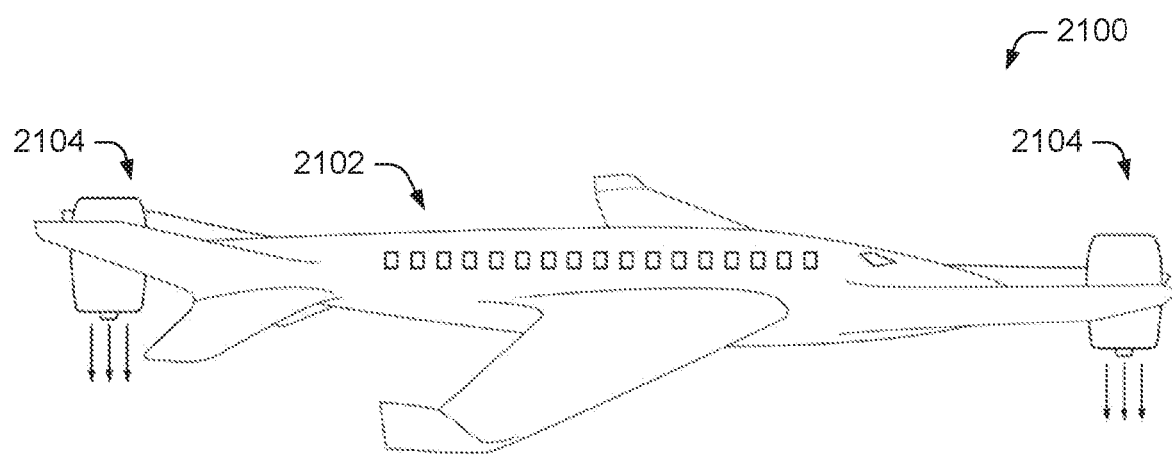
FIGS. 21A and 21B are side elevation views of another illustrative multi-occupant VTOL aircraft.
Figure 21B:
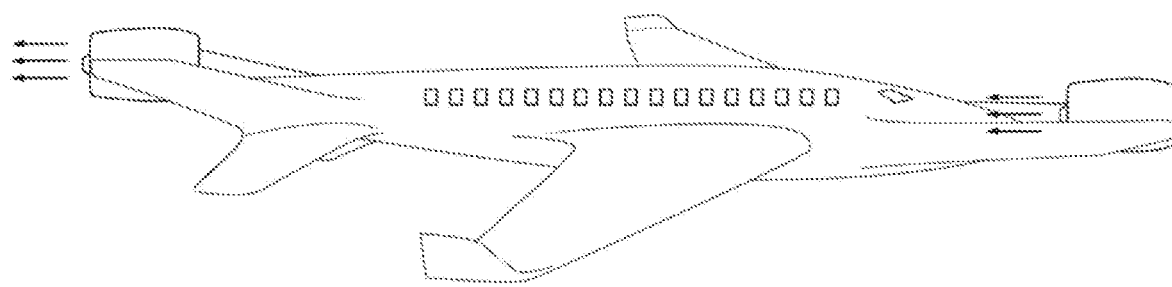

FIGS. 21A and 21B are side elevation views of another illustrative multi-occupant VTOL aircraft 2100. FIG. 21A shows the multi-occupant VTOL aircraft 2100 in the hover mode 202. FIG. 21B shows the multi-occupant VTOL aircraft 2100 in the forward-flight mode 206. The multi-occupant VTOL aircraft 2100 may include a single fuselage 2102 that may be used to transport passenger or payload. The VTOL aircraft 2100 may use gas powered engines 2104 to generate thrust, such as gas powered turbo propellers, jet turbines, and/or other non-electric power plants.

Figure 22A:
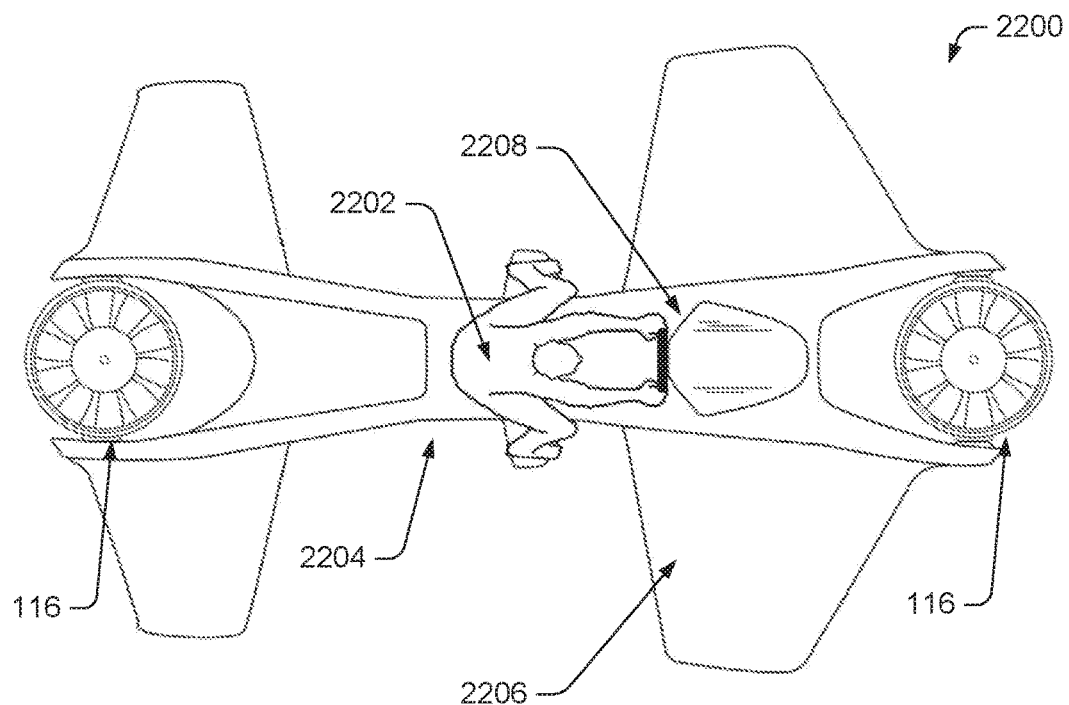
FIGS. 22A and 22B are top views of an illustrative VTOL aircraft where the operator straddles the fuselage.
Figure 22B:
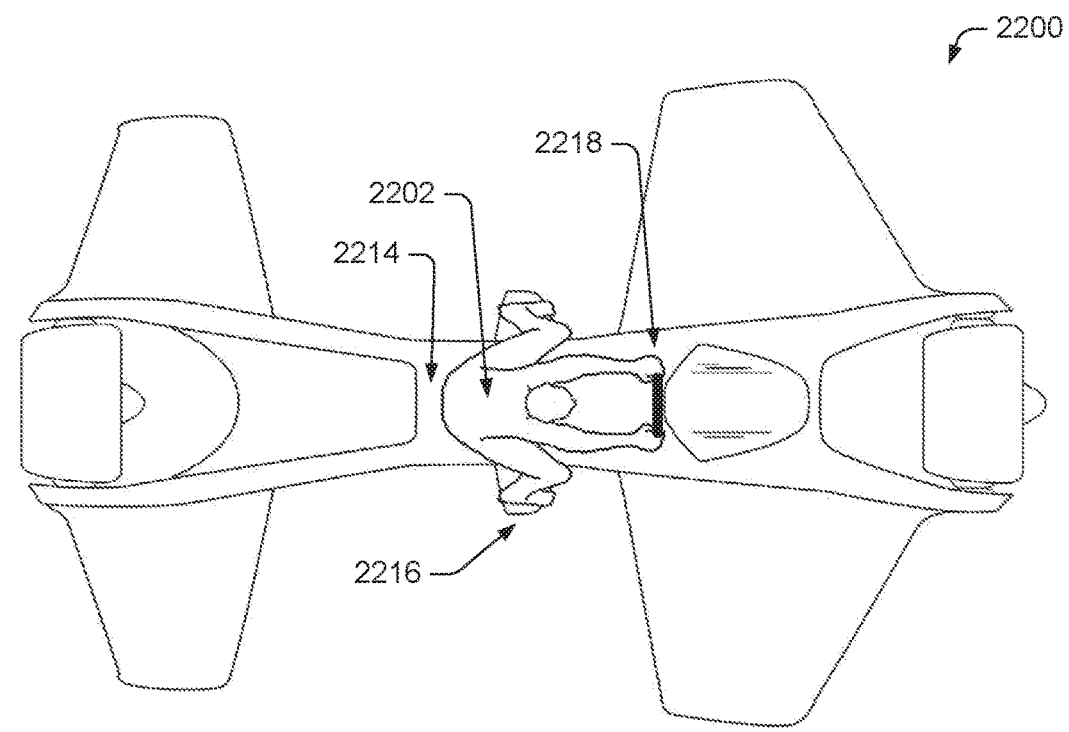

FIGS. 22A and 22B are top views of an illustrative VTOL aircraft 2200 where the operator 2202 straddles a fuselage 2204. FIG. 22A shows the VTOL aircraft 2200 in flight in the hover mode 202. The VTOL aircraft 2200 may include two wings 2206, the rotor units 116, and a windshield 2208. The fuselage 2204 may be shaped to accommodate an operator situated above the fuselage akin to an operator straddling a frame while seated on a motorcycle. The wings 2206 may provide lift while the VTOL aircraft 2200 is in flight in the forward-flight mode 206. FIG. 22B shows the VTOL aircraft 2200 in flight in the forward-flight mode 206.

The windshield 2208 may protect the operator from wind, debris, or any other object in the air. The windshield 2208 may be large enough to protect the operator's torso and head. In some embodiments, the windshield 2208 may shield the operator's entire body. The windshield 2208 may be made out of acrylic, plastic, glass, or any other transparent material. The windshield 2208 may be formed from a shatter-proof material.

With reference to FIG. 22B, the operator 2202 may control the VTOL aircraft 2200 from a seated position near the center of the fuselage 2204. The fuselage 2204 may include a seat 2214 and foot rests 2216 for the operator. The operator 2202 may issue control commands to the VTOL aircraft 2200 with handlebars 2218, similar to motorcycle handlebars. The handlebar 2218 may include a throttle, through which the operator 2202 may change the power output of the rotor units 116. In some embodiments, the operator 2202 may issue the control commands using a lever (e.g., joystick), a steering wheel, or any other device capable of transmitting the operator's desired power and direction of the VTOL aircraft 2200. The mechanical motion of the handlebars 2218 may be transmitted into an electronic signal by the control management system 614. The control management system 614 may processes signals from an operator and the plurality of stability augmentation sensors 612, and send an output signal to each rotor unit 116, directing the rotor units to independently to move about the longitudinal axis and the lateral axis as necessary to transition from the hover mode 202 (FIG. 22A) to the forward-flight mode 206 (FIG. 22B). The control management system 614 may also receive an input signal from the throttle. The speed of each rotor unit 116 may be determined by operator input through the throttle, and stability augmentation sensor 612 input mixed in the computer management system 614. The rotor units 116 may produce enough lift to maintain a hover in and out of ground effect.

Figure 22C:
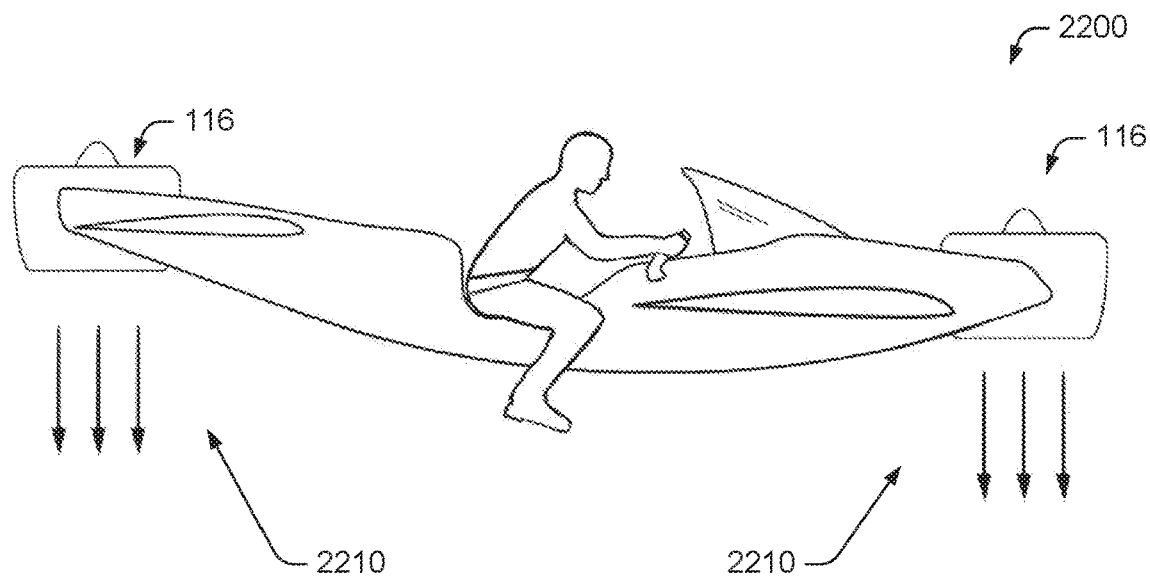
FIGS. 22C and 22D are side elevation views of an illustrative VTOL aircraft.
Figure 22D:
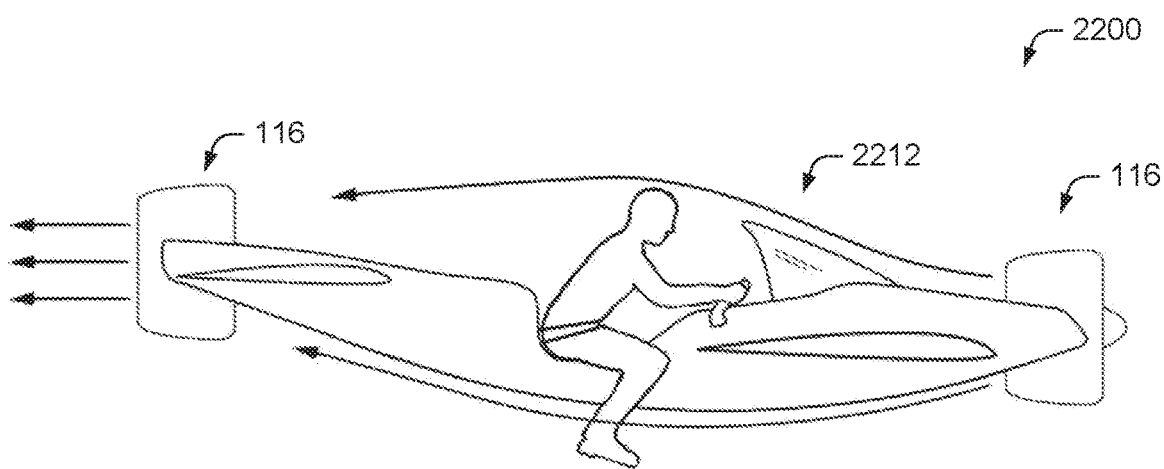

FIGS. 22C and 22D are side elevation views of an illustrative VTOL aircraft. FIG. 22C shows airflow 2210 through the rotor units 116 during flight in the hover mode 202. FIG. 22D shows airflow 2212 through the rotor units 116 and across the VTOL aircraft 2200 during flight in the forward-flight mode 206. In some embodiments, during forward flight, the backwash from the forward rotor unit(s) may provide enhanced lifting ability of the by directing a majority of the fore rotor unit's backwash over the upper surfaces, creating a lower pressure area relative to the lower surfaces.

Figure 23A:
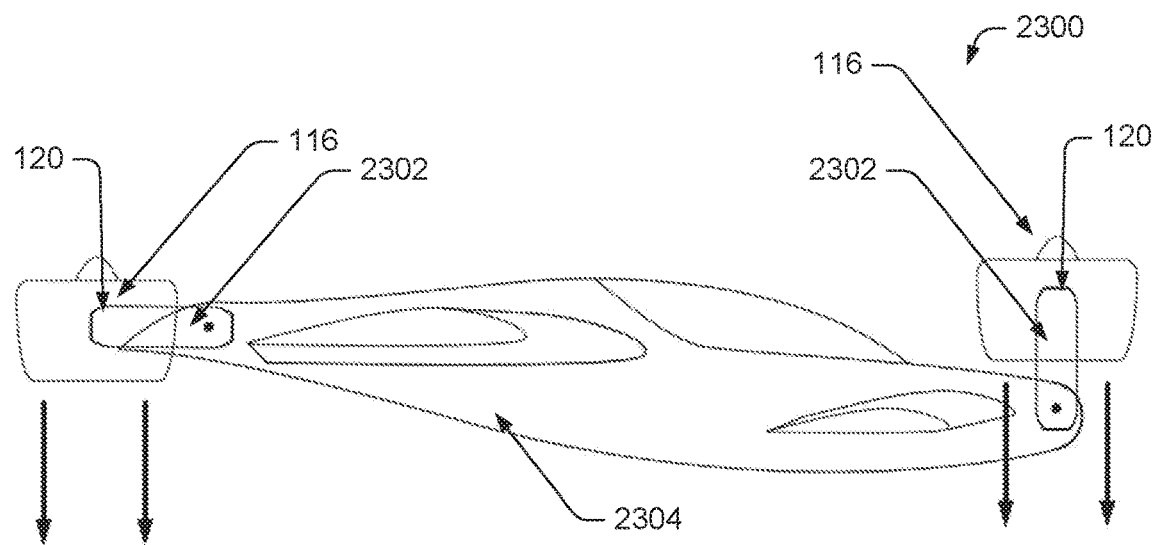
FIGS. 23A and 23B are side elevation views of an illustrative VTOL aircraft and show pivoting arms that connect the rotor units to the fuselage.
Figure 23B:
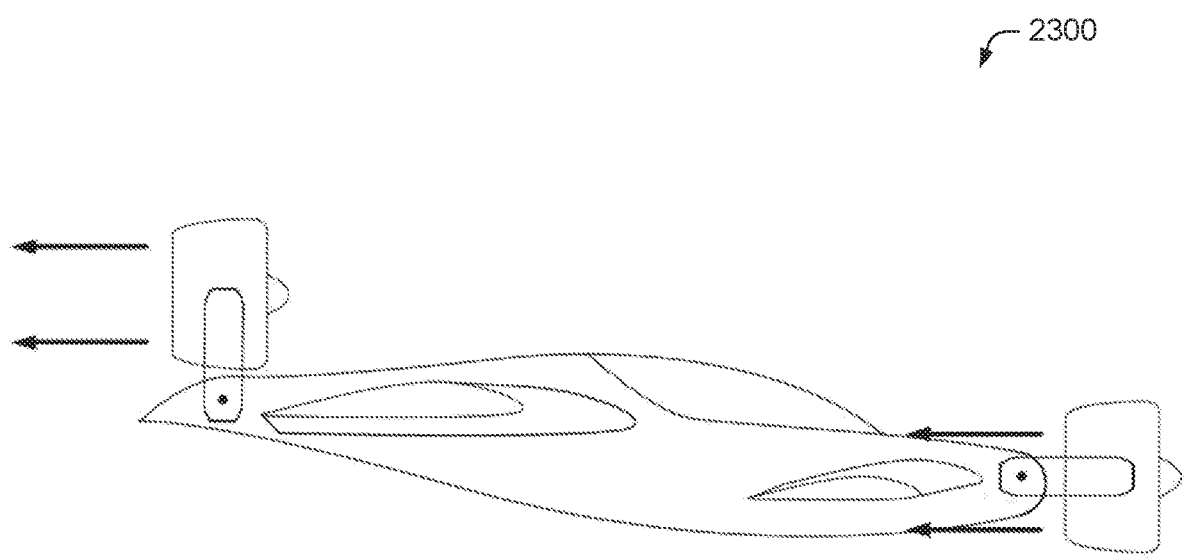

FIGS. 23A and 23B are side elevation views of an illustrative VTOL aircraft 2300 and show mounting arms 2302 that connect the rotor units 116 to the fuselage 2304.

The rotor units 116 may be moveably coupled to the fuselage 2304 via the mounting arms 2302 that include the rotating chassis 120 and mounting arms 2302. The rotating chassis 120 may allow for freedom of movement about the longitudinal axis of each rotor unit, while the mounting arms 2302 provide the transition from a hover mode 202 as shown in FIG. 23A, to a forward-flight mode 206 as shown in FIG. 23B. In some embodiments, the mounting arm 2302 may move the thrust and backwash at least partially away from the fuselage 2304. For example, the air received by the aft rotor unit 116(2) may not flow directly from the fore rotor unit 116(1) since the rotor units 116 may be located on different planes due to use of the mounting arms 2302. In some embodiments, the mounting arms 2302 may be "L" shaped or have other configurations, including structural supports or wings.

Figure 24A:
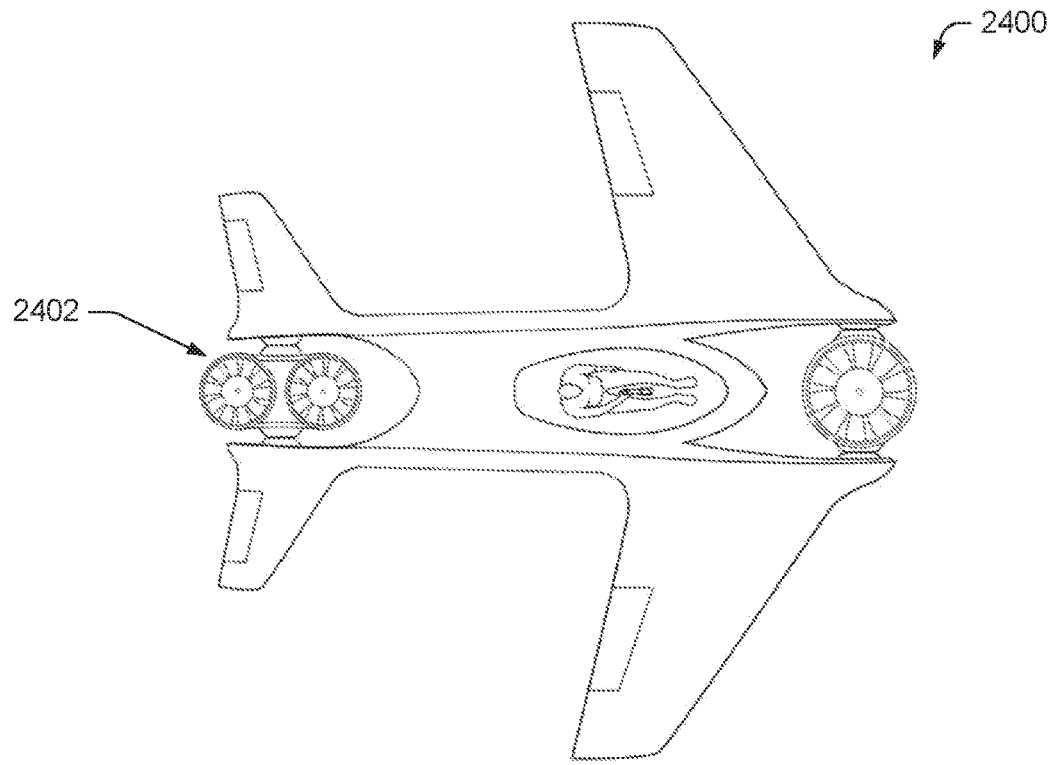
FIGS. 24A and 24B are top views of an illustrative VTOL aircraft and show a cluster of rotor units.
Figure 24B:
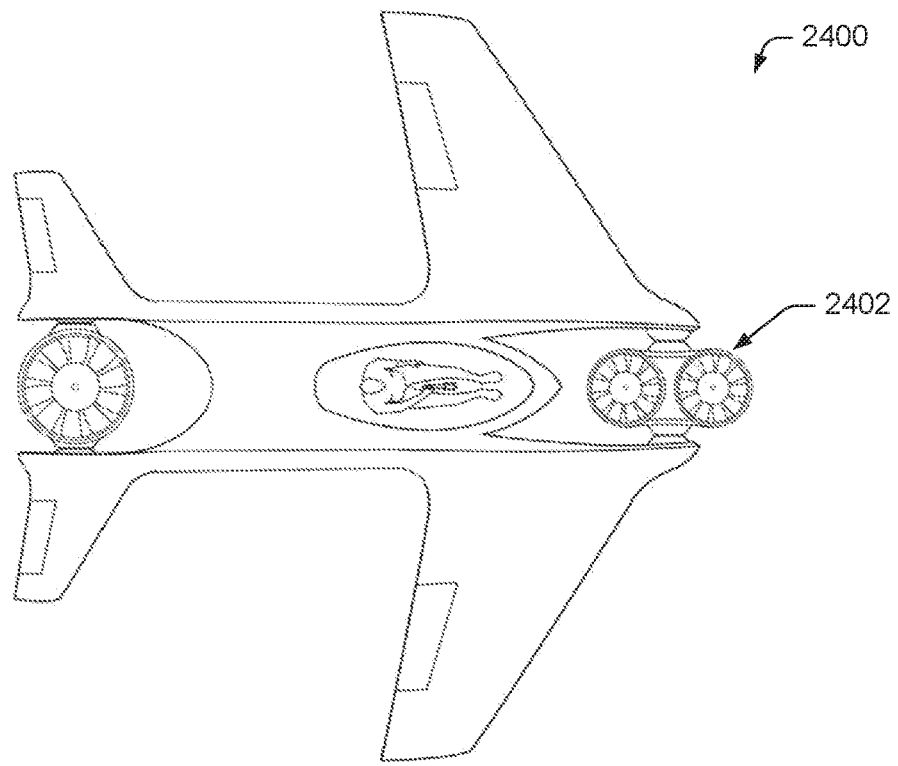

FIGS. 24A and 24B are top views of an illustrative VTOL aircraft 2400 and show a cluster of rotor units. The VTOL aircraft may include one or more clusters 2402 of rotor units. In some embodiments, the cluster 2402 may include rotor units aligned along a longitudinal axis of the fuselage. This configuration may result in displacement of the rotor units in the forward flight mode 206, which causes the rotor units to move above or below the fuselage after rotation and thereby receive cleaner intake air. However, other configurations of the cluster 2402 may be used. The cluster 2402 may be used for the aft rotor units as shown in FIG. 24A, for the fore rotor units as shown in FIG. 24B, or in both the fore rotor units and aft rotor units. The rotor units selected for inclusion in the cluster 2402 may be selected to balance power based on a location of a center of mass of the VTOL aircraft 2400.

Figure 25A:
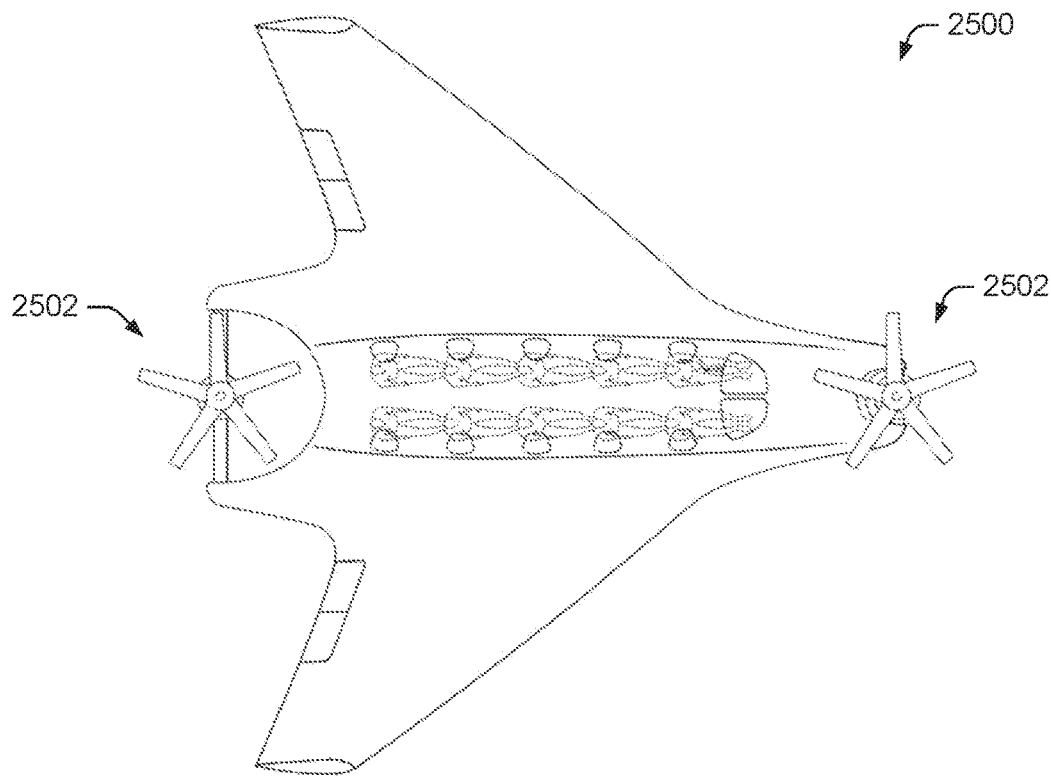
FIGS. 25A and 25B are top views of an illustrative VTOL aircraft using non-ducted rotors.
Figure 25B:
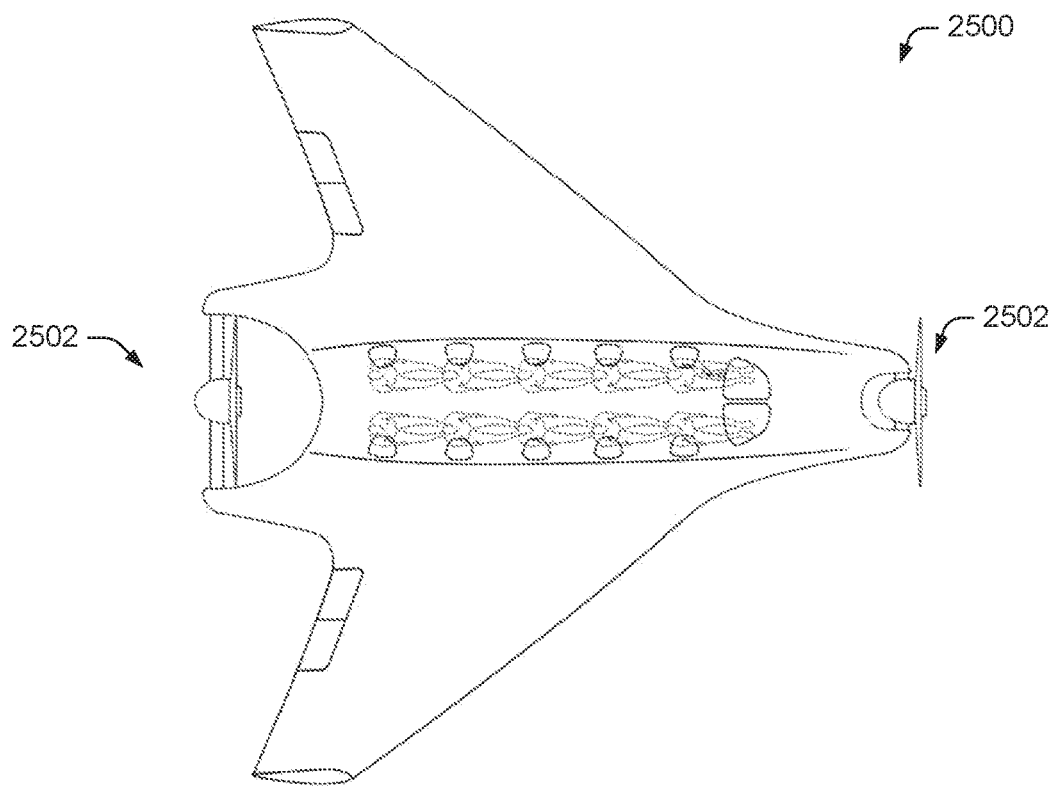

FIGS. 25A and 25B are top views of an illustrative VTOL aircraft 2500 using non-ducted rotors 2502. The non-ducted rotors 2502 may be similar or the same as conventional propeller blades. In some instances, the blades of the non-ducted rotors 2502 may be feathered or otherwise adjusted to change an angle of the blades relative to a drive shaft.

Figure 26:
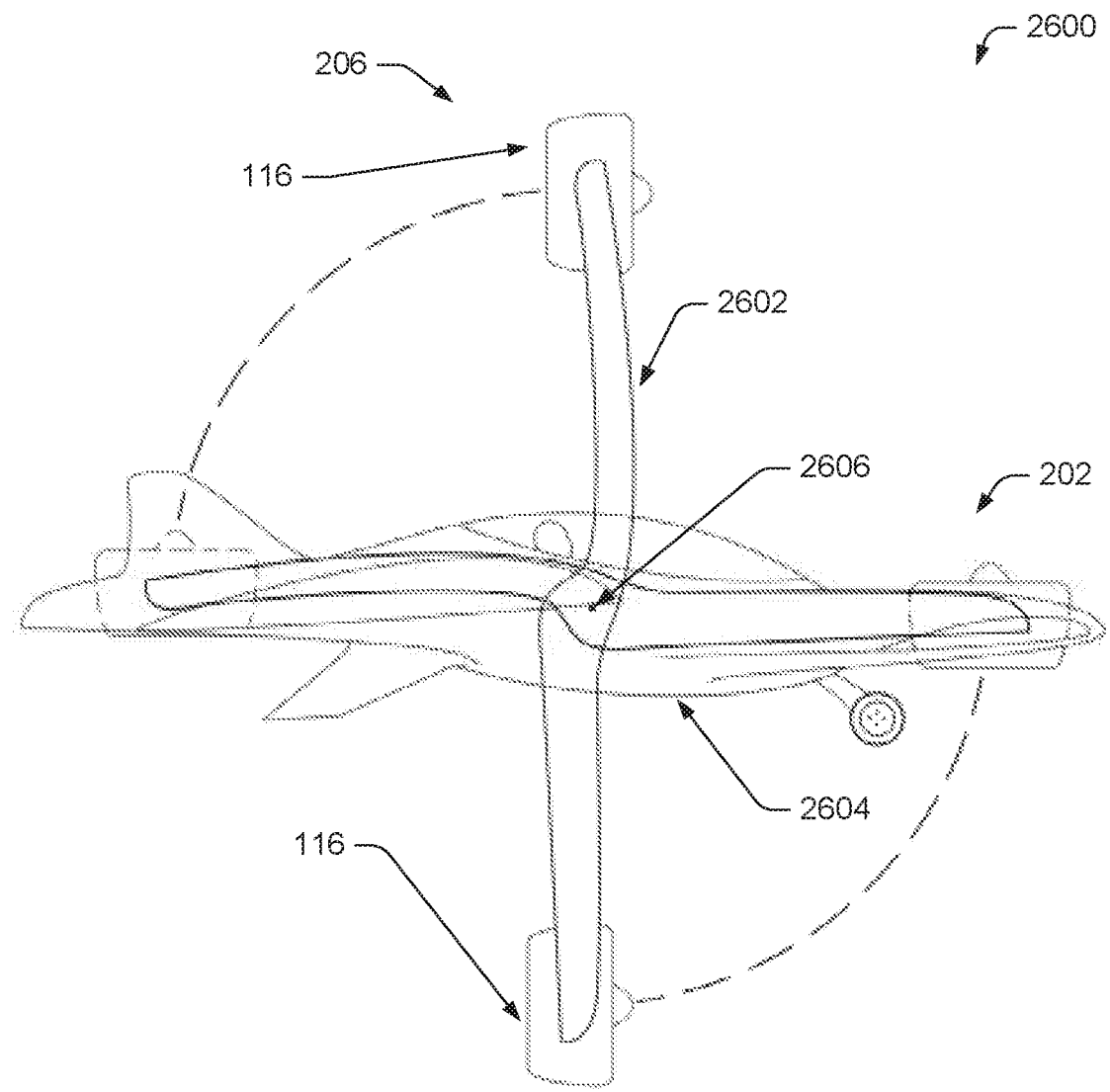
FIG. 26 is a side elevation view of another aircraft using rotor units coupled to a rotatable arm.

FIG. 26 is a side elevation view of another aircraft 2600 using rotor units coupled to a rotatable arm 2602. The rotor units 116 may be moveably coupled to the fuselage 2604 via the rotatable arm 2602 having a pivot location 2606. The rotatable arm 2602 may enable the transition from the hover mode 202 to a forward-flight mode 206 by rotation of the rotatable arm 2602. In some embodiments, the rotatable arm 2602 may move the thrust and backwash at least partially away from the fuselage 2604.

Figure 27:
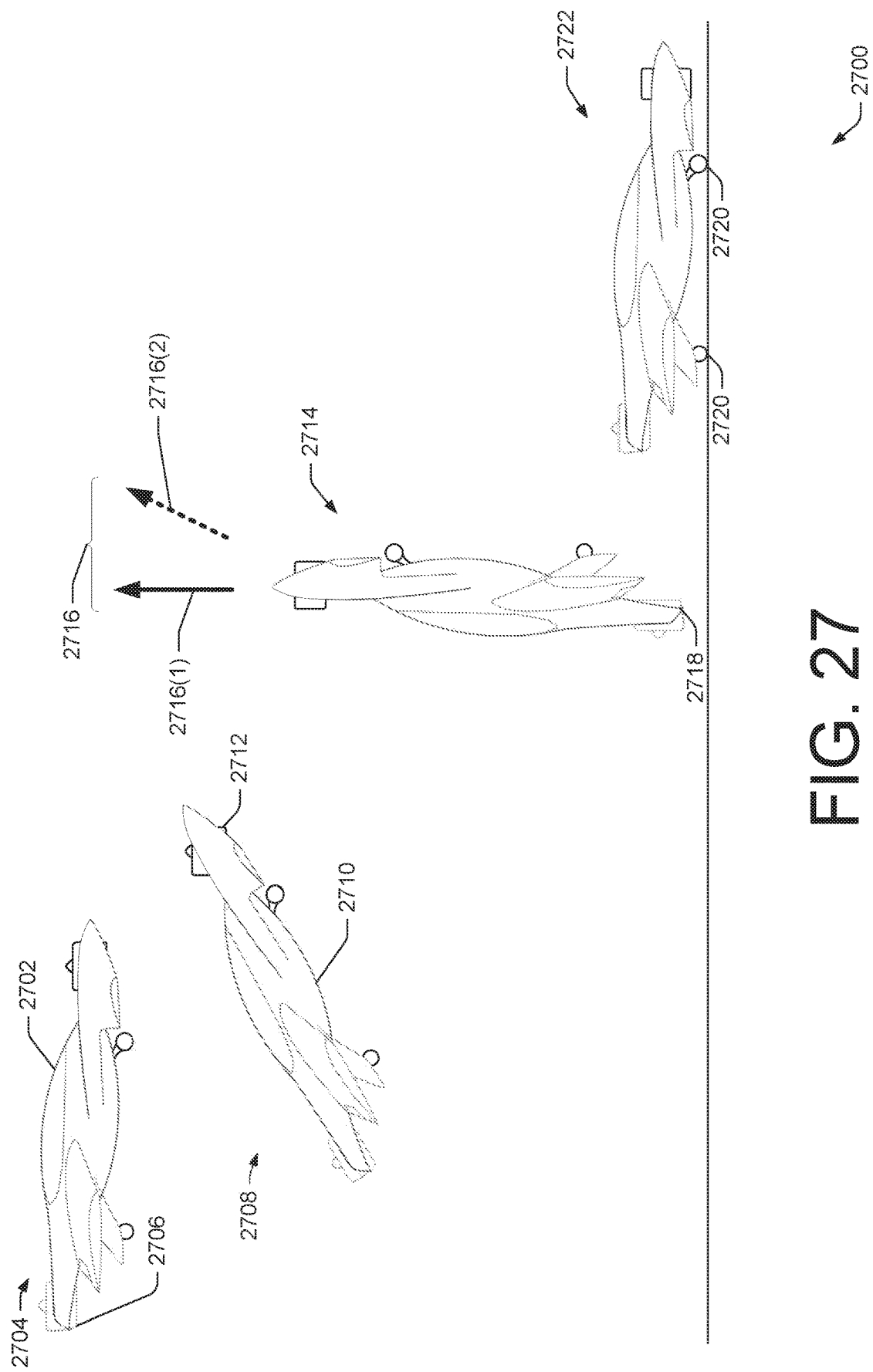
FIG. 27 is a side view of an illustrative VTOL aircraft performing an example degraded rotor landing protocol from a hover mode.

FIG. 27 is a side view of an example degraded rotor landing protocol 2700 performed by a VTOL aircraft 2702, such as VTOL aircraft 100, 700, 1700, 1800, 1900, 2000, 2100, 2200, 2300, 2400, 2500, or 2600, from a hover mode. In various embodiments, an operator of the VTOL aircraft 2702 may initiate the degraded rotor landing protocol 2700. In such embodiments, the operator may initiate the degraded rotor protocol 2700 responsive to a degradation in a rotor system. In various embodiments, a control management system of the VTOL aircraft 2702, such as control management system 614, may be configured to initiate the degraded rotor landing protocol 2700. The control management system may include one or more computing devices, such as a flight control computer, configured with at least one processor and at least one memory coupled to the at least one processor. The at least one memory may include a non-transitory computer-readable media configured to store instructions that, when executed by the one or more processors, cause the VTOL aircraft, or components thereof (e.g., motors, rotors, etc.) to perform operations. Though illustrated as being initiated from a hover mode, the degraded rotor landing protocol 2700 may also be initiated from a transition mode, such as transition mode 204.

The degraded rotor landing protocol 2700 may be initiated based on a determination that a rotor (e.g., rotor unit) of the VTOL aircraft 2702 is operating in a degraded state (e.g., experiencing degraded functionality or ceases to operate). The degraded state may include the rotor unit producing zero thrust (i.e. rotor unit inoperative) or less thrust than required to maintain substantially level flight in the hover mode. In various embodiments, the control management system may recognize the degraded state based on an input received from a motor associated with the degraded rotor unit. In some embodiments, the control management system may recognize the degraded state based on a lack of input from a motor associated with the degraded rotor unit (i.e., motor is inoperative). In some embodiments, the control management system may recognize the degraded state based on a detection of an unanticipated pitch of the VTOL aircraft caused by a reduced thrust from the degraded rotor unit. In such examples, the pitch may be detected by one or more stability augmentation sensors (e.g., gyroscopes and/or accelerometers) of the VTOL aircraft. In some embodiments, the control management system may determine that the unanticipated pitch exceeds a threshold unanticipated pitch amount and/or rate.

As illustrated at 2704, the VTOL aircraft may be established in a hover mode. The control management system may determine that a rotor unit is operating in a degraded state (e.g., degraded rotor unit 2706), and may initiate the landing protocol. In various embodiments, the landing protocol may include terminating power to the motor associated with the degraded rotor unit 2706 (i.e., to the first rotor unit), thereby decreasing thrust substantially to zero (e.g., no thrust or a negligible amount of thrust).

At 2708, with little or no thrust produced by the degraded rotor unit 2706, a fuselage 2710 of the VTOL aircraft may pivot about a rotating chassis, such as rotating chassis 120, 1106, etc.) coupled to the operable rotor unit 2712, to establish the VTOL aircraft in a substantially vertical configuration, such as that shown at 2714. Meanwhile, the control management system may continually orient the operable rotor unit 2712 to provide thrust in a downward direction toward the ground, which may cause the operable rotor unit 2712 to pivot up to ninety degrees with respect to the fuselage 2710 during this transition from hover mode to a falling state to maintain the thrust in the downward direction.

In various embodiments, the landing protocol may include sending a signal to a motor associated with the operable rotor unit 2712 to increase thrust to an initial thrust setting, which may be a maximum thrust output. The maximum thrust output may cause operation of the operable rotor unit 2712 outside of sustainable operational parameters, which if prolonged, may cause the operational rotor unit 2712 to fail due to overheating, wear, or for other reasons. The initial thrust setting may be determined based on a thrust available, a power available, a desired rate of descent, a payload of the aircraft, a gross weight of the aircraft, and/or other factors that may affect flight conditions in a degraded rotor landing. In various embodiments, the control management system may be configured to identify a power source (i.e., motor, battery, fuel tank, etc.) associated with the degraded rotor unit 2706. The control management system may then cause power (e.g., electrical current, fuel, etc.) from the power source associated with the degraded rotor unit 2706 to be routed to the operable rotor unit 2712, to provide additional power (i.e., current) to the operable rotor unit 2712 to increase thrust generated by the operable rotor unit 2712.

In various embodiments, the initial thrust setting may be calculated by the control management system based on the VTOL aircraft altitude and/or power (e.g., battery power, gasoline, etc.) available. Additionally, the initial thrust setting may be based on a gross weight of the VTOL aircraft, a payload, a number of occupants, and/or other aircraft weight considerations. In some embodiments, the initial thrust setting may be based on a desired and/or a maximum initial descent rate and/or rate of acceleration. In such embodiments, the desired and/or maximum initial descent rate and/or rate of acceleration may be based on altitude. For example, a maximum initial descent rate and/or rate of acceleration may include a rate that would minimize a speed of impact (e.g., maximum initial rate of acceleration of 10 $fps^2$ at 100 feet to preclude velocity increasing over 50 fps). For another example, a maximum initial descent rate may include a rate substantially equivalent to the aircraft altitude (i.e., an aircraft at 500 feet AGL would have no greater than a 500 fpm descent rate).

In various embodiments, the control management system may be configured to determine an oscillation of the fuselage 2710 about the rotating chassis of the operable rotor unit 2712 (i.e., oscillation relative to a vertical axis of the VTOL aircraft). The oscillation may be a deviation of an end of the aircraft associated with the degraded rotor unit 2706 from a vertical axis (i.e., oscillation relative to the vertical axis). In some embodiments, the oscillation may be determined based on input from one or more stability augmentation sensors of the VTOL aircraft. In some embodiments, responsive to the oscillation, the control management system may send a signal to the operable rotor unit 2712 to adjust a thrust vector 2716 to dampen the oscillations. In such embodiments, the operable rotor unit 2712 may pivot about the rotating chassis, and adjust the thrust vector 2716 opposite a direction of movement to dampen the oscillation.

In some embodiments, responsive to the oscillation, the control management system may send a signal to the motor associated with the operable rotor unit 2712 to surge power and cause a transient increase in vertical thrust (i.e., illustrated as thrust vector 2716(1)) from the operable rotor unit 2712. The transient increase in vertical thrust may dampen the oscillation to cause the aircraft to establish in a substantially vertical configuration, illustrated at 2714.

At 2714, the VTOL aircraft is established in the substantially vertical configuration. In some embodiments, the control management system may establish the operable rotor unit 2712 in a vertical configuration thrust setting. The vertical configuration thrust setting may be the same as or different from the initial thrust setting. In some embodiments, the vertical configuration thrust setting may be determined based on an amount of power available to the operable rotor unit 2712. In some embodiments, the vertical configuration may include a constant descent rate. In various embodiments, the constant descent rate may be a predetermined rate (e.g., 500 fpm, 300 fpm, 100 fpm, etc.). In some embodiments, the vertical configuration thrust setting may include a constant decrease in acceleration toward the ground. For example, the vertical configuration thrust setting may include a thrust that decreases an acceleration of the aircraft 1 fps$^2$ every second to minimize a velocity at impact.

In some embodiments, the vertical configuration may include a variable descent rate. In some embodiments, the descent rate may depend on the altitude of the VTOL aircraft. In such embodiments, the control management system of the VTOL aircraft may be configured to determine an altitude of the aircraft, and adjust a descent rate (e.g., thrust produced by the operable motor) based on the altitude. For example, a VTOL aircraft may hover at 2000 feet, and based on a recognition of a degraded functionality of a rotor unit, may initiate a descent rate at 1000 fpm. At 1500 feet, the control management system may adjust the descent rate to 750 fpm, at 1000 feet, the control management system may adjust the descent rate to 500 fpm, and at 500 feet, the control management system may adjust the descent rate to 250 fpm, and so on. For another example, a VTOL aircraft may hover at 50 feet and based on a recognition of a degraded functionality of a rotor unit, may initiate and maintain a constant descent rate of 100 fpm.

In some embodiments, the control management system may monitor the altitude of the VTOL aircraft, and may adjust the descent rate and/or rate of acceleration based on a determination that the VTOL aircraft is approaching (e.g., within 10, 15, 20, etc. feet of the altitude, within 3, 5, 10, etc. seconds of reaching the altitude based on descent rate) or has reached a minimum or threshold altitude (e.g., 20 feet, 45 feet, etc.). In such embodiments, the VTOL aircraft may descend at a first descent rate and/or acceleration rate above the threshold altitude, and the control management system may adjust the descent rate and/or acceleration rate to a second (slower) rate to lessen a force of impact with the landing surface. For example, the VTOL aircraft may be established in a 500 fpm descent. The control management system may determine that the aircraft is at 50 feet, and may increase thrust produced by the operable motor 2706 to decrease a descent rate to 200 fpm.

In the vertical configuration, a first end of the aircraft (i.e., the nose or the tail, depending on the degraded rotor unit) may contact a landing surface. In various embodiments, the nose and/or tail of the VTOL aircraft may include an impact member 2718. In such embodiments, the impact member 2718 may include a material and/or structure configured to absorb impact forces, and decrease an effect on occupants of the VTOL aircraft. The material and/or structure may include a foam material, a plastic material, a rubber material, a composite material, a metal material, and/or other material configured to absorb impact forces.

In various embodiments, the impact member 2718 may include a deployable member, such as an airbag or balloon, configured to expand or deploy prior to impact to absorb impact forces. In some embodiments, the control management system may identify that a ground contact with the impact member 2718 is imminent. The identification of imminent impact may be based on input from one or more distance sensors (e.g., light detection and ranging sensor, sound navigation and ranging sensor, radar altimeter sensor, a ranging camera, a barometer, etc.) and/or a time and rate(s) of descent. In some embodiments, the control management system may automatically deploy the impact member 2718 based on a degraded functionality of a rotor unit and an initiation of the landing protocol.

In some embodiments, a determination that the impact is imminent may be based on a distance to impact being less than a threshold distance. In such embodiments, the control management system may compare the distance with the threshold distance, and determine that the distance is at or less than the threshold distance. Additionally or alternatively, the determination that the impact is imminent may be based on a time to impact is less than a threshold time. In some embodiments, the control management system may calculate the time to impact. In such embodiments, the control management system may compare the time to impact with the threshold time, and determine that the time is within the threshold. For example, the threshold time may be 3 seconds. As the VTOL aircraft descends, the control management system may continually calculate the time to impact, and may determine an impact is imminent when the time to impact is at 3 seconds or less.

In various embodiments, responsive to an impact with the ground (e.g., detected by a sensor in the impact member 2718) and/or an identification that ground contact with the impact member 2718 is imminent, the control management system may send a signal to the operable rotor unit 2712 to adjust a thrust vector 2716 (i.e., to pivot about the rotating chassis) toward a bottom side of the fuselage (e.g., opposite a direction of the canopy, toward a landing gear, etc.), such as thrust vector 2716(2). In some embodiments, the thrust vector 2716(2) may include a transient adjustment to the direction of thrust in order to change a pitch of the VTOL aircraft such that the aircraft comes to rest on the landing surface in a generally upright orientation. In some embodiments, the adjustment to the thrust vector 2716(2) may cause the VTOL aircraft to rotate onto the landing gear 2720, as depicted at 2722. Accordingly, the landing protocol may be initiated to safely land the VTOL aircraft canopy side up in the event of a degraded motor and/or rotor system.

In various embodiments, after the impact member 2718 contacts the landing surface and the aircraft is established in a rotation about the impact member 2718, the control management system may adjust the thrust vector 2716 to provide a substantially vertical thrust, such as thrust vector 2716(1). In such embodiments, the operable rotor unit may pivot about the rotating chassis to maintain the thrust vector 2716(1), and reduce impact forces of the landing at 2722 (e.g., cushion the landing).

Though illustrated as ducted fans, the two or more rotor units of the VTOL aircraft may additionally or alternatively include non-ducted rotors with blades, such as non-ducted rotors 2502. In various embodiments, the blades may be variable pitch and configured to feather when the respective non-ducted rotor is operating in a degraded capacity. Additionally, in some embodiments with non-ducted rotors, the rotating chassis may be configured to rotate the degraded rotor unit to a position substantially perpendicular to a direction of travel. In such embodiments, both the operable rotor unit and the degraded rotor unit may maintain a substantially similar orientation.

Figure 28A:
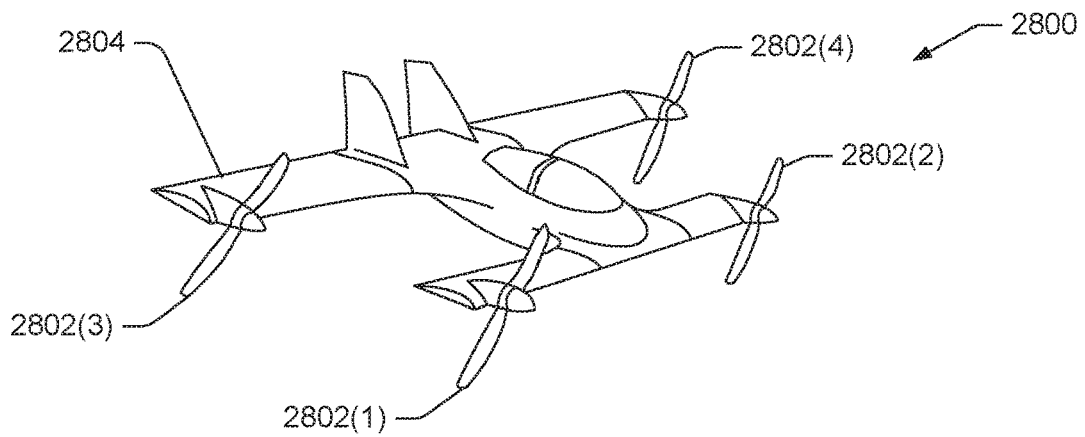
FIGS. 28A-C are perspective views of another illustrative VTOL aircraft configured to perform a degraded rotor landing protocol.
Figure 28B:
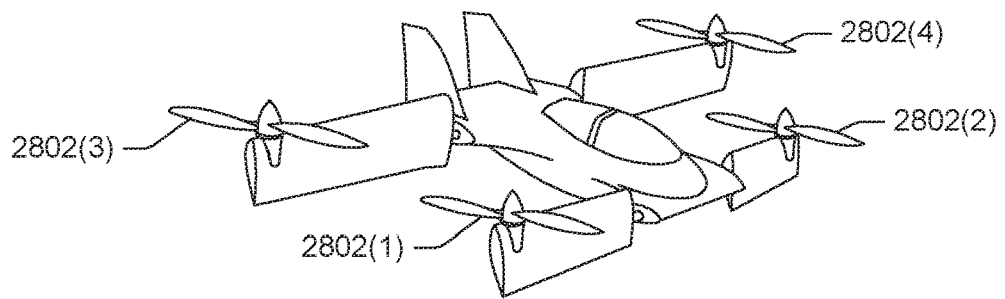
Figure 28C:
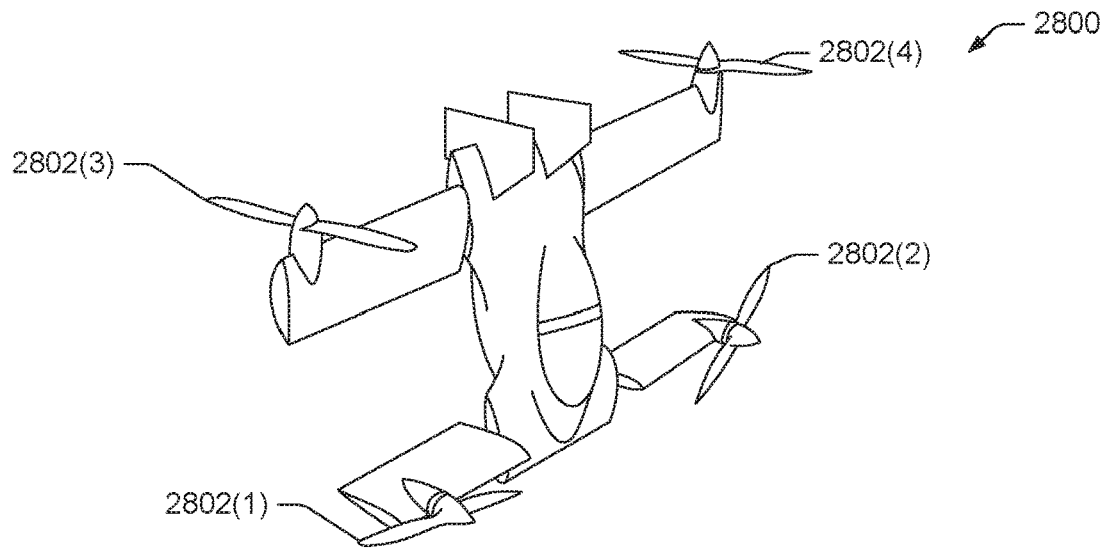

FIGS. 28A-C are perspective views of an example VTOL aircraft 2800 configured to perform a degraded rotor landing protocol. FIG. 28A illustrates the VTOL aircraft 2800 in a forward flight mode. As illustrated, the VTOL aircraft 2800 includes rotor units 2802(1), 2802(2), 2802(3), and 2802(4), coupled to adjustable wings 2804. In other embodiments, the rotor units 2802(1), 2802(2), 2802(3), and 2802(4), may be coupled to fixed wings via a rotating chassis and/or a tilt mechanism, such as that illustrated in FIGS. 30A-C. The rotor units 2802 may be configured to adjust approximately 90 degrees from a forward flight configuration shown illustrated in FIG. 28A to a vertical flight configuration (e.g., hover configuration) illustrated in FIG. 28B.

The VTOL aircraft shown in FIG. 28B is established in a hover mode, the control management system may determine that a rotor unit 2802(1) of the VTOL aircraft 2800 is operating in a degraded state, and may initiate the degraded rotor landing protocol, such as degraded rotor landing protocol 2700. In various embodiments, the landing protocol may include terminating power to a motor associated with the degraded rotor unit 2802(1). In some embodiments, the landing protocol may additionally include terminating power to a motor associated with a second rotor unit 2802(2), the second rotor unit 2802(2) being generally in a same or similar plane with the degraded rotor unit 2802(1). In some embodiments, the power to the second rotor unit 2802(2) may be gradually decreased, in order to reduce an oscillation of a fuselage while the VTOL aircraft transitions to a vertical configuration illustrated in FIG. 28C.

The VTOL aircraft shown in FIG. 28C is established in the vertical configuration, with the operable rotor units 2802(3) and 2802(4) providing vertical thrust to slow a decent rate and/or acceleration rate toward the landing surface. In various embodiments, the control management system may determine that an impact is imminent, and may adjust a thrust vector produced by the operable rotor units 2802(3) and 2802(4) to change a pitch of the aircraft such that the aircraft comes to rest on the landing surface with a cockpit being generally upright. In some embodiments, the pitch change may cause the VTOL aircraft to rotate onto landing gear.

Figure 29A:
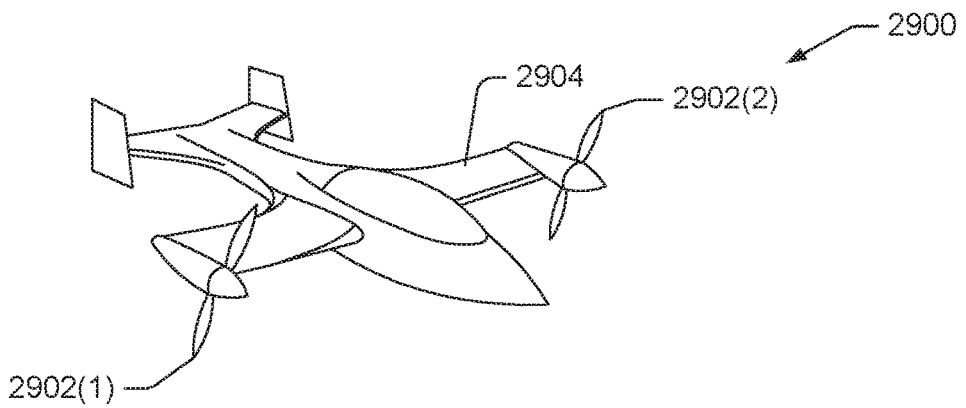
FIGS. 29A-C are perspective views of yet another illustrative VTOL aircraft configured to perform a degraded rotor landing protocol.
Figure 29B:
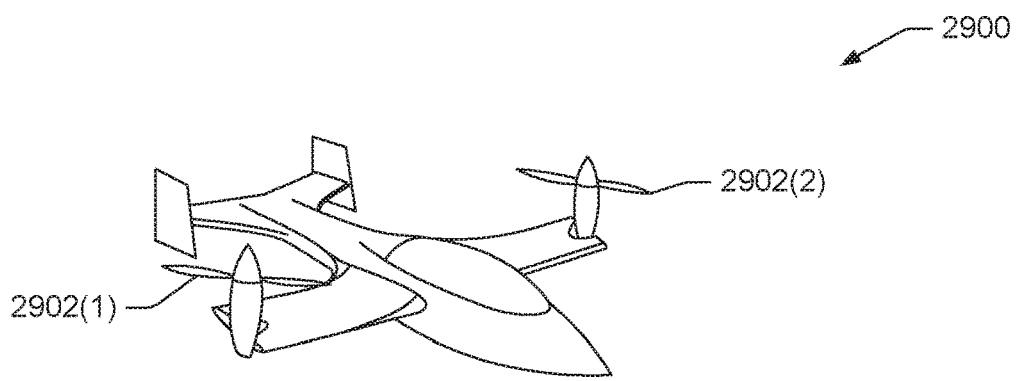
Figure 29C:
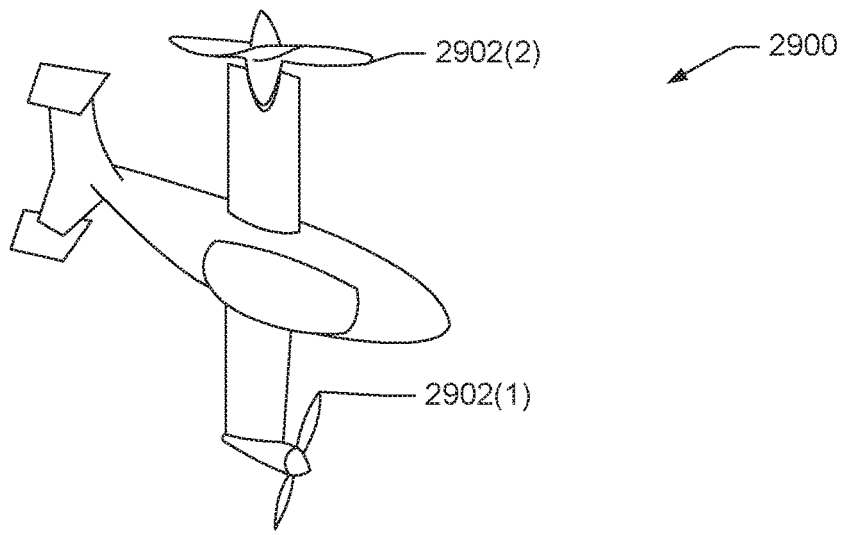

FIGS. 29A-C are a perspective views of an example VTOL aircraft 2900 configured to perform a degraded rotor landing protocol. FIG. 29A illustrates the VTOL aircraft 2900 in a forward flight mode. The VTOL aircraft 2900 includes rotor units 2902(1) and 2902(2) coupled to fixed wings 2804. The rotor units 2902 may be coupled to the wings 2904 via a tilt mechanism, such as the tilt mechanism illustrated in FIG. 30. The tilt mechanism may be configured to adjust a position of the rotor units 2902(1) and 2902(2) approximately 90 degrees from a forward flight configuration shown at 2906 to a vertical flight configuration (e.g., hover configuration) illustrated in FIG. 29B.

FIG. 29B illustrates the VTOL aircraft 2900 established in a hover mode. In various embodiments, the control management system may determine that a rotor unit 2902(1) of the VTOL aircraft 2900 is operating in a degraded state, and may initiate the degraded rotor landing protocol, such as degraded rotor landing protocol 2700. In various embodiments, the landing protocol may include terminating power to a motor associated with the degraded rotor unit 2902(1).

FIG. 29C illustrates the VTOL aircraft 2900 established in a vertical configuration, with the operable rotor unit 2902(2) providing vertical thrust to slow a decent rate and/or acceleration rate toward the landing surface. In various embodiments, the control management system may determine that an impact is imminent, and may adjust a thrust vector produced by the operable rotor unit 2802(2) to change a pitch of the aircraft such that the aircraft comes to rest on the landing surface with a cockpit being generally upright. In some embodiments, the pitch change may cause the VTOL aircraft to rotate onto landing gear.

Figure 30:
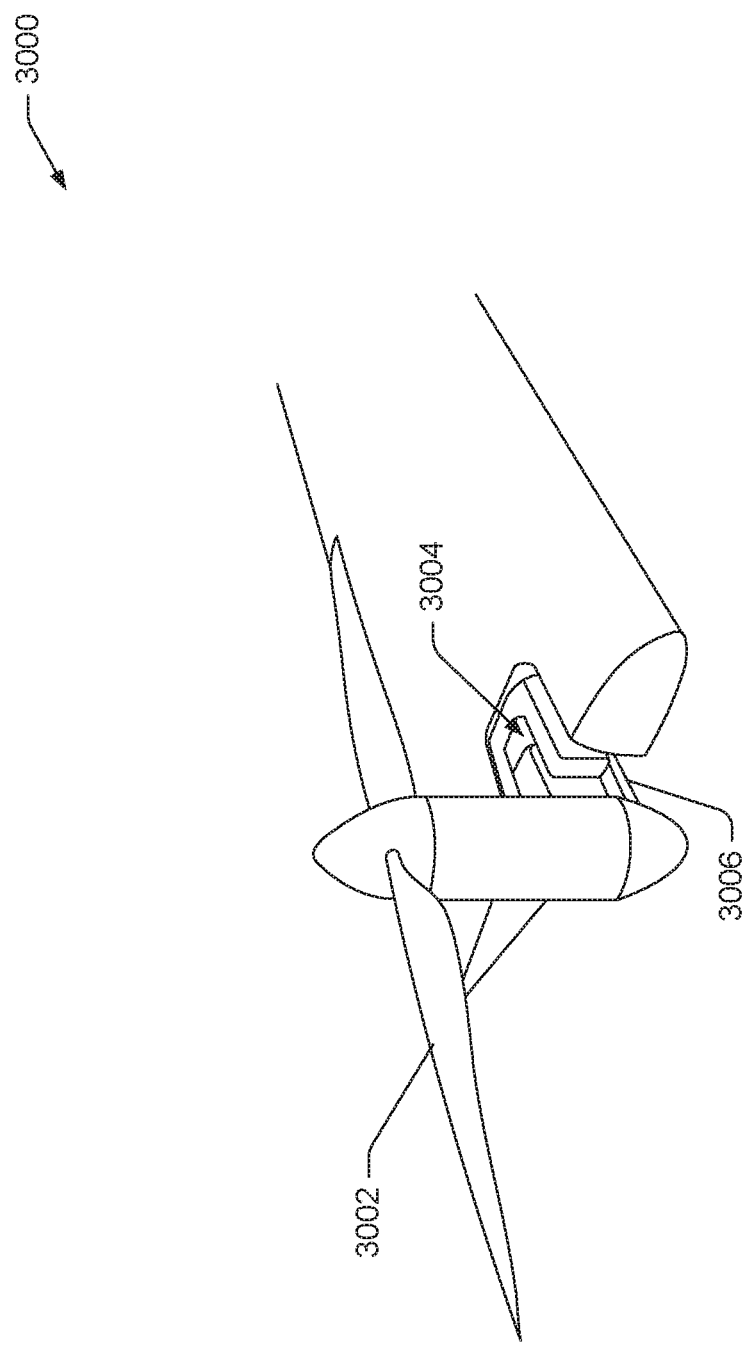
FIG. 30 is a perspective view of an example tilt mechanism configured to adjust a rotor of a VTOL aircraft between a hover configuration to a forward flight configuration.

FIG. 30 is a perspective view an example tilt mechanism 3000 of a rotor unit. The tilt mechanism 3000 may be configured to adjust a position of a rotor unit 3002 approximately 90 degrees from a forward flight configuration shown to a vertical flight configuration (e.g., hover configuration).

In various embodiments, the tilt mechanism 3000 may include a joint 3004 (e.g., power transmission joint, universal joint, constant velocity (CV) joint, etc.) configured to adjust the rotor unit between the forward flight configuration, as depicted in FIG. 29A and the vertical flight configuration, as depicted in FIG. 29B. In some embodiments, the tilt mechanism 3000 may also include a strut 3006 configured to rotate the rotor unit outboard, as depicted in FIG. 29C (rotor unit 2902(2)). The strut 3006 may include a gas or liquid strut, a cable and pulley, a gear rack and pinion, and/or other method for adjusting the position of the rotor unit 3002.

Figure 31A:
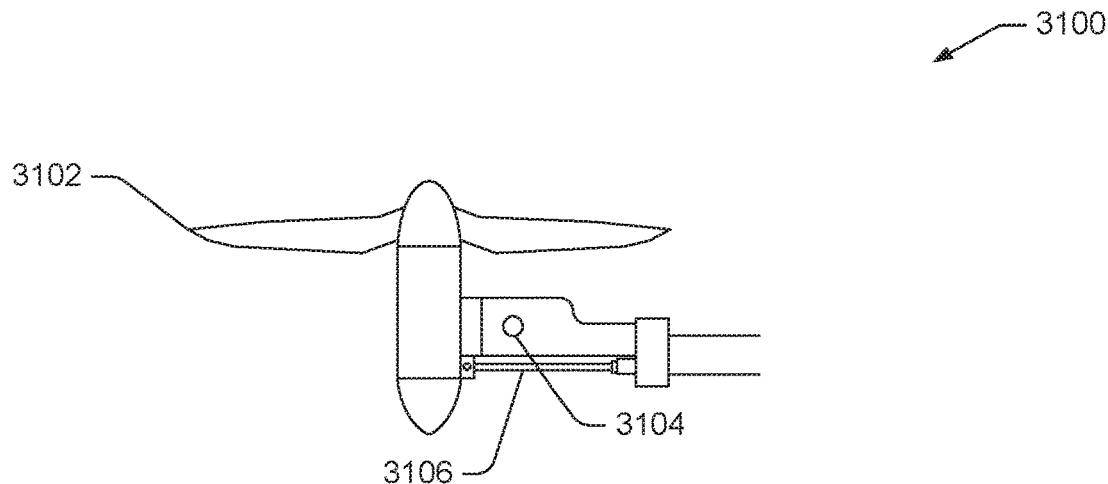
FIGS. 31A and 31B are side views of an example tilt mechanism configured to adjust a rotor of a VTOL aircraft.
Figure 31B:
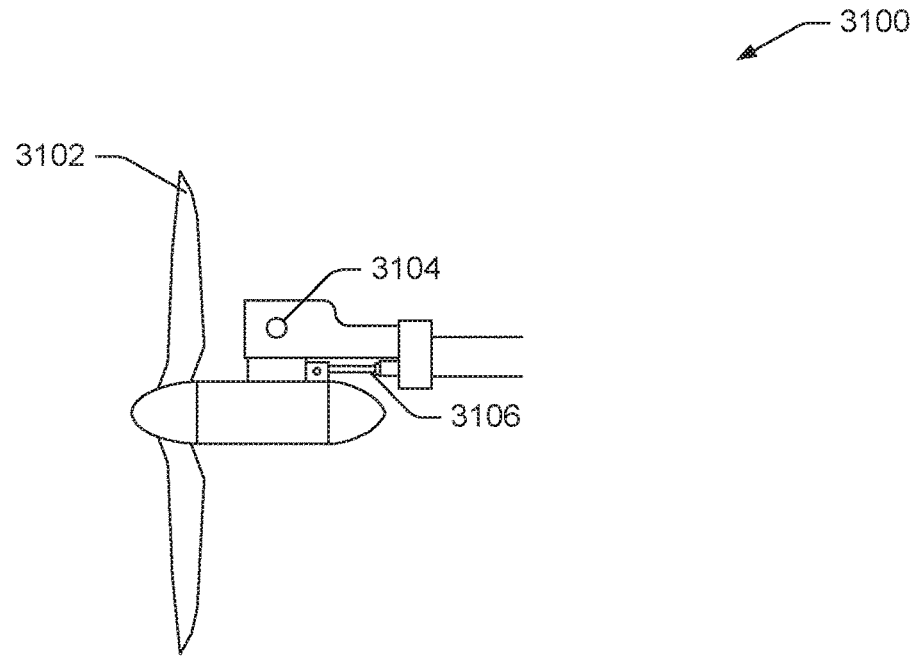

FIGS. 31A and 31B are side views of an example tilt mechanism 3100, such as tilt rotor mechanism 3000. FIG. 31A illustrates the tilt mechanism 3100 with a rotor unit 3102 in hover configuration. The tilt mechanism 3100 may include a joint 3104, such as joint 3004, configured to adjust the rotor unit 3102 from the hover configuration to the outboard degraded landing configuration depicted in FIG. 29C.

Figure 32:
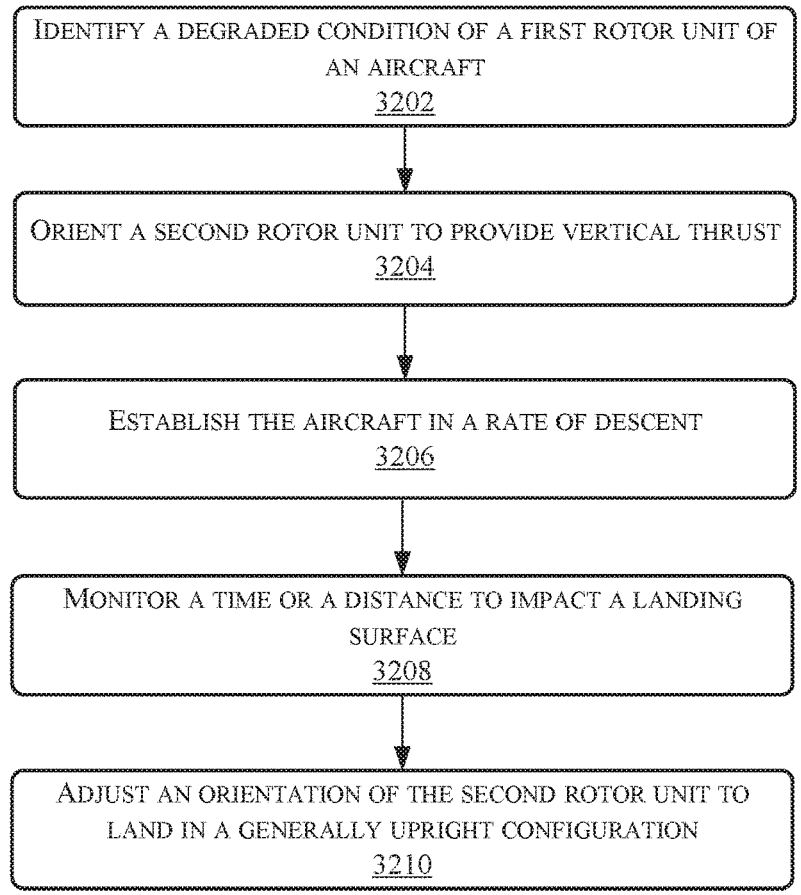
FIG. 32 is a flow diagram of an illustrative process of a landing protocol associated with a degraded rotor system.

FIG. 32 is a flow diagram of an example process 3200, illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 32 is a flow diagram of an illustrative process 3200 for a degraded rotor landing protocol. The degraded rotor landing protocol can be performed by a computing system of a VTOL aircraft, such as a flight control computer and/or a control management system, such as control management system 614, or at the discretion of an operator.

At 3202, a computing system of the VTOL aircraft identifies a degraded condition (e.g., degraded state) of a rotor unit. The degraded operation may include the rotor unit producing zero thrust or less thrust than required to maintain substantially level flight in a hover or transition mode. In various embodiments, the computing system may recognize the degraded operation based on an input (e.g., failure message, degraded condition message, etc.) received from a motor associated with the degraded rotor unit. In some embodiments, the computing system may recognize the degraded operation based on a lack of input from a motor associated with the degraded rotor unit. In some embodiments, the computing system may recognize a failure of a rotor unit to obey an instruction and/or protocol. In some embodiments, the computing system may recognize the degraded operation based on a detection of an unanticipated pitch of the VTOL aircraft caused by a reduced thrust from the degraded rotor unit. In such examples, the pitch may be detected by one or more stability augmentation sensors (e.g., gyroscopes and/or accelerometers) of the VTOL aircraft. In some embodiments, the computing system may determine that the unanticipated pitch exceeds a threshold unanticipated pitch amount and/or rate.

At 3204, the computing system may initiate a degraded rotor unit landing protocol by orienting a second rotor unit (an operable rotor unit) to provide vertical thrust. In some embodiments, the computing system may send a signal to the operable rotor unit and/or a motor associated with the second rotor unit to pivot about a rotating chassis in order to provide the vertical thrust. In some embodiments, the computing system may send a signal to a motor associated with the operable rotor unit to set an initial thrust setting. The initial thrust setting may include an increase in thrust. In some embodiments, the initial thrust setting may be based on atmospheric conditions, a maximum available thrust, an amount of power available, a desired rate of descent, an aircraft altitude, an aircraft gross weight, a number of occupants, a payload, and/or other considerations.

In various embodiments, the computing system may send a signal to the motor associated with the degraded rotor unit to cut power to the degraded rotor unit, thereby decreasing thrust substantially to zero (e.g., no thrust or a negligible amount of thrust). In some embodiment, the computing system may send a signal to the motor associated with the degraded rotor unit to produce thrust based on the available power and/or condition of the rotor unit. In such embodiments, the degraded rotor unit may assist in producing at least some lift in the degraded rotor landing protocol.

At 3206, the computing system may establish the aircraft in a rate of descent. In some examples, the rate of descent may be a pre-determined rate of descent. In some examples, the rate of descent may be based on atmospheric conditions, a power available, a thrust available, and/or a payload and/or a gross weight of the aircraft.

At 3208, the computing system may monitor a time or a distance to impact a landing surface. In some examples, the time or the distance may be based on input from one or more distance sensors (e.g., light detection and ranging sensor, radar altimeter sensor, a ranging camera, etc.) and/or a time and rate(s) of descent. In some embodiments, the computing system may determine that a time or a distance to impact the landing surface is within a threshold time or a threshold distance. In such embodiments, the computing system may determine that the impact is imminent. In some embodiments, the computing system may determine that an impact with a ground surface has occurred. In such embodiments, the computing system may determine that the impact has occurred based on an input from an accelerometer, a contact sensor, or the like.

In various embodiments, responsive to the identification of imminent impact (e.g., time to impact is within a threshold time or distance to impact is within a threshold distance), the control management system may deploy an impact member. In such embodiments, the impact member may be configured to absorb impact forces resulting from the VTOL aircraft contacting the landing surface. For example, the control management system may deploy an airbag to absorb the initial force of impact with the ground.

At 3210, the computing system may adjust an orientation of the operable rotor unit (e.g., pitch of the aircraft) to land in a generally upright configuration. In some embodiments, the computing system may adjust a thrust vector of the operable motor at a predetermined distance from the ground or at a predetermined time before anticipated impact with the ground to cause the VTOL aircraft to rotate to a generally upright configuration (i.e., onto landing gear, onto a bottom side of the fuselage, etc.). Accordingly, the landing protocol may be initiated to safely land the VTOL aircraft generally upright up in the event of a degraded motor and/or rotor system.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A vertical take-off and landing (VTOL) aircraft comprising:
   a fuselage having a fore end, an aft end, and a fuselage center of mass located between the fore end and the aft end, the fuselage having a longitudinal axis that is located between a top side and a bottom side and extending between the fore end and the aft end;
   propulsion units including a fore propulsion unit and an aft propulsion unit, the fore propulsion unit located fore of the fuselage center of mass along the longitudinal axis of the fuselage, the aft propulsion unit located aft of the fuselage center of mass and, the fore propulsion unit and the aft propulsion unit each generating thrust;
   a fore mounting surface located at the fore end for coupling the fore propulsion unit to the fuselage, the fore mounting surface directing rotation of the fore propulsion unit about at least a first axis, the fore propulsion unit to provide thrust in a substantially vertical direction and a substantially horizontal direction such that backwash from the fore propulsion unit is directed over an upper surface of the fuselage generating lift;
   an aft mounting surface located aft of the center of mass of the fuselage for coupling the aft propulsion unit to the aircraft, the aft propulsion unit located higher relative to a center of mass of the fore propulsion unit; and
   a flight control computer communicatively coupled to the fore propulsion unit and the aft propulsion unit and configured to send an output signal to control orientation of the at least the fore propulsion unit about the first axis.

2. The VTOL aircraft as recited in claim 1, wherein the fore mounting surface directs rotation of the fore propulsion unit about at least a first axis, and the aft propulsion unit is coupled to an aft mounting surface which directs rotation of the aft propulsion unit about at least a second axis, the fore mounting surface and the aft mounting surface are configured to orient the fore propulsion unit and the aft propulsion unit, respectively, in the following flight modes:

a hover mode in which the fore propulsion unit and the aft propulsion unit are oriented such that thrust from the fore propulsion unit and the aft propulsion unit is directed substantially perpendicular to the longitudinal axis, the thrust from the fore propulsion unit and the aft propulsion unit to support the VTOL aircraft in hover flight; and a forward flight mode in which the fore propulsion unit and the aft propulsion unit are oriented such that thrust from the fore propulsion unit and the aft propulsion unit is directed substantially parallel to the longitudinal axis, the thrust from the fore propulsion unit and the aft propulsion unit causing propulsion of the VTOL aircraft in forward flight.

* * * * *